US012451620B2

(12) United States Patent
Wu et al.

(10) Patent No.: US 12,451,620 B2
(45) Date of Patent: Oct. 21, 2025

(54) METASURFACE ANTENNA AND METASURFACE STRUCTURE FOR ANTENNA

(71) Applicant: City University of Hong Kong, Kowloon (HK)

(72) Inventors: Gengbo Wu, Kowloon (HK); Junyan Dai, Nanjing (CN); Kam Man Shum, Kowloon (HK); Ka Fai Chan, Kowloon (HK); Chi Hou Chan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 246 days.

(21) Appl. No.: 18/449,871

(22) Filed: Aug. 15, 2023

(65) Prior Publication Data

US 2024/0258717 A1 Aug. 1, 2024

Related U.S. Application Data

(60) Provisional application No. 63/482,342, filed on Jan. 31, 2023.

(51) Int. Cl.
*H01Q 23/00* (2006.01)
*H01Q 1/44* (2006.01)
(Continued)

(52) U.S. Cl.
CPC ............... *H01Q 23/00* (2013.01); *H01Q 1/44* (2013.01); *H01Q 13/10* (2013.01); *H01Q 21/0087* (2013.01)

(58) Field of Classification Search
CPC ................................. H01Q 1/44; H01Q 3/24; H01Q 13/10; H01Q 15/002; H01Q 15/0013; H01Q 21/0043; H01Q 21/0087; H01Q 23/00
See application file for complete search history.

(56) References Cited

U.S. PATENT DOCUMENTS 6,456,251 B1 9/2002 Rao
7,071,888 B2 7/2006 Sievenpiper
(Continued)

FOREIGN PATENT DOCUMENTS

WO WO-2021047245 A1 * 3/2021 ............. G01S 7/027
WO WO-2022061469 A1 * 3/2022 ......... H01Q 15/0086
WO WO-2022253144 A1 * 12/2022 ......... H01Q 15/0026

OTHER PUBLICATIONS

Wu, G.-B., Zhang, Q.-L., Chan, K. F., Chen, B.-J. & Chan, C. H. Amplitude-Modulated Leaky-Wave Antennas. IEEE Trans. Antennas Propag. 69, 3664-3676 (2020).
(Continued)

*Primary Examiner* — Hoang V Nguyen
(74) *Attorney, Agent, or Firm* — Renner, Kenner, Greive, Bobak, Taylor & Weber

(57) ABSTRACT

A metasurface structure for an antenna. The metasurface structure includes multiple subwavelength units operable to manipulate or control amplitude, phase, polarization, frequency, and momentum of electromagnetic waves for radiation. The metasurface structure may be operably coupled with a waveguide to provide a metasurface antenna. The metasurface structure or the metasurface antenna may be operably coupled with a controller arranged to control it.

29 Claims, 33 Drawing Sheets

A B

(51) Int. Cl.
*H01Q 13/10* (2006.01)
*H01Q 21/00* (2006.01)

(56) References Cited

U.S. PATENT DOCUMENTS

| | | | |
|---|---|---|---|
| 9,268,016 B2 | 2/2016 | Smith et al. | |
| 9,405,136 B2 | 8/2016 | Alu et al. | |
| 9,685,709 B2 | 6/2017 | Sabbadini et al. | |
| 10,014,585 B2 | 7/2018 | Patron et al. | |
| 10,418,721 B2 | 9/2019 | Chattopadhyay et al. | |
| 2022/0013903 A1* | 1/2022 | Evans | H01P 3/006 |
| 2022/0021125 A1* | 1/2022 | Baligh | H01Q 21/06 |

OTHER PUBLICATIONS

Smith, D. R., Yurduseven, O., Mancera, L. P., Bowen, P. & Kundtz, N. B. Analysis of a waveguide-fed metasurface antenna. Phys. Rev. Appl. 8, 054048 (2017).
Yu, N. et al. Light propagation with phase discontinuities: generalized laws of reflection and refraction. Science 334, 333-337 (2011).
Ni, X., Emani, N. K., Kildishev, A. V., Boltasseva, A. & Shalaev, V. M. Broadband light bending with plasmonic nanoantennas. Science 335, 427 (2012).
Kildishev, A. V., Boltasseva, A. & Shalaev, V. M. Planar photonics with metasurfaces. Science 339, 1232009 (2013).
Della Giovampaola, C. & Engheta, N. Digital metamaterials. Nat. Mater. 13, 1115-1121 (2014).
Cui, T. J., Qi, M. Q., Wan, X., Zhao, J. & Cheng, Q. Coding metamaterials, digital metamaterials and programmable metamaterials. Light Sci. Appl. 3, e218 (2014).
Li, P. et al. Infrared hyperbolic metasurface based on nanostructured van der Waals materials. Science 359, 892-896 (2018).
Hu, G. et al. Topological polaritons and photonic magic angles in twisted α-MoO3 bilayers. Nature 582, 209-213 (2020).
Van de Groep, J. et al. Exciton resonance tuning of an atomically thin lens. Nat. Photonics 14, 426-430 (2020).
Stav, T. et al. Quantum entanglement of the spin and orbital angular momentum of photons using metamaterials. Science 361, 1101-1104 (2018).
Wang, K. et al. Quantum metasurface for multiphoton interference and state reconstruction. Science 361, 1104-1108 (2018).
Li, L. et al. Metalens-array-based high-dimensional and multiphoton quantum source. Science 368, 1487-1490 (2020).
Harrington, R. F. Time-harmonic Electromagnetic Fields. (McGraw-Hill, 1961), Chapter 2.
Saleh, B. E. A. & Teich, M. C. Fundamentals of photonics. (John Wiley & sons, 2019), Chapter 2.
He, C., Shen, Y. & Forbes, A. Towards higher-dimensional structured light. Light Sci. Appl. 11, 1-17 (2022).
Lalanne, P., Astilean, S., Chavel, P., Cambril, E. & Launois, H. Blazed binary subwavelength gratings with efficiencies larger than those of conventional échelette gratings. Optics letters 23, 1081-1083 (1998).
Bomzon, Z. e., Biener, G., Kleiner, V. & Hasman, E. Radially and azimuthally polarized beams generated by space-variant dielectric subwavelength gratings. Optics letters 27, 285-287 (2002).
Arbabi, A., Horie, Y., Bagheri, M. & Faraon, A. Dielectric metasurfaces for complete control of phase and polarization with subwavelength spatial resolution and high transmission. Nat. Nanotechnol. 10, 937-943 (2015).
Sun, S. et al. Gradient-index meta-surfaces as a bridge linking propagating waves and surface waves. Nat. Mater. 11, 426-431 (2012).
Pfeiffer, C. & Grbic, A. Metamaterial Huygens' surfaces: tailoring wave fronts with reflectionless sheets. Physical review letters 110, 197401 (2013).
Sherrott, M. C. et al. Experimental demonstration of >230 phase modulation in gate-tunable graphene-gold reconfigurable mid-infrared metasurfaces. Nano Lett. 17, 3027-3034 (2017).
Park, J., Kang, J.-H., Kim, S. J., Liu, X. & Brongersma, M. L. Dynamic reflection phase and polarization control in metasurfaces. Nano Lett. 17, 407-413 (2017).
Venkatesh, S., Lu, X., Saeidi, H. & Sengupta, K. A high-speed programmable and scalable terahertz holographic metasurface based on tiled CMOS chips. Nat. Electron. 3, 785-793 (2020).
Holsteen, A. L., Raza, S., Fan, P., Kik, P. G. & Brongersma, M. L. Purcell effect for active tuning of light scattering from semiconductor optical antennas. Science 358, 1407-1410 (2017).
Malek, S. C., Ee, H.-S. & Agarwal, R. Strain multiplexed metasurface holograms on a stretchable substrate. Nano Lett. 17, 3641-3645 (2017).
Arbabi, E. et al. MEMS-tunable dielectric metasurface lens. Nat. Commun. 9, 1-9 (2018).
Shcherbakov, M. R. et al. Ultrafast all-optical tuning of direct-gap semiconductor metasurfaces. Nat. Commun. 8, 1-6 (2017).
Guo, X., Ding, Y., Duan, Y. & Ni, X. Nonreciprocal metasurface with space-time phase modulation. Light Sci. Appl. 8, 1-9 (2019).
Alam, M. Z., De Leon, I. & Boyd, R. W. Large optical nonlinearity of indium tin oxide in its epsilon-near-zero region. Science 352, 795-797 (2016).
Clerici, M. et al. Controlling hybrid nonlinearities in transparent conducting oxides via two-colour excitation. Nat. Commun. 8, 1-7 (2017).
Sautter, J. et al. Active tuning of all-dielectric metasurfaces. ACS Nano 9, 4308-4315 (2015).
Lewi, T., Evans, H. A., Butakov, N. A. & Schuller, J. A. Ultrawide thermo-optic tuning of PbTe meta-atoms. Nano Lett. 17, 3940-3945 (2017).
He, J. et al. Terahertz tunable metasurface lens based on vanadium dioxide phase transition. Plasmonics 11, 1285-1290 (2016).
Thureja, P. et al. Toward a universal metasurface for optical imaging, communication, and computation. Nanophotonics 11, 3745-3768 (2022).
Kafaie Shirmanesh, G., Sokhoyan, R., Pala, R. A. & Atwater, H. A. Dual-gated active metasurface at 1550 nm with wide (> 300) phase tunability. Nano Lett. 18, 2957-2963 (2018).
Han, S. et al. Complete complex amplitude modulation with electronically tunable graphene plasmonic metamolecules. ACS Nano 14, 1166-1175 (2020).
Park, J. et al. All-solid-state spatial light modulator with independent phase and amplitude control for three-dimensional LiDAR applications. Nat. Nanotechnol. 16, 69-76 (2021).
Hadad, Y., Soric, J. C. & Alu, A. Breaking temporal symmetries for emission and absorption. Proceedings of the National Academy of Sciences 113, 3471-3475 (2016).
Cardin, A. E. et al. Surface-wave-assisted nonreciprocity in spatio-temporally modulated metasurfaces. Nat. Commun. 11, 1-9 (2020).
Ramaccia, D., Sounas, D. L., Alù, A., Toscano, A. & Bilotti, F. Doppler cloak restores invisibility to objects in relativistic motion. Physical Review B 95, 075113 (2017).
Zhang, L. et al. Space-time-coding digital metasurfaces. Nat. Commun. 9, 1-11 (2018).
Zhang, L. et al. A wireless communication scheme based on space-and frequency-division multiplexing using digital metasurfaces. Nat. Electron. 4, 218-227 (2021).
Wu, G.-B., Dai, J. Y., Cheng, Q., Cui, T. J. & Chan, C. H. Sideband-free space-time-coding metasurface antennas. Nat. Electron., 1-12 (2022).
Dai, J. Y., Zhao, J., Cheng, Q. & Cui, T. J. Independent control of harmonic amplitudes and phases via a time-domain digital coding metasurface. Light Sci. Appl. 7, 1-10 (2018).
Dai, J. Y. et al. Wireless communications through a simplified architecture based on time-domain digital coding metasurface. Adv. Mater. Tech. 4, 1900044 (2019).
Wang, S. R., Chen, M. Z., Ke, J. C., Cheng, Q. & Cui, T. J. Asynchronous Space-Time-Coding Digital Metasurface. Adv. Sci. 9, 2200106 (2022).

(56) References Cited

OTHER PUBLICATIONS

Ke, J. C. et al. Frequency-modulated continuous waves controlled by space-time-coding metasurface with nonlinearly periodic phases. Light Sci. Appl. 11, 1-11 (2022).
Ke, J. C. et al. Linear and nonlinear polarization syntheses and their programmable controls based on anisotropic time-domain digital coding metasurface. Small structures 2, 2000060 (2021).
Ke, J. C. et al. Space-frequency-polarization-division multiplexed wireless communication system using anisotropic space-time-coding digital metasurface. Natl. Sci. Rev. 9, doi:10.1093/nsr/nwac225 (2022).
Kaganovsky, Y. & Heyman, E. Wave analysis of Airy beams. Opt. Express 18, 8440-8452 (2010).
Zheng, Y. et al. Metasurface-Assisted Wireless Communication with Physical Level Information Encryption. Adv. Sci., 2204558 (2022).

* cited by examiner

| Polarization | $\lvert u\rangle$ | $\lvert v\rangle$ | $\lvert x\rangle$ | $\lvert y\rangle$ | $\lvert LCP\rangle$ | $\lvert RCP\rangle$ |
|---|---|---|---|---|---|---|
| Theo. $\lvert u\rvert/\lvert v\rvert$ | ∞ | 0 | 1 | 1 | 1 | 1 |
| Theo. $\angle u - \angle v$ | / | / | 0° | 180° | 90° | -90° |
| *m* = +1 harmonic frequency | | | | | | |
| Meas. $\lvert u\rvert/\lvert v\rvert$ | 10.4 | 0.12 | 0.99 | 0.95 | 0.92 | 1.02 |
| Meas. $\angle u - \angle v$ | 38° | -21° | 3.4° | 177° | 82° | -80° |
| Meas. PCR | 99% | 98.5% | 99.9% | 99.8% | 99.3% | 99.2% |
| *m* = 0 fundamental frequency | | | | | | |
| Meas. $\lvert u\rvert/\lvert v\rvert$ | 16.1 | 0.09 | 0.89 | 1.52 | 0.90 | 1.11 |
| Meas. $\angle u - \angle v$ | 10° | -26° | -6° | 180° | 93° | -102° |
| Meas. PCR | 99.6% | 99% | 99.4% | 95.8% | 99.6% | 98.6% |

PCR: polarizaiton conversion ratio = $|E_{co}|^2/(|E_{co}|^2+|E_{cross}|^2)$

Figure 53

METASURFACE ANTENNA AND METASURFACE STRUCTURE FOR ANTENNA

CROSS REFERENCE TO RELATED APPLICATIONS

This application claims the priority and benefit of U.S. provisional patent application No. 63/482,342, filed on Jan. 31, 2023, the entire content of which is incorporated herein by reference.

TECHNICAL FIELD

This invention generally relates to a metasurface structure for an antenna and a metasurface antenna including the metasurface structure.

BACKGROUND

Electromagnetic (EM) waves are fundamental components of various technical fields such as electronics and photonics, telecommunications, and quantum systems.

Generally, an EM wave can be characterized by five fundamental properties: polarization $\hat{e}$, amplitude A, frequency f, momentum k, and (initial) phase $\varphi$. These fundamental properties of the EM wave can be function of space $\vec{r}$ and time t. For example, the electric field of a plane-wave can be expressed as $E(\vec{r}, t)=\hat{e}A\cos(2\pi ft+\vec{k}\cdot\vec{r}+\varphi)$.

Electromagnetic (EM) wave related technologies are closely related to the control and utilization of these fundamental properties of EM waves. Conventional EM wave manipulation techniques primarily rely on the accumulated propagation effect in naturally-existing dielectric materials, such as lenses, optical modulators, and wave-plates. These optical components are often bulky and have curved shapes, which make them unsuitable for modern integrated electronic and photonic systems.

SUMMARY OF THE INVENTION

In a first aspect, there is provided a metasurface structure for an antenna. The metasurface structure includes a plurality of subwavelength units operable to manipulate or control amplitude, phase, polarization, frequency, and momentum (i.e., all of these five properties) of electromagnetic waves for radiation. The subwavelength units may be referred to as "meta-atoms". It should be noted that the metasurface structure includes a plurality of subwavelength units operable to manipulate or control all of the five listed properties, the metasurface structure need not always operate to manipulate or control all five properties at the same time; instead the metasurface structure can manipulate or control any one or more (up to all) of them at the same time. For example, the plurality of subwavelength units may be controlled by a controller to manipulate or control amplitude, phase, polarization, frequency, and/or momentum (e.g., all of these five properties) of electromagnetic waves for radiation.

In some embodiments, the plurality of subwavelength units are operable to manipulate or control amplitude, phase, polarization, frequency, and momentum (i.e., all of these five properties) of electromagnetic waves.

In some embodiments, the plurality of subwavelength units are operable to selectively manipulate or control amplitude, phase, polarization, frequency, and/or momentum of electromagnetic waves. For example, the plurality of subwavelength units may be operable to manipulate or control only one or some (i.e., not all) of the five properties at a time.

In some embodiments, the plurality of subwavelength units are operable to dynamically manipulate or control amplitude, phase, polarization, frequency, and/or momentum (i.e., one or more of these five properties) of electromagnetic waves.

In some embodiments, the plurality of subwavelength units are operable to simultaneously manipulate or control at least two of amplitude, phase, polarization, frequency, and momentum of electromagnetic waves. For example, in some embodiments, the plurality of subwavelength units may be operable to manipulate or control two or more of these five properties at the same time.

In some embodiments, the plurality of subwavelength units are operable to independently manipulate or control at least two of amplitude, phase, polarization, frequency, and momentum of electromagnetic waves. In other words, in some embodiments, the plurality of subwavelength units are operable to manipulate or control two or more of these five properties independently.

In some embodiments, each of the plurality of subwavelength units is selectively operable in (e.g., controlled to selectively operate in) a first operation state and a second operation state, to facilitate manipulation or control of the amplitude, phase, polarization, frequency, and/or momentum of electromagnetic waves. Each of the plurality of subwavelength units may or may not be selectively operable in one or more other operation states. In some embodiments, the first operation state comprises a radiating state in which the corresponding subwavelength unit radiates electromagnetic waves and the second operation state comprises a non-radiating state in which the corresponding subwavelength unit does not radiate electromagnetic waves. In some embodiments, the first operation state comprises a first radiating state and the second operation state comprises a second radiating state different from the first radiating state. For example, the first and second radiating states may correspond to different extents of radiation of electromagnetic waves.

In some embodiments, the plurality of subwavelength units are arranged in an array. In some embodiments, the plurality of subwavelength units are generally aligned.

In some embodiments, the plurality of subwavelength units may be arranged in a 1D array. In some embodiments, the plurality of subwavelength units may be arranged in a 2D array. For example, the plurality of subwavelength units may be generally aligned in one or more rows and one or more columns. The plurality of subwavelength units of the array may be spaced apart evenly or unevenly.

In some embodiments, each of the plurality of subwavelength units respectively comprises: a first slot formed on or in an electrically conductive layer and operable to radiate electromagnetic waves, a second slot formed on or in the electrically conductive layer and operable to radiate electromagnetic waves, a first control arrangement operably coupled with the first slot for facilitating control of operation of the first slot selectively in a radiating state (in which the first slot radiates electromagnetic waves) and a non-radiating state (in which the first slot does not radiate electromagnetic waves), and a second control arrangement operably coupled with the second slot for facilitating control of operation of the second slot selectively in a radiating state (in which the second slot radiates electromagnetic waves) and a non-radiating state (in which the second slot does not radiate electromagnetic waves). The first control arrangement and the second control arrangement may each be respectively controllable by a controller. In some examples, each subwavelength unit may be selectively operable in two or more of the following operation states: (1) the first and second slots are both in radiating state, (2) the first slot is in radiating state whereas the second slot is in non-radiating state, (3) the first slot is in non-radiating state whereas the second slot is in radiating state, and (4) the first and second slots are both in non-radiating state.

In some embodiments, the first slot and the second slot may have generally the same shape and/or size. In some embodiments, the first slot and the second slot have different orientations. In some embodiments, the first slot and the second slot are both shaped as a loop. For example, the loop may be generally elliptical, generally obround, generally oblong, generally oval, generally triangular, generally rectangular (e.g., squared), generally polygonal, etc.

In some embodiments, the first slot (e.g., the loop) extends generally along a first axis and the second slot (e.g., the loop) extends generally along a second axis. The first axis and the second axis may be arranged at a non-zero angle (i.e., not parallel). In some examples, the first axis and the second axis may be arranged at about 90 degrees.

In some embodiments, the first slot is operable to radiate electromagnetic waves with a first eigen-polarization state (e.g., first linear polarization state) and the second slot is operable to radiate electromagnetic waves with a second eigen-polarization state (e.g., second linear polarization state) orthogonal to the first eigen-polarization state (e.g., first linear polarization state).

In some embodiments, the first slots of the plurality of subwavelength units have generally the same orientation. In some embodiments, the first slots of the plurality of subwavelength units have generally the same shape and/or size. In some embodiments, the second slots of the plurality of subwavelength units have generally the same orientation. In some embodiments, the second slots of the plurality of subwavelength units have generally the same shape and/or size. In some embodiments, the first control arrangements of the plurality of subwavelength units have generally the same basic construction. In some embodiments, the second control arrangements of the plurality of subwavelength units have generally the same basic construction.

In some embodiments, the first control arrangement comprises at least two control elements operably coupled with the first slot for affecting operation of the first slot and the second control arrangement comprises at least two control elements operably coupled with the second slot for affecting operation of the second slot. The at least two control elements of the first control arrangement and the at least two control elements of the second control arrangement may be controlled by a controller. In one example, the controller may provide a first control signal to control the at least two control elements of the first control arrangement and a second control signal to control the at least two control elements of the second control arrangement.

In some embodiments, the at least two control elements of the first control arrangement comprise a first semiconductor element and a second semiconductor element each selectively operable in an ON state and an OFF state, for affecting operation of the first slot hence the operation state of the corresponding subwavelength unit. The first and second semiconductor elements of the first control arrangement may comprise semiconductor diodes, such as PIN diodes. In some examples, the first and second semiconductor elements of the first control arrangement may be arranged to operate simultaneously in either the ON state or the OFF state.

In some embodiments, the at least two control elements of the second control arrangement comprise a first semiconductor element and a second semiconductor element each selectively operable in an ON state and an OFF state, for affecting operation of the second slot hence the operation state of the corresponding subwavelength unit. The first and second semiconductor elements of the second control arrangement may comprise semiconductor diodes, such as PIN diodes. In some examples, the first and second semiconductor elements of the second control arrangement may be arranged to operate simultaneously in either the ON state or the OFF state.

In some embodiments, the first semiconductor element of the first control arrangement is connected across a first slot portion of the first slot and the second semiconductor element of the first control arrangement is connected across a second slot portion of the first slot. In some examples, the first slot portion of the first slot and the second slot portion of the first slot are at opposite sides (e.g., opposite long sides) of the first slot.

In some embodiments, the first semiconductor element of the second control arrangement is connected across a first slot portion of the second slot and the second semiconductor element of the second control arrangement is connected across a second slot portion of the second slot. In some examples, the first slot portion of the second slot and the second slot portion of the second slot are at opposite sides (e.g., opposite long sides) of the second slot.

In some embodiments, the first semiconductor element of the first control arrangement and the second semiconductor element of the first control arrangement are disposed generally along a first control arrangement axis; and the first semiconductor element of the second control arrangement and the second semiconductor element of the second control arrangement are disposed generally along a second control arrangement axis. The first control arrangement axis and the second control arrangement axis may be arranged at a non-zero angle (i.e., not parallel). In some examples, the first control arrangement axis and the second control arrangement axis may be arranged at about 90 degrees. Optionally, the first control element arrangement axis is generally perpendicular to the first axis. Optionally, the second control element arrangement axis is generally perpendicular to the second axis.

In some embodiments, the first and second semiconductor elements of the first control arrangement are biased in the same bias state. The bias state may be a forward-biased state or a non-biased state.

In some embodiments, the first and second semiconductor elements of the second control arrangement are biased in the same bias state. The bias state may be a forward-biased state or a non-biased state.

In a second aspect, there is provided an antenna comprising a metasurface structure of the first aspect. The antenna can include one or multiple ones of the metasurface structure of the first aspect.

In a third aspect, there is provided a metasurface antenna comprising: a waveguide operable to guide an electromagnetic wave, and a metasurface structure of the first aspect operably coupled with the waveguide. The metasurface structure is operable to modulate the electromagnetic wave and to radiate a modulated electromagnetic wave away from the waveguide. The metasurface antenna can include one or multiple ones of the metasurface structure of the first aspect.

In some embodiments, the metasurface structure is at least partly integrated with the waveguide.

In some embodiments, the waveguide comprises a substrate integrated waveguide.

In some embodiments, the substrate integrated waveguide comprises: a dielectric substrate, a first electrically conductive layer arranged on one side of the dielectric substrate, a second electrically conductive layer arranged in or on the dielectric substrate, a plurality of electrically conductive elements arranged in the dielectric substrate and electrically connecting the first electrically conductive layer and the second electrically conductive layer. The dielectric substrate may include one or more substrate layers. The second electrically conductive layer may be embedded in the dielectric substrate or arranged on another side of the dielectric substrate. The first electrically conductive layer may have even or uneven thickness. The second electrically conductive layer may have even or uneven thickness. The substrate layer(s) of the dielectric substrate may have even or uneven thickness. The plurality of electrically conductive elements may include metallic via-holes and/or metallic posts extending at least partly through the dielectric substrate. The metasurface structure is at least partly arranged on or in (e.g., etched in) the first electrically conductive layer. In some embodiments, the first and second slots of the plurality of subwavelength units of the metasurface structure are formed (e.g., etched) in or on the first electrically conductive layer.

In some embodiments, the plurality of electrically conductive elements are disposed in multiple rows (e.g., multiple generally parallel rows).

In some embodiments, each of the plurality of subwavelength units of the metasurface structure is respectively operably coupled with two or more of the electrically conductive elements.

In some embodiments, the second electrically conductive layer comprises a biasing circuit with a plurality of biasing circuit portions. Each of the plurality of biasing circuit portions is respectively operably coupled with a respective one the plurality of subwavelength units of the metasurface structure. The biasing circuit portions may bias the first and second semiconductor elements of the first control arrangement in the same bias state. The biasing circuit portions may bias the first and second semiconductor elements of the second control arrangement in the same bias state.

In some embodiments, the waveguide is operable to guide the electromagnetic wave, and the metasurface structure is operable to radiate the modulated electromagnetic wave away from the waveguide into free space.

In some embodiments, the waveguide is generally planar.

In some embodiments, the electromagnetic wave comprises an in-plane wave (e.g., in-plane guided wave), and the modulated electromagnetic wave comprises an out-of-plane wave (e.g., out-of-plane propagating wave).

In some embodiments, the first and second semiconductor elements of the first control arrangements and the first and second semiconductor elements of the second control arrangements of the plurality of subwavelength units of the metasurface structure are arranged to be controlled by a controller to respectively selectively operate in ON state and OFF state, to operate each respective one of the plurality of subwavelength units accordingly (e.g., radiating state and non-radiation state; first and second radiating states; etc.).

In a fourth aspect, there is provided a metasurface antenna system comprising the metasurface antenna of the third aspect, and a controller operably coupled with the metasurface antenna to control operation of the metasurface antenna. The controller may be the controller mentioned with reference to the first aspect and/or the controller mentioned with reference to the third aspect.

The controller may include, e.g., one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), and/or digital or analog circuitry/circuitries configured to interpret and/or to execute program instructions and/or to process signals and/or information and/or data. In some embodiments, the controller comprises one or more field-programmable gate arrays.

In some embodiments, the controller is operable to provide control signals to the subwavelength units, in particular their control arrangements/control elements, to affect operation of the subwavelength units.

In some embodiments, the controller is arranged (e.g., programmed) to provide a set of control signals to the plurality of subwavelength units of the metasurface antenna to spatiotemporally affect operation of the plurality of subwavelength units of the metasurface antenna, so as to facilitate manipulation or control of amplitude, phase, polarization, frequency, and/or momentum of electromagnetic waves. The set of control signals may providing multiple time-coding sequences that can enable or facilitate beam steering, focusing, data communication, etc.

In a fifth aspect, there is provided a device/system comprising the metasurface structure of the first aspect. The device/system may be a communication device/system, sensing device/system, imaging device/system, optical device/system, information handling (e.g., providing) device/system, information coding device/system, etc. The device/system may include one or multiple ones of the metasurface structure of the first aspect.

In a sixth aspect, there is provided a device/system comprising the antenna of the second aspect. The device/system may be a communication device/system, sensing device/system, imaging device/system, optical device/system, information handling (e.g., providing) device/system, information coding device/system, etc. The device/system may include one or multiple ones of the antenna of the second aspect.

In a seventh aspect, there is provided a device/system comprising the metasurface antenna of the third aspect. The device/system may be a communication device/system, sensing device/system, imaging device/system, optical device/system, information handling (e.g., providing) device/system, information coding device/system, etc. The device/system may include one or multiple ones of the metasurface antenna of the third aspect.

In an eighth aspect, there is provided a device/system comprising the metasurface antenna system of the fourth aspect. The device/system may be a communication device/system, sensing device/system, imaging device/system, optical device/system, information handling (e.g., providing) device/system, information coding device/system, etc. The device/system may include one or multiple ones of the metasurface antenna system of the fourth aspect.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for one or more of: manufacture tolerance, degradation, trend, tendency, imperfect practical condition(s), etc. For example, when a value is modified by terms of degree, such as "about", such expression may include the stated value ±15%, ±10%, ±5%, ±2%, or ±1%.

Unless otherwise specified, the terms "connected", "coupled", "mounted", or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which:

FIG. 53 is a table showing theoretical and measured |u⟩ and |u⟩ components for six representative polarizations obtained using the metasurface antenna of FIG. 4A in one example.

DETAILED DESCRIPTION

Figure 1:
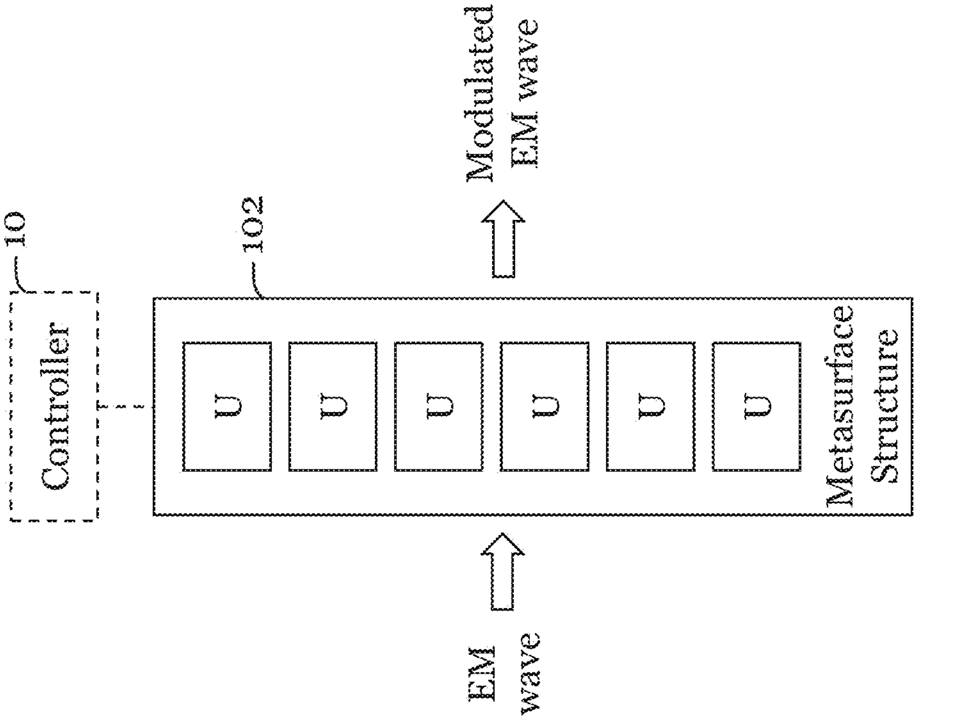
FIG. 1 is a schematic diagram of a metasurface structure for an antenna in some embodiments of the invention.

FIG. 1 shows a metasurface structure 102 for an antenna in some embodiments of the invention. The metasurface structure 102 includes multiple subwavelength units (e.g., meta-atoms, labeled as "U") operable to manipulate or control amplitude, phase, polarization, frequency, and/or momentum of electromagnetic waves for radiation. Depending on embodiments, the metasurface structure 102 may manipulate or control one, or two, or three, or four, or all of the five listed properties (amplitude, phase, polarization, frequency, and momentum). The metasurface structure 102 may be operably connected with a controller 10. The controller 10 may provide control signals to the metasurface structure 102 to facilitate the manipulation or control amplitude, phase, polarization, frequency, and/or momentum of electromagnetic waves by the metasurface structure 102.

In some embodiments, the metasurface structure 102 or the subwavelength units can selectively manipulate or control amplitude, phase, polarization, frequency, and/or momentum of electromagnetic waves. Depending on embodiments, the metasurface structure 102 may selectively manipulate or control one, or two, or three, or four of the five listed properties (amplitude, phase, polarization, frequency, and momentum) at a time.

In some embodiments, the metasurface structure 102 or the subwavelength units can dynamically manipulate or control amplitude, phase, polarization, frequency, and/or momentum of electromagnetic waves. Depending on embodiments, the metasurface structure 102 may dynamically manipulate or control one, or two, or three, or four of the five listed properties (amplitude, phase, polarization, frequency, and momentum).

In some embodiments, the metasurface structure 102 or the subwavelength units can simultaneously manipulate or control amplitude, phase, polarization, frequency, and/or momentum of electromagnetic waves. Depending on embodiments, the metasurface structure 102 may simultaneously manipulate or control two, or three, or four, or all of the five listed properties (amplitude, phase, polarization, frequency, and momentum).

In some embodiments, the metasurface structure 102 or the subwavelength units can independently manipulate or control amplitude, phase, polarization, frequency, and/or momentum of electromagnetic waves. Depending on embodiments, the metasurface structure 102 may independently manipulate or control at least two of the five listed properties (amplitude, phase, polarization, frequency, and momentum).

In some embodiments, the metasurface structure 102 or the subwavelength units can independently, simultaneously, and dynamically control at least two of the five listed properties (amplitude, phase, polarization, frequency, and momentum).

Each of the subwavelength units of the metasurface structure 102 may be selectively operable in (e.g., controlled by the controller 10 to operate in) different operation states to facilitate manipulation or control of the amplitude, phase, polarization, frequency, and/or momentum of electromagnetic waves. For example, each of the subwavelength units may be selectively operable in a radiating state (that radiates electromagnetic waves) and a non-radiating state (that does not radiate electromagnetic waves). For example, each of the subwavelength units may be selectively operable in a stronger radiating state and a weaker radiating state. The electromagnetic waves radiated by the various subwavelength units of the metasurface structure 102 may be combined in time and space to form a resultant electromagnetic wave.

In some embodiments, the subwavelength units of the metasurface structure 102 may are arranged in an array, such as a 1D array or a 2D array. For example, the subwavelength units may be generally aligned in one or more rows and one or more columns. The subwavelength units may be spaced apart evenly or unevenly.

The subwavelength units of the metasurface structure 102 may have generally the same construction. In some embodiments, each subwavelength units respectively include: at least two slots formed on or in an electrically conductive layer and each respectively operable to radiate electromagnetic waves, and respective control arrangements each operably coupled with a respective one of the at least two slots to facilitate control of operation of the corresponding slot selectively in a radiating state (that radiates electromagnetic waves) and a non-radiating state (that does not radiate electromagnetic waves).

In some examples, all of the at least two slots of the same subwavelength unit may be in the radiating state to radiate electromagnetic waves. In some examples, only one or some of the at least two slots of the same subwavelength unit may be in the radiating state to radiate electromagnetic waves. In some examples, all of the at least two slots of the same subwavelength unit may be in the non-radiating state. The control arrangements may be operably connected with hence controlled by the controller 10. In some embodiments, the at least two slots of the same subwavelength unit may have generally the same shape and/or size. For example, each of the at least two slots of the same subwavelength unit may be shaped as a loop, which may be generally elliptical, generally obround, generally oblong, generally oval, generally triangular, generally rectangular (e.g., squared), generally polygonal, etc. In some embodiments, each of the at least two slots of the same subwavelength unit may have different orientations. For example, one of the slots may extend generally along an axis and another one of the slots may extend generally along another axis that is at an angle (e.g., acute angle, right angle, etc.) to the axis. In one example, the angle is about 90 degrees. In some embodiments, each of the at least two slots of the same subwavelength unit may be operable to radiate electromagnetic waves with a respective polarization state. For example, one of the slots may be operable to radiate electromagnetic waves with a first eigen-polarization state (e.g., first linear polarization state) and another one of the slots may be operable to radiate electromagnetic waves with a second eigen-polarization state (e.g., second linear polarization state) orthogonal to the first eigen-polarization state. For each subwavelength unit, its control arrangements may each include at least two control elements operably coupled with the corresponding slot for affecting operation of the corresponding slot. The at least two control elements of the control arrangements may be controlled by the controller 10. For example, the controller may provide respective control signal to respective one of the control arrangement.

The control elements of the control arrangements may be semiconductor elements, each of which may be selectively operable in an ON state and an OFF state for affecting operation of the corresponding slot to which the control element is operably coupled with. In some examples, the semiconductor elements may be semiconductor diodes, such as PIN diodes. In some examples, the semiconductor elements of the same control arrangement in a subwavelength unit may be arranged (e.g., controlled by the controller 10) to operate simultaneously in either the ON state or the OFF state. In some embodiments, the semiconductor elements of the same control arrangement in a subwavelength unit are biased in the same bias state (e.g., a forward-biased state, a non-biased state, etc.). In some embodiments, each of the control elements may be respectively connected across a slot portion of its corresponding slot. For example, each slot may include two control elements each connected across a respective slot portion of the slot. The two slot portions may be arranged on opposite long sides of the slot shaped as a loop. In some embodiments, for each subwavelength unit, the two control elements of one of the slots is disposed generally along an axis (which, in some examples, is generally perpendicular to the axis along with the corresponding slot extends), and the two control elements of another one of the slots is disposed generally along another axis (which, in some examples, is generally perpendicular to the axis along with the corresponding slot extends) that is at an angle (e.g., acute angle, right angle, etc.) to the axis. In one example, the angle is about 90 degrees.

Figure 2:
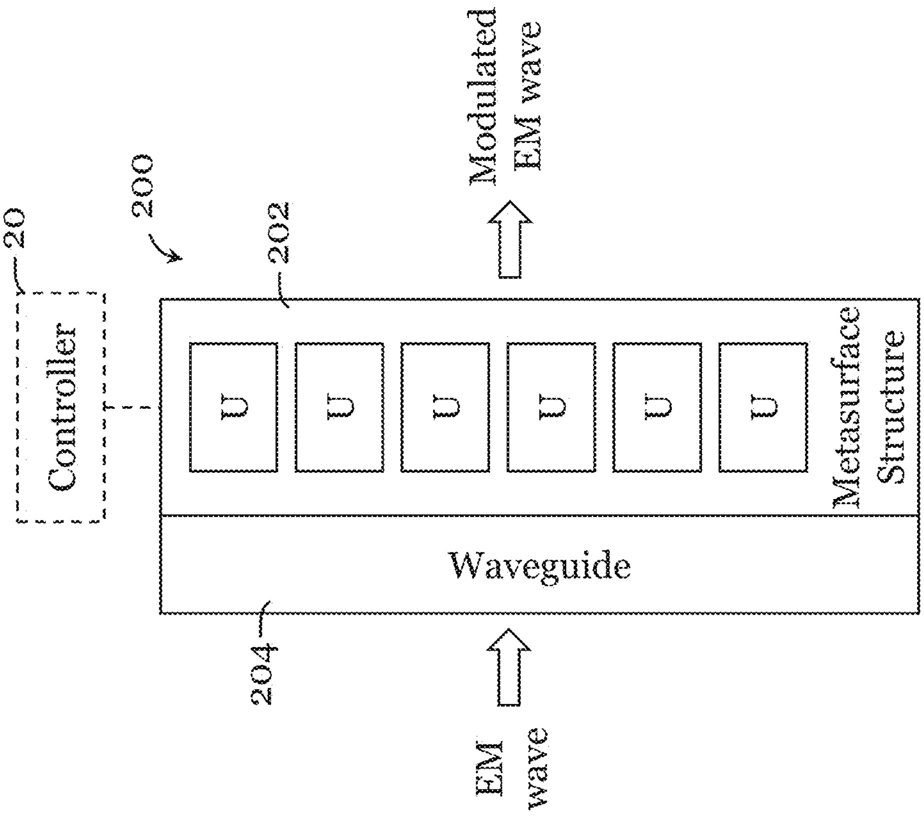
FIG. 2 is a schematic diagram of a metasurface antenna in some embodiments of the invention.

FIG. 2 shows a metasurface antenna 200 in some embodiments of the invention. The metasurface antenna 200 includes a metasurface structure 202 and a waveguide 204 operably coupled with the metasurface structure. In some embodiments, the metasurface structure 202 is the metasurface structure 102 of FIG. 1 (and the controller 20 may correspond to the controller 10 in FIG. 1). The waveguide 204 is operable to guide an electromagnetic wave and the metasurface structure 202 is operable to modulate the electromagnetic wave and to radiate a modulated electromagnetic wave.

In some embodiments, the waveguide 204 is operable to guide the electromagnetic wave, and the metasurface structure 202 is operable to radiate the modulated electromagnetic wave away from the waveguide into free space. For example, the electromagnetic wave may be an in-plane wave (e.g., in-plane guided wave), and the modulated electromagnetic wave may be an out-of-plane wave (e.g., out-of-plane propagating wave).

In some embodiments, the metasurface structure 202 may be at least partly integrated with the waveguide 204.

The waveguide 204 may be generally planar. The waveguide 204 may, e.g., be a substrate integrated waveguide. In some embodiments, the substrate integrated waveguide may include: a dielectric substrate, an electrically conductive layer arranged on one side of the dielectric substrate, another electrically conductive layer arranged in (e.g., embedded in) or arranged on (e.g., arrange don another side of) the dielectric substrate, multiple electrically conductive elements (vias fences, holes, posts, etc.) arranged in (e.g., extending at least partly through) the dielectric substrate and electrically connecting the two electrically conductive layers. The electrically conductive layers may each have even or uneven thickness. The dielectric substrate may have one or more layers, each with even or uneven thickness. The electrically conductive elements may be disposed in multiple rows (e.g., multiple generally parallel rows).

The metasurface structure 202 is at least partly arranged on or in (e.g., etched in) the electrically conductive layer arranged on the one side of the dielectric substrate. For example, the slots of the subwavelength units of the metasurface structure 202 may be formed (e.g., etched) in or on the electrically conductive layer. In some embodiments, each subwavelength unit of the metasurface structure 202 is respectively operably coupled with two or more of the electrically conductive elements (e.g., each slot operably coupled with at least one of the electrically conductive elements). The another electrically conductive layer may include a biasing circuit with multiple biasing circuit portions each respectively operably coupled with a respective subwavelength unit of the metasurface structure 202. The biasing circuit portion may bias the semiconductor elements of the same control arrangement in the corresponding subwavelength unit in the same bias state. In some embodiments, the semiconductor elements of the control arrangements of the subwavelength units of the metasurface structure 202 are arranged to be controlled by the controller 20 to respectively selectively operate in ON state and OFF state, to respectively operate each respective subwavelength unit of the metasurface structure 202.

Figure 3:
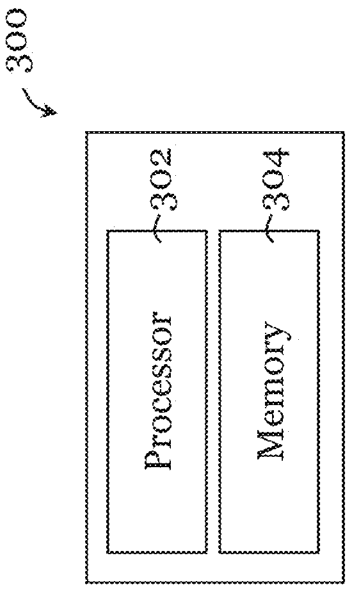
FIG. 3 is a block diagram of a controller in some embodiments of the invention.

FIG. 3 shows a controller 300 in some embodiments of the invention. The controller 300 may be used as the controller 10 in FIG. 1 or the controller 20 in FIG. 2.

The controller 300 generally includes suitable components operable to receive, store, and execute appropriate computer instructions, commands, and/or codes. The main components of the controller 300 are processor 302 and memory 304. The processor 302 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 304 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 304. Computer instructions for executing or facilitating executing the method embodiments of the invention may be stored in the memory 304. For example, control signals (e.g., space-time coding sequences, space-time-coding matrixes, space-time-coding films, etc.) for controlling the operation of the subwavelength units (e.g., their control elements) of the metasurface structure may be stored in the memory 304. In some embodiments, the processor 302 and memory (storage) 304 may be integrated (i.e., memory 304 embedded in the processor 302). In some embodiments, the processor 302 and memory (storage) 304 may be separated (and operably connected). The controller 300 may be operable to establish power and/or data communication with the metasurface structure, e.g., via one or more of: cable, bus, wire, electrical conductor arrangements, etc. A person skilled in the art would appreciate that the controller 300 shown in FIG. 3 is merely an example and that the controller 300 can have different configurations (e.g., include additional components, etc.) in different embodiments.

The controller 300 may be part of a computing system, computing device, etc. It will also be appreciated that where the methods and systems of the invention are either wholly implemented by computing system or partly implemented by computing system then any appropriate computing system architecture may be utilized. This may include, e.g., stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

The following disclosure provides concerns some embodiments of the invention which relate to a metasurface antenna operable to manipulate fundamental characteristics of electromagnetic waves. These embodiments can be considered as a more specific implementation of the metasurface structure 102 of FIG. 1 and/or the metasurface antenna 200 of FIG. 2.

Inventors of the present invention have, through their research, devised that metasurfaces allow wave-matter interactions within an ultrathin artificial surface, thus provides a paradigm shift for EM-wave manipulations. Also, metasurfaces may manipulate the fundamental properties of electromagnetic (EM) waves and hence may potentially revolutionize various EM-wave based applications such as optics, telecommunications, material engineering, quantum systems, etc. That said, inventors of the present invention have appreciated that simultaneous and independent controls over multiple ones of, and in particular all of, the fundamental properties of EM waves with high integrability and/or programmability is challenging. Inventors of the present invention believe that there is a need to provide a "universal" metasurface that enables simultaneous and independent controls some and preferably over all of the fundamental properties of EM waves.

Inventors of the present invention have, through their research, realized that a metasurface that can manipulate all of the fundamental properties of EM waves remains elusive due to various challenges. For example, most existing metasurfaces are passive in which their functionalities are set and cannot be altered once fabricated. Yet, many modern wave-empowered applications such as communications, holographic displays, light detection and ranging (LiDAR), etc., require dynamic and active controls for environment adaptation and/or information processing. For example, while some tunable metasurfaces integrated with active functional materials have been explored to achieve dynamic wave controls upon the external stimuli (including electrical bias, mechanical deformation, optical pumping, and/or thermal excitation), most of these tunable metasurfaces can control only one or two wave properties due to insufficient degrees of freedom in the geometrical parameters of the elements and the external control variables to support regulation of all of the fundamental properties. For example, independent wave properties manipulations may be difficult as the controls over these fundamental properties of EM wave are generally coupled with each other. While unique geometric structures and co-optimization with active materials may be adopted to decouple, e.g., amplitude and phase regulations, the design complexity and insertion loss are amplified geometrically with the increase of the control degrees of freedom.

Inventors of the present invention have, through their research, become aware that spatiotemporally modulated metasurface (STMM) is a technique that may be used to engineer EM waves in both space and time. Specifically, spatiotemporally modulated metasurface may add a time dimension into conventional metasurface design, to enable various physical phenomena and wave manipulations in frequency-momentum spaces. However, to date, only limited controls are validated for spatiotemporally modulated metasurfaces. Inventors of the present invention have realized that existing spatiotemporally modulated metasurface techniques may not be used to enable control of all fundamental properties of EM waves using a radiation aperture, in particular to realize simultaneously and independently programmable radiation characteristics.

The following embodiments of the invention concern a universal metasurface antenna operable to control all of the five fundamental properties of radiated EM waves, dynamically, simultaneously, independently, and precisely. In some embodiments, the universal metasurface antenna that can control all of the fundamental properties of radiated EM waves may operate to control only one or more of the fundamental properties of radiated EM waves. In some embodiments, the universal metasurface antenna may further facilitate spatial- and time-varying wave properties, hence enable generation of more complicated waveform, beamforming, direct information manipulations, etc. In some embodiments, the universal metasurface antenna can directly generate modulated EM waves that carry digital information, thus may fundamentally simplify the architecture of information transmission systems. In some embodiments, all wave manipulations and information modulations are achieved via spatiotemporally switching the ON-OFF coding states of the meta-atoms (subwavelength units) of the metasurface antenna. The metasurface antenna in these embodiments may provide improved EM wave and information manipulation capabilities, which may be particularly useful in applications such as next-generation wireless systems, cognitive sensing, imaging, quantum optics, quantum information science, etc.

Figure 4B:
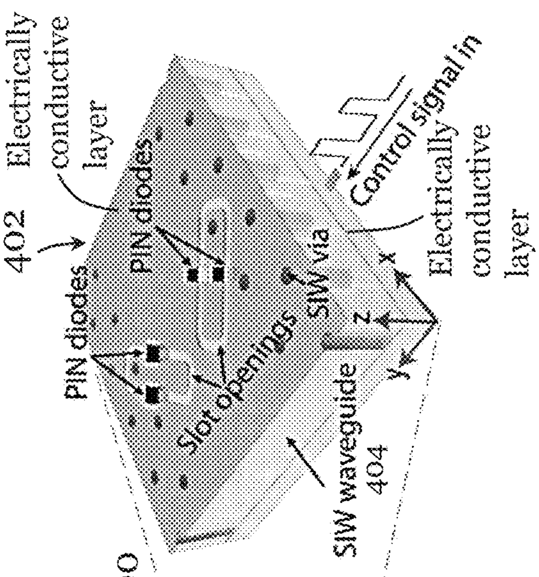
FIG. 4B is a zoomed-in view of part of the metasurface antenna of FIG. 4A, illustrating an anisotropic meta-atom of the metasurface antenna.
Figure 4A:
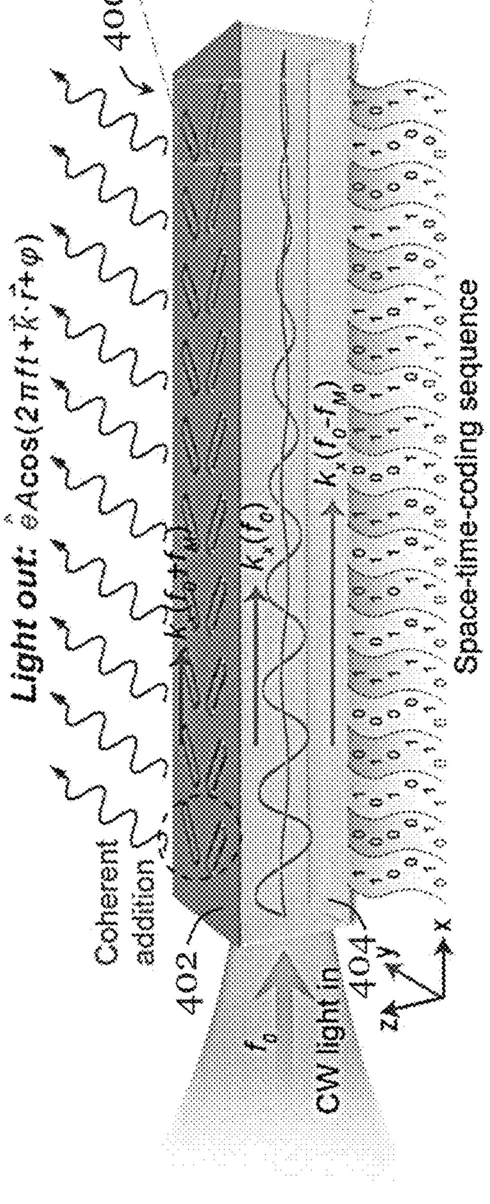
FIG. 4A is a schematic diagram of a metasurface antenna in one embodiment of the invention.

FIG. 4A shows a metasurface antenna 400 in one embodiment of the invention. FIG. 4B shows part of the metasurface antenna 400 of FIG. 4A in greater detail.

In this embodiment, the metasurface antenna 400 generally includes a substrate integrated waveguide 404 and a metasurface structure 402 operably coupled with the substrate integrated waveguide 404. The substrate integrated waveguide 404 is operable to receive and guide an in-plane electromagnetic wave (guided wave). The metasurface structure 402 is arranged to extract and modulate the in-plane electromagnetic wave, and radiate an out-of-plane modulated electromagnetic wave (propagating wave). In this embodiment, the metasurface structure 402 is integrated with the substrate integrated waveguide 404.

In this embodiment, as best shown in FIG. 4B, the substrate integrated waveguide 404 includes a dielectric substrate, an upper electrically conductive layer arranged on top of the dielectric substrate, a lower electrically conductive layer embedded in the dielectric substrate, and multiple parallel rows of metallic via holes arranged in the dielectric substrate and electrically connecting the two electrically conductive layers.

In this embodiment, the metasurface structure 402 includes multiple subwavelength units (i.e., meta-atoms) operable to manipulate or control amplitude, phase, polarization, frequency, and momentum of electromagnetic waves for radiation. As the metasurface structure 402 may manipulate or control all of these properties of electromagnetic waves, the metasurface antenna 400 may be referred to as a universal metasurface antenna 400. In this example, the metasurface structure 402 may independently, simultaneously, and dynamically manipulate or control two or more of the amplitude, phase, polarization, frequency, and momentum of electromagnetic waves for radiation. In one example, each of the plurality of subwavelength units may be selectively operable in a first operation state and a second operation state (e.g., a radiating state and a non-radiating state, or a stronger radiating state and a weaker radiating state) to facilitate manipulation or control of the amplitude, phase, polarization, frequency, and/or momentum of electromagnetic waves.

As shown in FIG. 4A, the subwavelength units are generally aligned to form an array, and they have generally the same construction. Specifically, each of the subwavelength units respectively includes: two generally rectangular loop-shaped slots etched in the upper electrically conductive layer of the substrate integrated waveguide 404, two PIN diodes operably coupled with one of the generally rectangular loop-shaped slots, and two other PIN diodes operably coupled with another one of the generally rectangular loop-shaped slots. The PIN diodes operably coupled with the corresponding rectangular loop-shaped slot may facilitate control of operation of the slot selectively in a radiating state (in which it radiates electromagnetic waves) and a non-radiating state (in which it does not radiate electromagnetic waves).

The two rectangular loop-shaped slots of the same subwavelength unit have generally the same shape and size but different orientations. Specifically, one of the slots extend generally along an axis and another one of the slots extend generally along another axis. The two axes are arranged at about 90 degrees. The two rectangular loop-shaped slots may be operable to radiate electromagnetic waves with orthogonal eigen-polarization state (each slot operable to radiate electromagnetic waves with a respective eigen-polarization state). For each of the two rectangular loop-shaped slots, the corresponding two PIN diodes are connected across two opposite slot portions on the opposite long sides of the corresponding slot. In this example, the two PIN diodes of one of the generally rectangular loop-shaped slots is disposed generally along a first axis (which is generally perpendicular to the extension axis of the corresponding slot) and the two PIN diodes of another one of the generally rectangular loop-shaped slots is disposed generally along a second axis (which is generally perpendicular to the extension axis of the corresponding slot). The first and second axes are generally perpendicular.

The PIN diodes are controllable by control signals (e.g., space time coding sequence of "0" and "1") provided by a controller such as field-programmable gate array(s) (not shown). Specifically, in this embodiment, the PIN diodes are each selectively operable in an ON state and an OFF state, for affecting operation of the corresponding slot to which they are operably coupled. The two PIN diodes of the same slot may be controlled by the same control signal or otherwise arranged to operate simultaneously in either the ON state or the OFF state, thus selectively operating the corresponding slot in either the radiating state or the non-radiating state. The PIN diodes of the same slot may be biased by a biasing circuit (or a portion of it) to the same bias state (forward-biased, no bias, etc.). In this embodiment, the biasing circuit is formed or arranged in the lower electrically conductive layer of the substrate integrated waveguide 404.

The following description provides further details on various aspects or example operations of the metasurface antenna 400. As used herein, the metasurface antenna 400 may be referred to as a universal metasurface antenna 400.

The following description makes reference to the various Figures in an order different from the order as the Figures appear. Thus, for ease of presentation, some brief description of the various Figures is provided before further description is provided.

Figure 5:
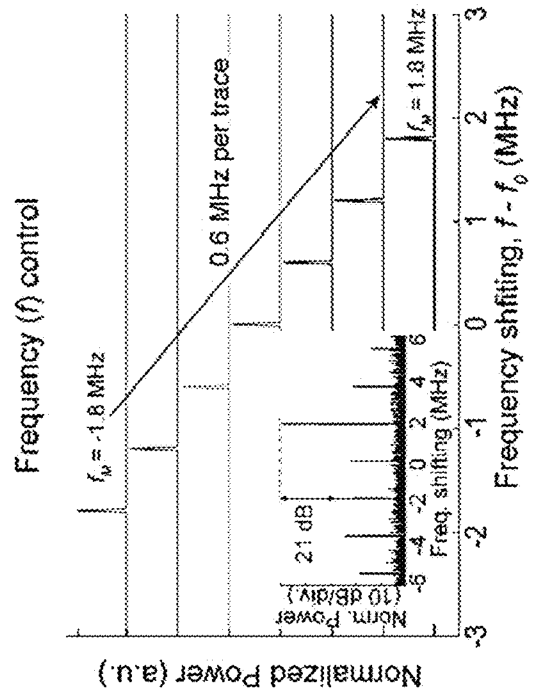
FIG. 5 is a graph showing measured frequency shifting of the metasurface antenna of FIG. 4A at different modulation frequencies in one example.

FIGS. 4A to 9 generally relate to the universal metasurface antenna 400 arranged for independent controls of all fundamental EM wave properties. Specifically, FIG. 4A shows the universal metasurface antenna 400. Briefly, as shown in FIG. 4A, slot-opening based meta-atoms are arranged at the top of the substrate integrated waveguide 404 to convert the guided wave into propagating wave with software-defined properties. 1-bit "0/1" space-time-coding sequences are applied to switch the meta-atoms between radiating ("1") and non-radiating ("0") states, thus controlling the fundamental properties of the radiated wave. In this example, only the momentum of the target harmonic frequency (m=+1 harmonic in this example) matches with that of free space; other unwanted higher-order harmonics are suppressed in both the waveguide and free space without phase-matching. FIG. 4B shows the configuration of the anisotropic meta-atom, which includes two ±45°-inclined loop-shaped slot openings each loaded with a pair of PIN diodes. FIG. 5 shows measured frequency shifting with different modulation frequencies. The inset in FIG. 5 shows the measured spectrum in dB scale with the modulation frequency of 1.8 MHz. FIGS. 6 to 9 illustrate manipulations of the EM wave properties by the universal metasurface antenna 400. Specifically, FIG. 6 relates to momentum control, FIG. 7 relates to phase control, FIG. 8 relates to amplitude control, and FIG. 9 relates to polarization control. In these examples, the controls are achieved by adjusting or tuning the time gradient $\partial t_i(x)/\partial x$, reference time shift $t_{i=1}$, duty cycle $\tau$, and time gradient and reference time shift for the $|u\rangle$, $|v\rangle$ polarizations, respectively. In these examples of FIGS. 6 to 9, the input frequency and modulation frequency are $f_0$=23.5 GHz and $f_M$=1.8 MHz, respectively.

Figure 10:
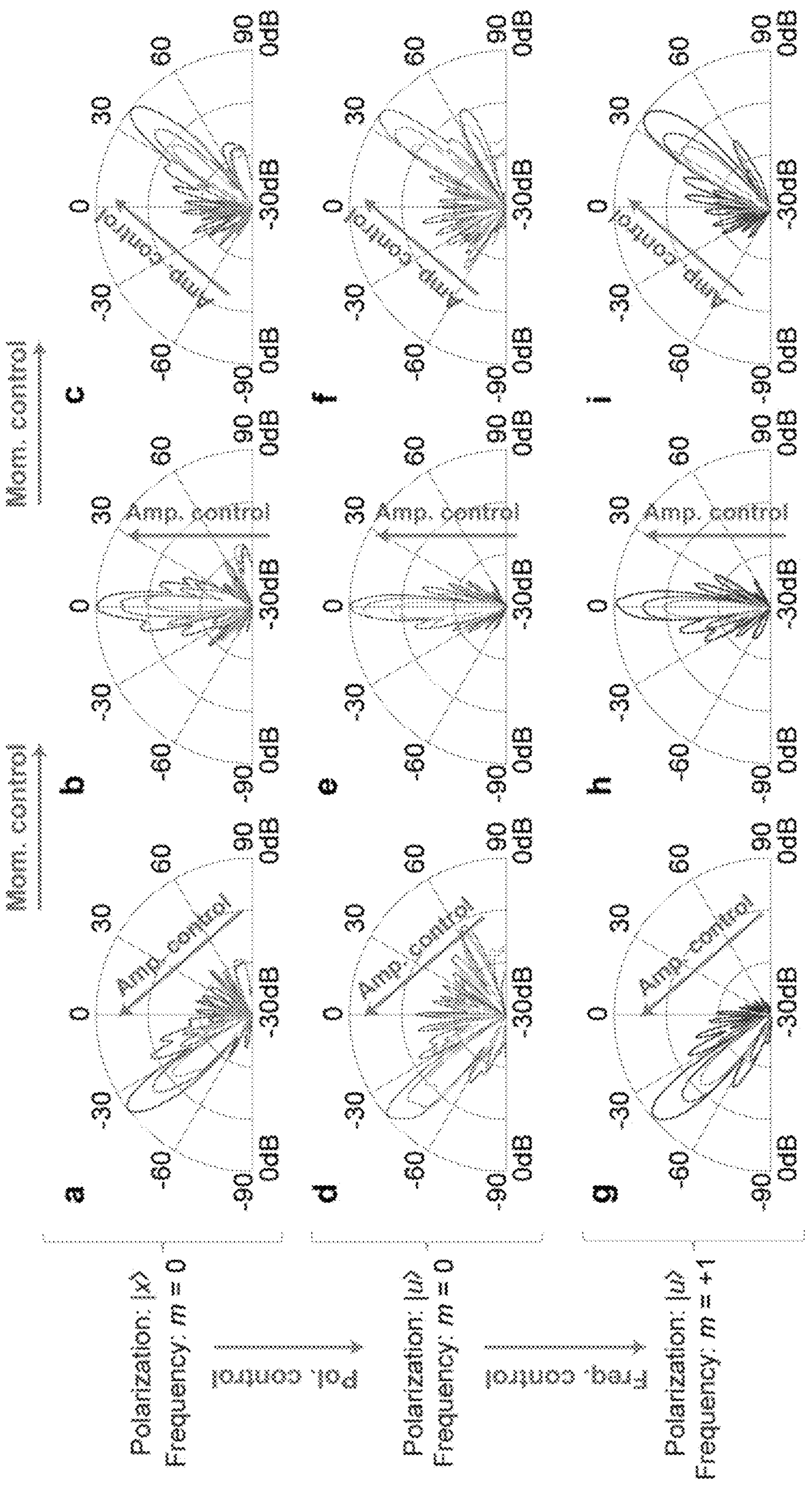
FIG. 10 is a schematic diagram illustrating simultaneous manipulation of EM wave properties using the metasurface antenna of FIG. 4A in one example.

FIG. 10 relates to the universal metasurface antenna 400 arranged for simultaneous manipulation of various properties of the radiated EM wave. FIG. 10 contains 9 plots arranged in 3 rows and 3 columns. Specifically, FIG. 10, in the first row plots a to c, shows the measured far-field radiation patterns of the universal metasurface antenna at the fundamental frequency with the $|x\rangle$ polarization, whose main beam scans to −40°, 0°, and 40°, respectively. FIG. 10, in the second row plots d to f, shows the measured far-field radiation patterns of the universal metasurface antenna at the fundamental frequency with the $|u\rangle$ polarization, whose main beam scans to −40°, 0°, and 40°. FIG. 10, in the second row plots g to i, shows the measured far-field radiation patterns of the universal metasurface antenna when the frequency of the extracted propagating wave is changed to the m=+1 harmonic, with the $|u\rangle$ polarization, whose main beam scans to −40°, 0°, and 40°. The three lines in each plots demonstrate the amplitude controls of the radiated propagating waves. In this example, the input frequency and modulation frequency are $f_0$=23.5 GHz and $f_M$=1.2 MHz, respectively.

Figure 11:
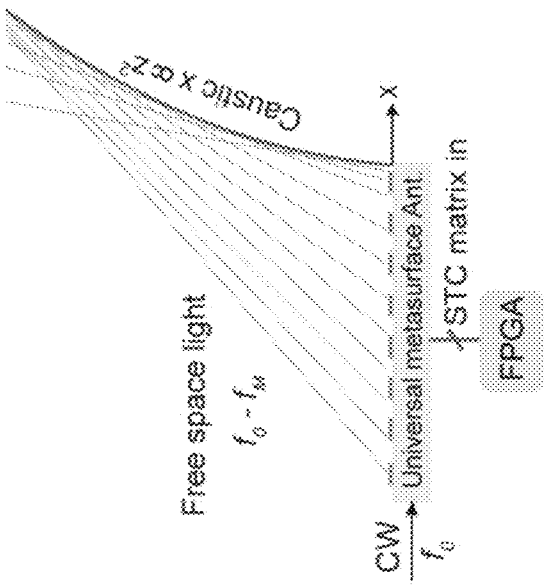
FIG. 11 is a schematic diagram illustrating generation of Airy beam at the m=−1 harmonic frequency in free space using the metasurface antenna of FIG. 4A.
Figure 12:
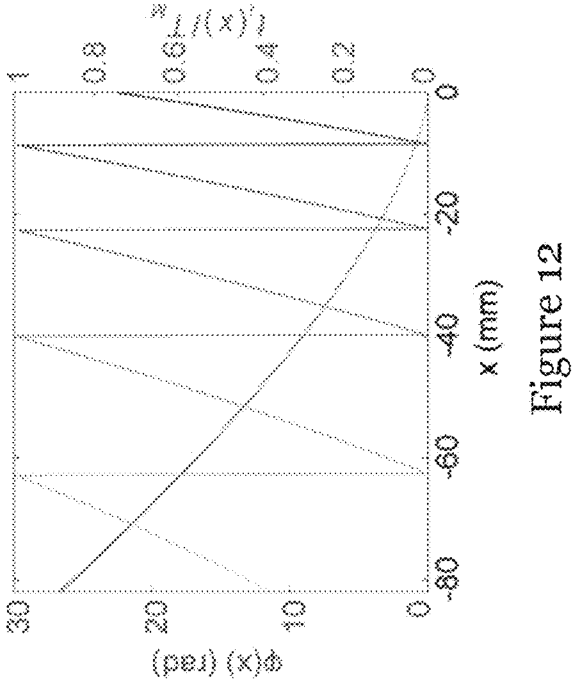
FIG. 12 is a graph showing a required aperture phase profile of the Airy wavefront and the corresponding normalized time shifting for the meta-atoms of the metasurface antenna of FIG. 4A at different positions in one example.
Figure 13:
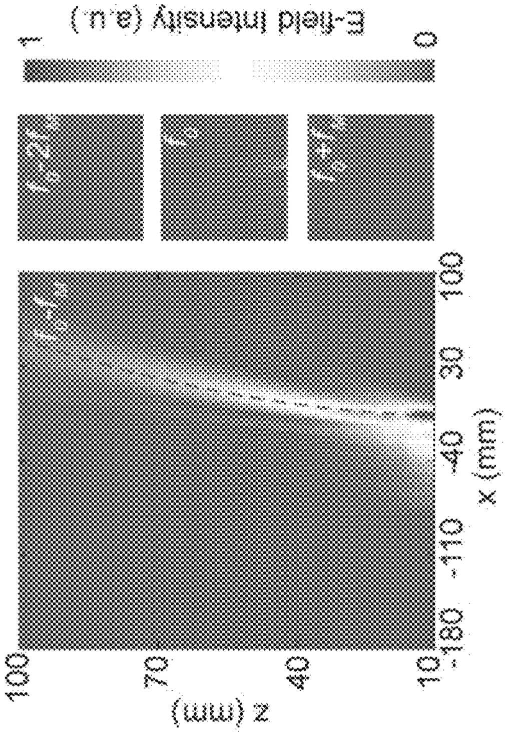
FIG. 13 is a graph showing measured E-field intensities in the xz-plane at different harmonic frequencies.
Figure 15:
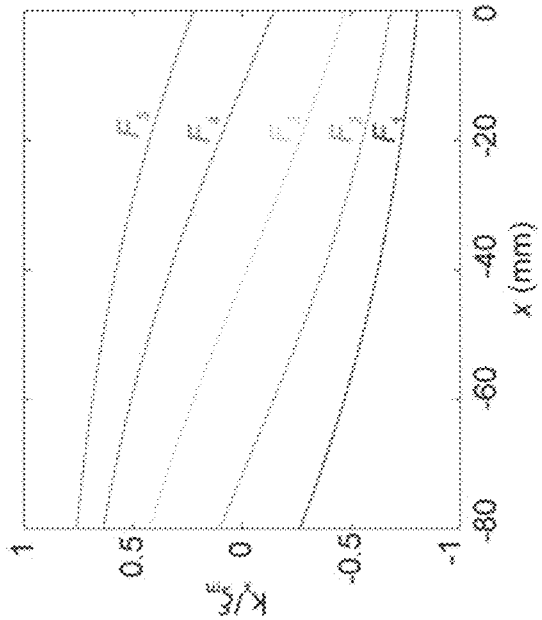
FIG. 15 is a graph showing the required normalized local momentum $k_x/\xi_m$ as a function of the meta-atom position of the metasurface antenna of FIG. 4A for different focal spot positions from $F_1$ to $F_5$ in one example, where $F_1$=(−100 mm, 80 mm), $F_2$=(−70 mm, 80 mm), $F_3$ (−40 mm, 80 mm), $F_4$ (−10 mm, 80 mm), $F_5$ (20 mm, 80 mm)
Figure 14:
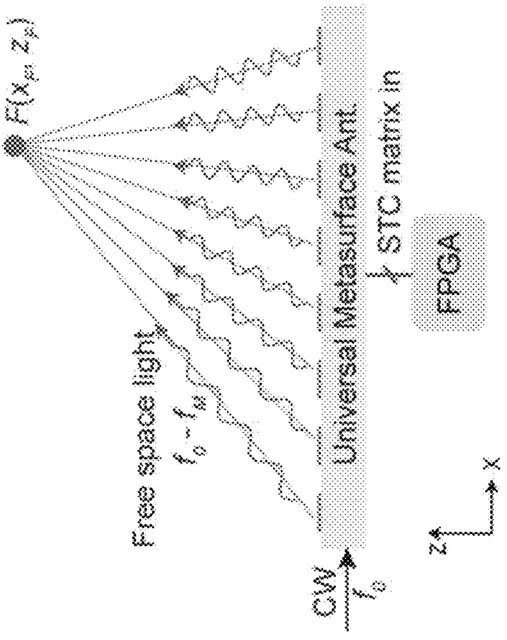
FIG. 14 is a schematic diagram illustrating focusing of light (EM wave) at the m=−1 harmonic frequency by the metasurface antenna of FIG. 4A in one example.
Figure 16:
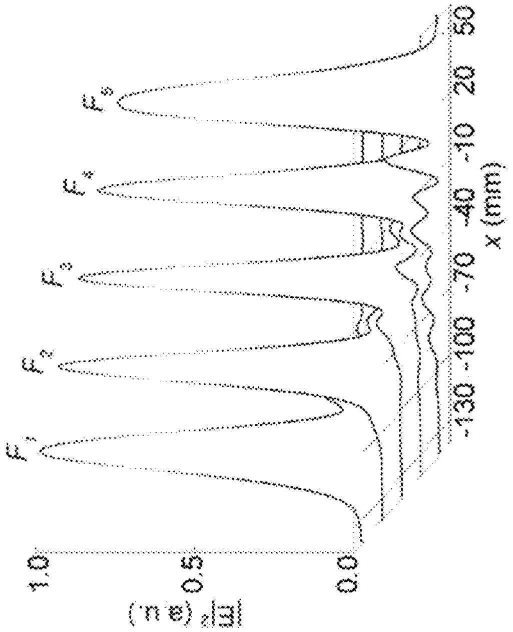
FIG. 16 is a graph showing measured E-field intensities at the m=−1 harmonic frequency along the line z=80 mm as the focal spot scans from $F_1$ to $F_5$ in one example.
Figure 17:
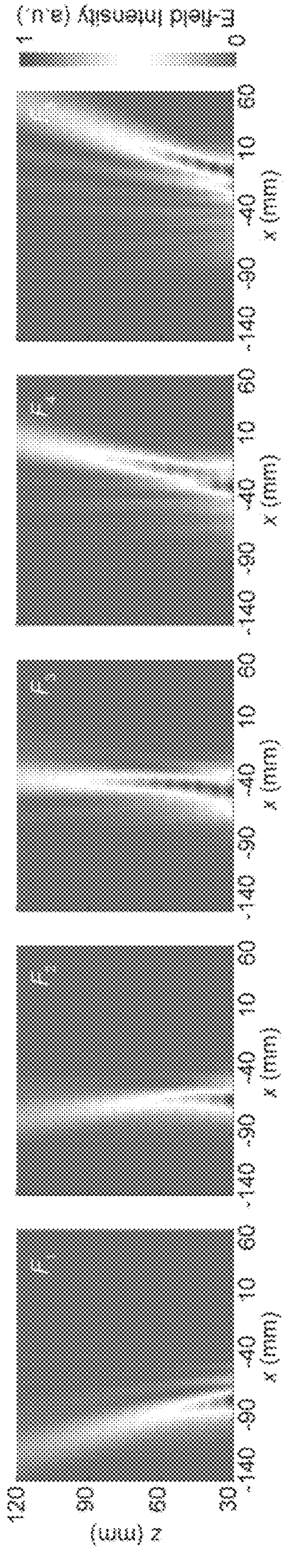
FIG. 17 are a series of plots illustrating corresponding measured E-field intensities in the xz-plane at the m=−1 harmonic frequency for the focus spots F1 to F5 in one example.

FIGS. 11 to 17 relate to the universal metasurface antenna 400 arranged for more-complicated beam shaping with the spatial-varying wave properties. Specifically, FIG. 11 shows the universal metasurface antenna 400 arranged for generating an Airy beam at the m=−1 harmonic frequency in free space. In this example, the Airy beam requires a spatial-varying phase profile as $4/3a^{1/2}\xi_m(-x)^{3/2}$. FIG. 12 shows the required aperture phase profile of the Airy wavefront and the corresponding normalized time shiftings for the meta-atoms of the metasurface antenna 400 at different positions. FIG. 13 shows the measured E-field intensities in the xz-plane at different harmonic frequencies. In FIG. 13, the dashed line represents the theoretical parabolic trajectory of the Airy beam $x=az^2$ (in this example, the acceleration factor a=0.003). Only the target m=−1 harmonic frequency possesses high field intensity; other harmonic frequencies are all highly suppressed in free space. FIG. 14 shows the universal metasurface antenna 400 arranged for light focusing at the m=−1 harmonic frequency. In this example, the local momentum or output angle of the extracted propagating waves from all meta-atoms of the metasurface antenna 400 are different. FIG. 15 shows the required normalized local momentum $k_x/\xi_m$ as a function of the meta-atom position for different focal spot positions from $F_1$ to $F_5$, where $F_1$=(−100 mm, 80 mm), $F_2$=(−70 mm, 80 mm), $F_3$ (−40 mm, 80 mm), $F_4$ (−10 mm, 80 mm), and $F_5$ (20 mm, 80 mm). FIG. 16 shows the measured E-field intensities at the m=−1 harmonic frequency along the line z=80 mm as the focal spot scans from $F_1$ to $F_5$. FIG. 17 shows the corresponding measured E-field intensities in the xz-plane at the m=−1 harmonic frequency for different focus spots $F_1$ to $F_5$.

Figure 18:
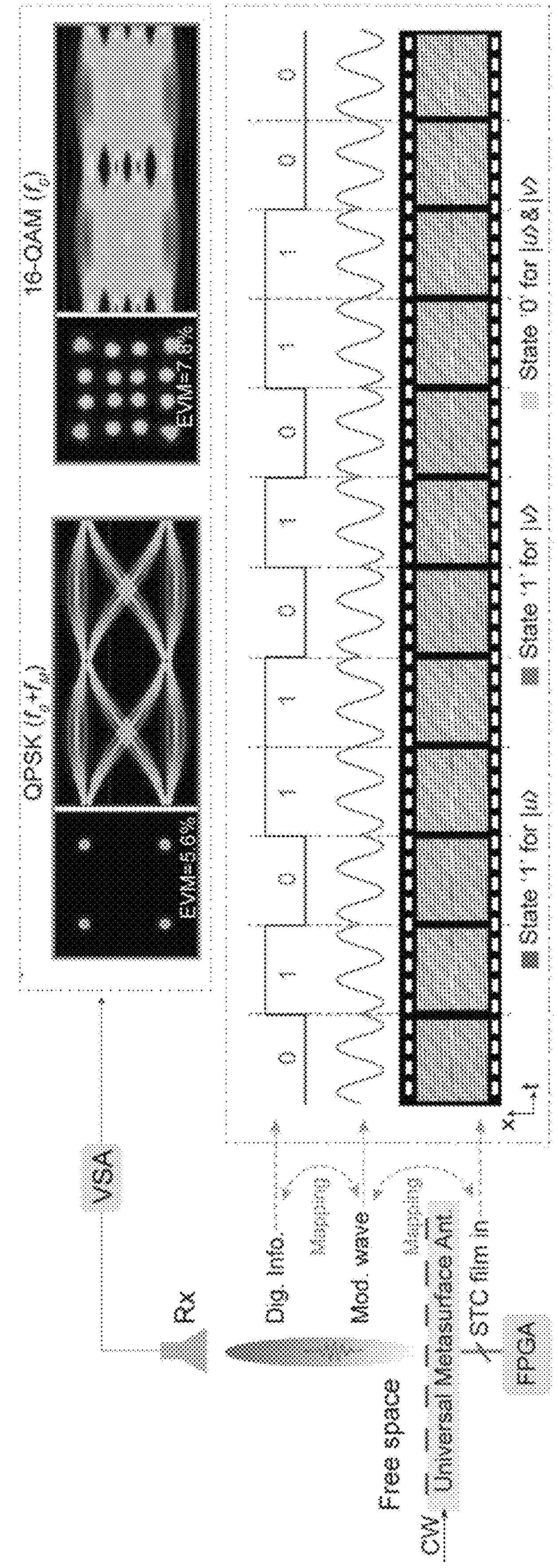
FIG. 18 is a schematic diagram illustrating direct generation of information-carried EM waves in free space using the metasurface antenna of FIG. 4A in one example.
Figure 19:
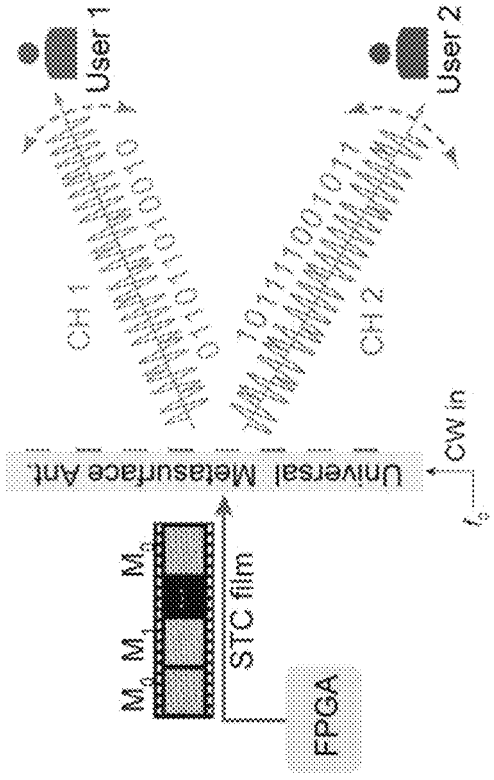
FIG. 19 is a schematic diagram illustrating direct generation of two independently modulated EM waves carrying different digital data streams using the metasurface antenna of FIG. 4A in one example.
Figure 20:
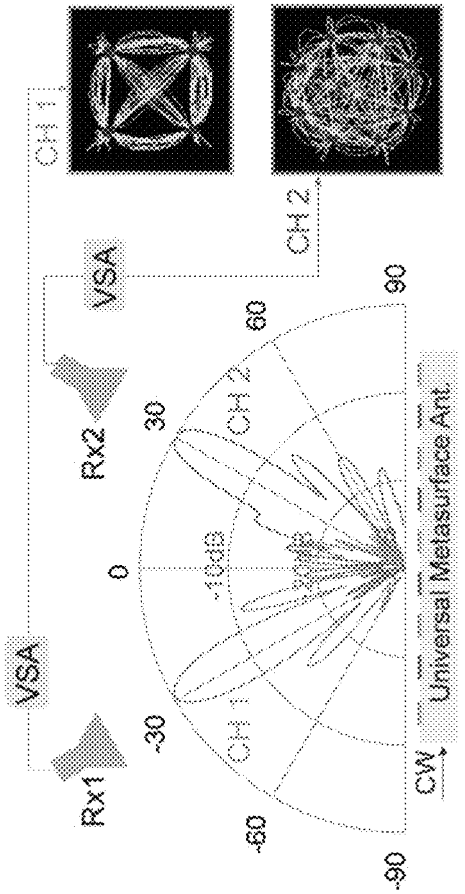
FIG. 20 is a schematic diagram illustrating corresponding measured radiation patterns of the metasurface antenna of FIG. 4A at the m=−1 (CH1) and m=−2 (CH2) harmonic frequencies in one example.
Figure 21:
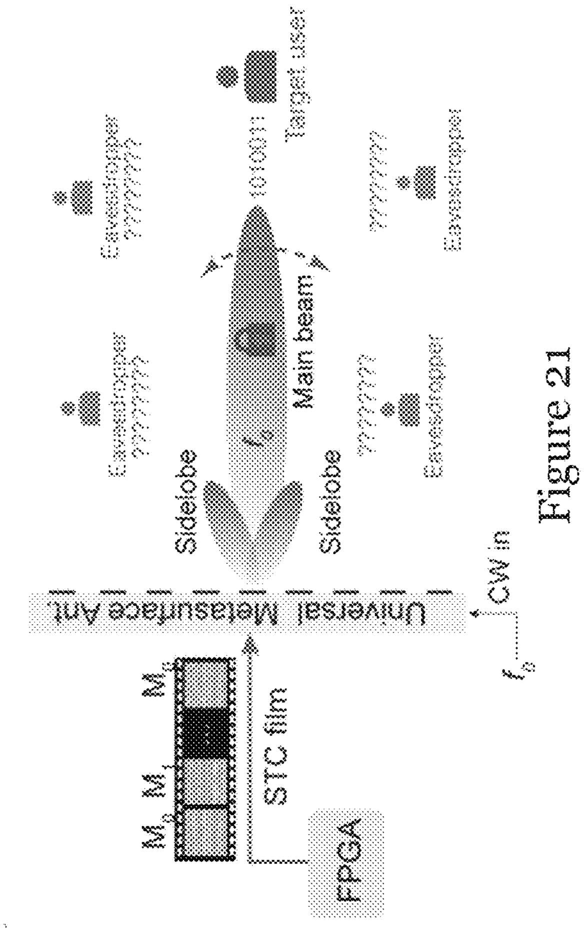
FIG. 21 is a schematic diagram illustrating the inherent direction modulation property at the fundamental frequency using the metasurface antenna of FIG. 4A in one example.
Figure 37:
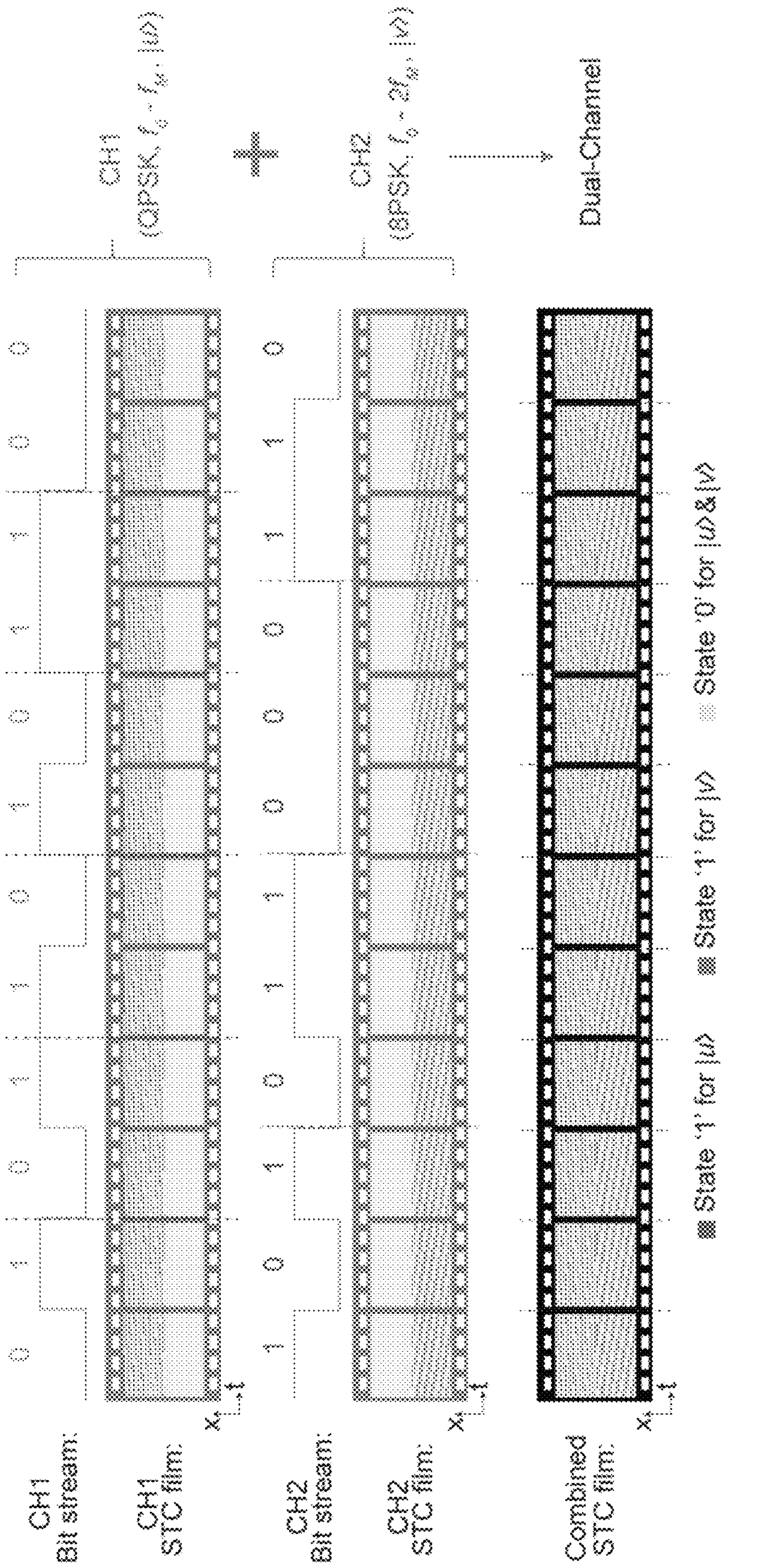
FIG. 37 is a schematic diagram illustrating a synthesis process of the STC film for dual-channel wireless communications in one example.

FIGS. 18 to 22 relate to the universal metasurface antenna 400 arranged for information modulations with the time-varying wave properties. Specifically, FIG. 18 shows the universal metasurface antenna 400 used to directly generate the information-carried EM waves in free space. FIG. 18 also shows the measured decoded constellation diagrams and eye diagrams at the receiver end with QPSK at the m=+1 harmonic frequency (left) and 16QAM at the fundamental frequency (right), as well as the one-to-one mapping relationship among the transmitted digital information stream, the radiated information-carried waves in the free space (2PSK in this example), and the applied animate STC matrices (STC films) for communications at the m=+1 harmonic frequency. The required STC films for other modulation schemes and at the fundamental frequency are presented in FIGS. 34 and 35. FIG. 19 illustrates the universal metasurface antenna 400 arranged for directly generating two independently modulated waves carrying different digital data streams. Two designated users at different locations can simultaneously and independently receive the information from the universal metasurface antenna. In this example, the required STC films for multi-channels are shown in FIG. 37. FIG. 20 shows the measured radiation patterns of the universal metasurface antenna 400 at the m=−1 (CH1) and m=−2 (CH2) harmonic frequencies. The insets on the right in FIG. 20 present the measured decoded constellation diagrams of the two channels at the receiver end. More results about multiplexing in different beam directions are presented in FIGS. 38 and 39. FIG. 21 illustrates the universal metasurface antenna 400 with the inherent direction modulation property at the fundamental frequency. In this example, only the target user in the main beam direction can successfully decode the information, whereas eavesdroppers at other positions totally lose the information. FIG. 21 shows the measured radiation pattern of the universal metasurface antenna, and the measured decoded constellation diagrams when the receiver is located in different directions. The physical-layer security communication link for other main-beam directions is validated in FIGS. 44 to 47. In FIGS. 18 to 22, "CW" means continuous wave; "Dig. Info." means digital information; "Mod" means modulated; "Ant." means antenna; "VSA" means vector signal analyzer; "CH" means channel; "EVM" means error vector magnitude.

Figure 23:
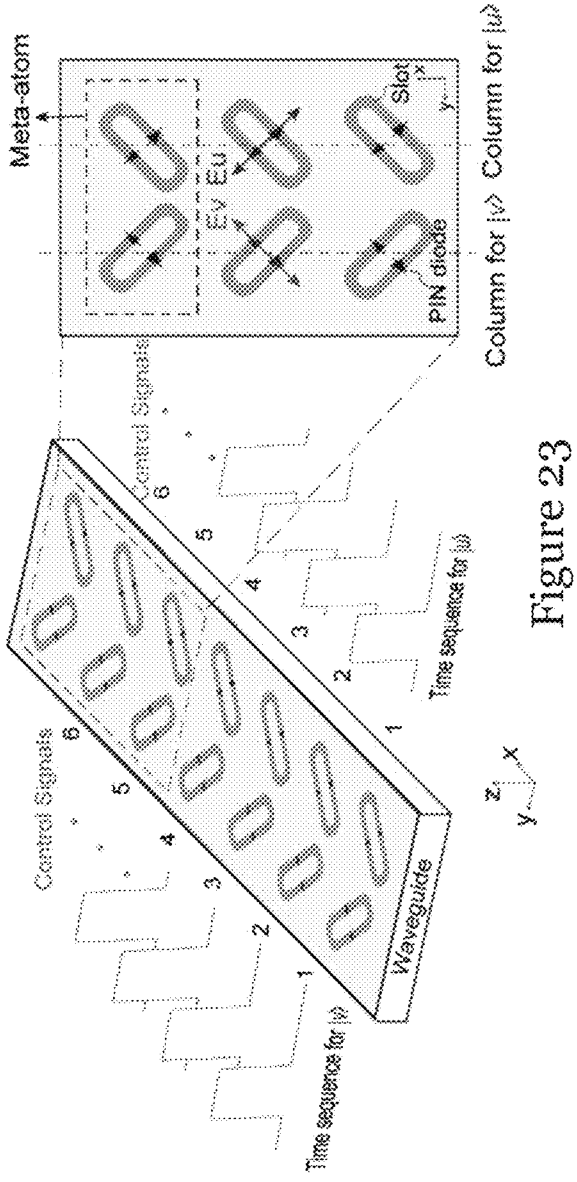
FIG. 23 is a schematic diagram illustrating a configuration of the metasurface antenna of FIG. 4A in one example.
Figure 24:
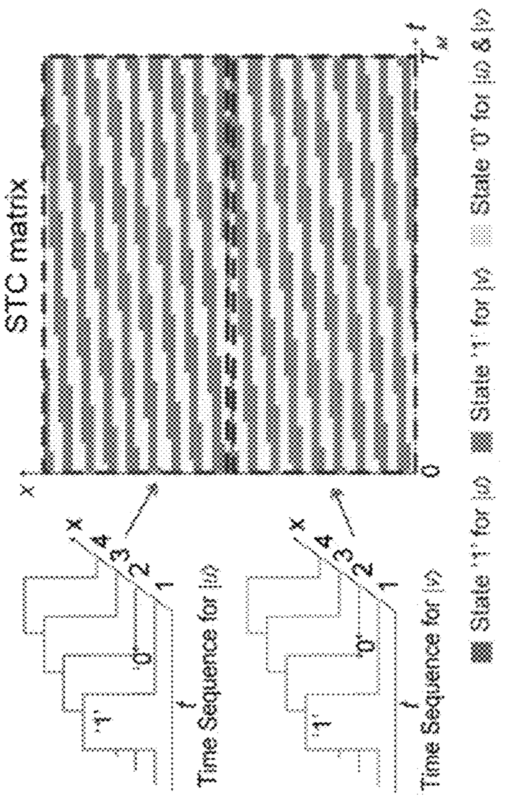
FIG. 24 is a schematic diagram illustrating a formulation of a "0/1" space-time-coding (STC) matrix representing radiating and non-radiating states of the meta-atoms of the metasurface antenna of FIG. 4A in one modulation period in one example.
Figure 25:
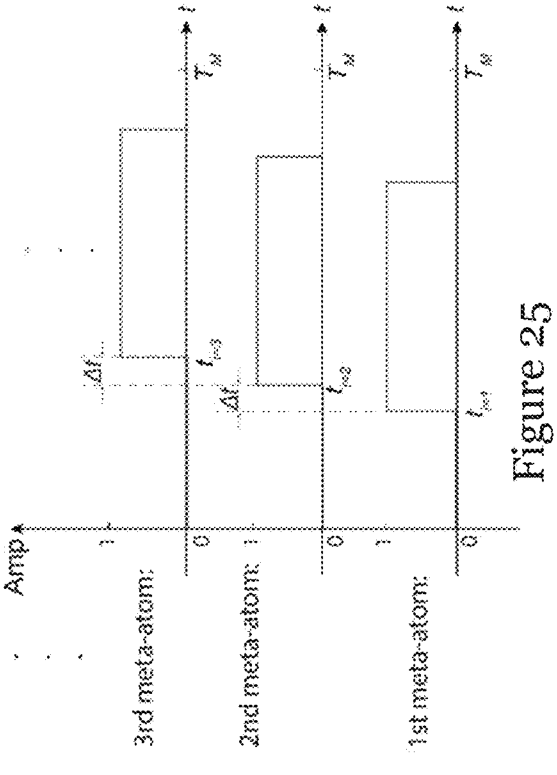
FIG. 25 is a schematic diagram illustrating time sequence for each meta-atom of the metasurface antenna of FIG. 4A with a time shift $t_i$ in one example.
Figure 26:
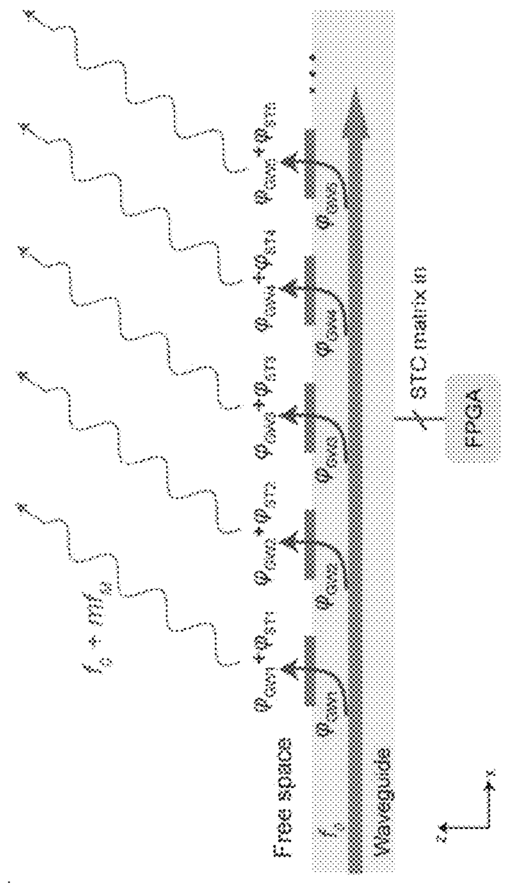
FIG. 26 is a schematic diagram illustrating operation principle of the metasurface antenna of FIG. 4A for wavefront manipulation at harmonic frequencies in one example.

FIGS. 23 to 26 relate to the universal metasurface antenna 400 arranged for wave manipulations with frequency shifting. Specifically, FIG. 23 shows the configuration of the universal metasurface antenna 400 with a meta-atom array located on the top of the waveguide. In this embodiment, each meta-atom includes two ±45°-inclined slot openings to radiate two orthogonal eigen-polarization $|u\rangle$ and $|v\rangle$ states. PIN diodes, controlled by the external control signals from FGPA, are embedded into each slot opening to switch the meta-atom between the radiating (coding element "1") and non-radiating (coding element "0") states in real time. FIG. 24 shows the formulation of the "0/1" STC matrix, representing the radiating/non-radiating states of all the meta-atoms at one modulation period. Each inclined slot opening has its own independent time-coding sequence. The STC matrix includes two parts: the upper and lower parts correspond to slot-opening columns for $|u\rangle$ and $|v\rangle$ polarization radiations, respectively. FIG. 25 shows the time sequence for each meta-atom with a time shift $t_i$. FIG. 26 shows the operation principle of the universal metasurface antenna 400 for wavefront manipulation at harmonic frequencies. The total phase shift of the extracted wave includes two parts: the phase accumulation due to the propagation of the guided wave $\varphi_{GW}=-\xi_{GW}x_i$, and the abrupt phase shift induced by the spatiotemporal modulation $\varphi_{ST}=-2\pi m f_M t_i(x)$. The time shifts applied to the meta-atoms can control the momentum and phase at the target harmonic frequency.

Figure 27:
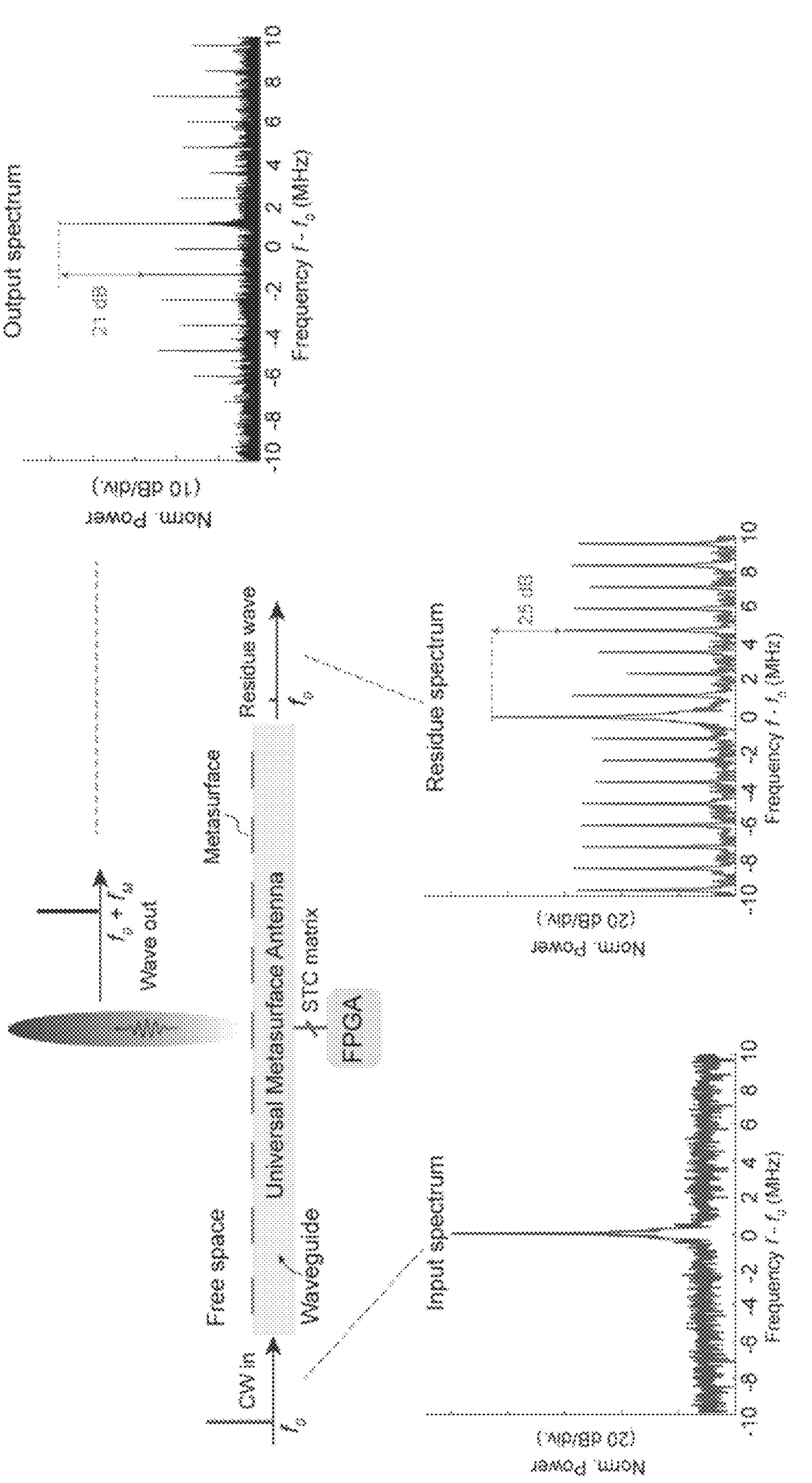
FIG. 27 is a schematic diagram illustrating frequency shifting by the metasurface antenna of FIG. 4A in one example.

FIG. 27 relates to the universal metasurface antenna 400 arranged for frequency shifting. Specifically, FIG. 27 shows the universal metasurface antenna 400 up-converts the input frequency $f_0$ to $f_0+f_M$ in free space. In this example, the input frequency and modulation frequency are $f_0=23.5$ GHz and $f_M=1.2$ MHz respectively. FIG. 27 also shows the measured input spectrum and the residual spectrum of the waveguide, and the output spectrum in free space. In this example, the harmonic frequencies inside the waveguide and free space are suppressed by as much as 25 dB and 21 dB below the fundamental frequency, respectively, due to the large momentum mismatch inside the waveguide and free space. The residual power of the waveguide at the fundamental frequency is 14.7 dB below the input one due to the guided-wave-to-propagating-wave conversion of the metasurface antenna.

Figure 28:
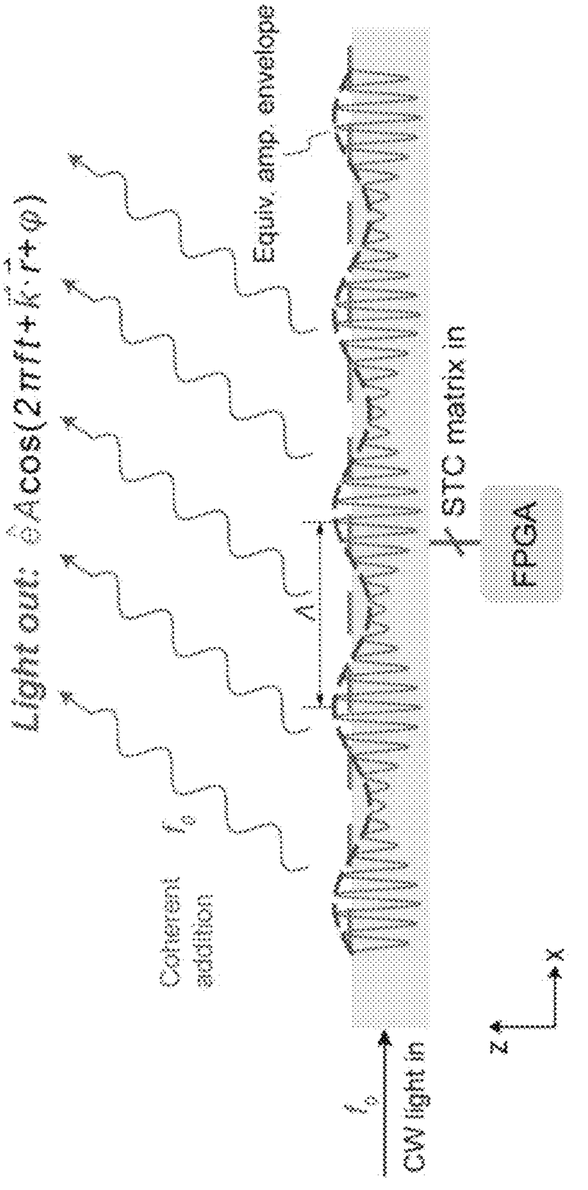
FIG. 28 is a schematic diagram illustrating guided wave to propagating wave translation at the fundamental frequency (m=0) by the metasurface antenna of FIG. 4A in one example.
Figure 29:
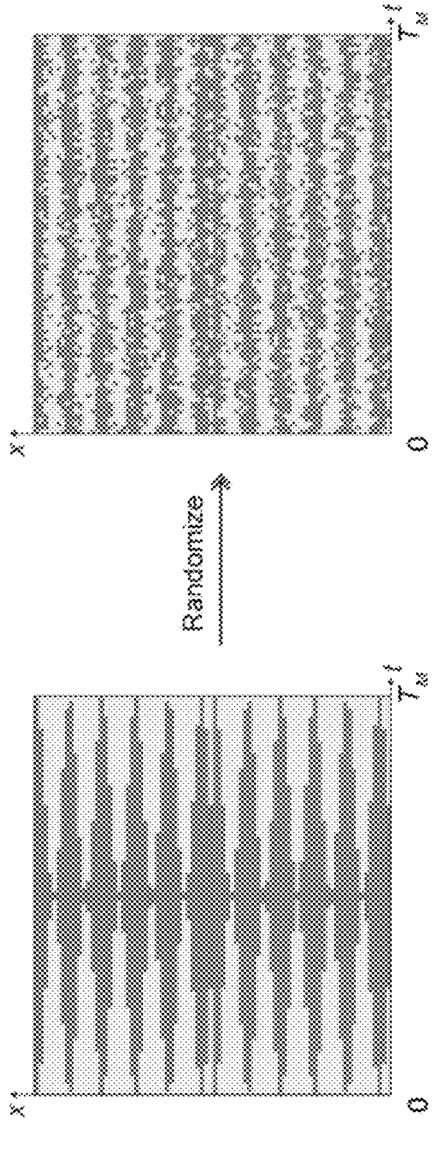
FIG. 29 is a schematic diagram illustrating randomization of a STC matrix for suppressing higher-order harmonic frequencies in one example.

FIGS. 28 to 33 relate to the universal metasurface antenna 400 arranged for wave manipulation without frequency shifting. Specifically, FIG. 28 shows the guided-wave-to-propagating-wave conversion or translation at the fundamental frequency (m=0). In this example, spatiotemporal modulation forms an equivalent sinusoidal amplitude envelope along the length of the metasurface aperture of the metasurface antenna 400. The n=−1 space harmonic becomes fast and radiates into free space with arbitrary software-defined wave properties. FIG. 29 shows the randomization of the STC matrix to suppress higher-order harmonic frequencies. FIGS. 30 to 33 illustrate independent EM wave properties manipulation at the fundamental frequency. Specifically, FIG. 30 relates to polarization control, FIG. 31 relates to momentum control, FIG. 32 relates to phase control, and FIG. 33 relates to amplitude control. In these examples, the controls are achieved by tuning the equivalent spatial period Λ, space shift Δx of the amplitude envelope, modulation depth M, and spatial period and space shift for the $|u\rangle$, $|v\rangle$ polarizations, respectively.

Figure 34:
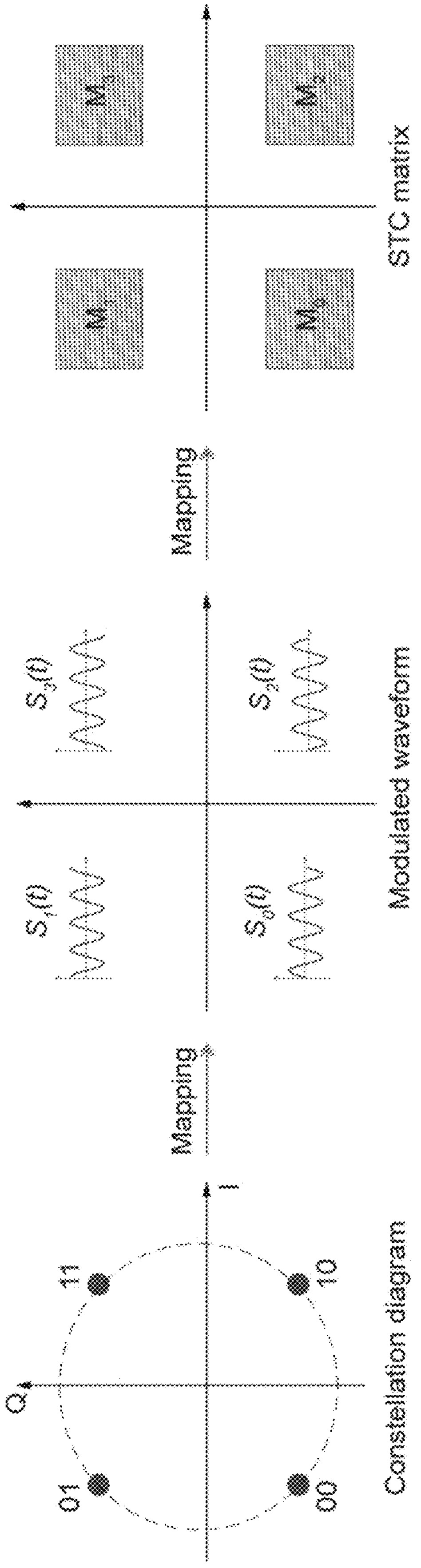
FIG. 34 is a schematic diagram illustrating one-to-one mapping relationship among the QPSK symbol set in the constellation diagram, transmitted signal set, and STC matrix set (m=+1 harmonic frequency radiation) in one example.
Figure 35:
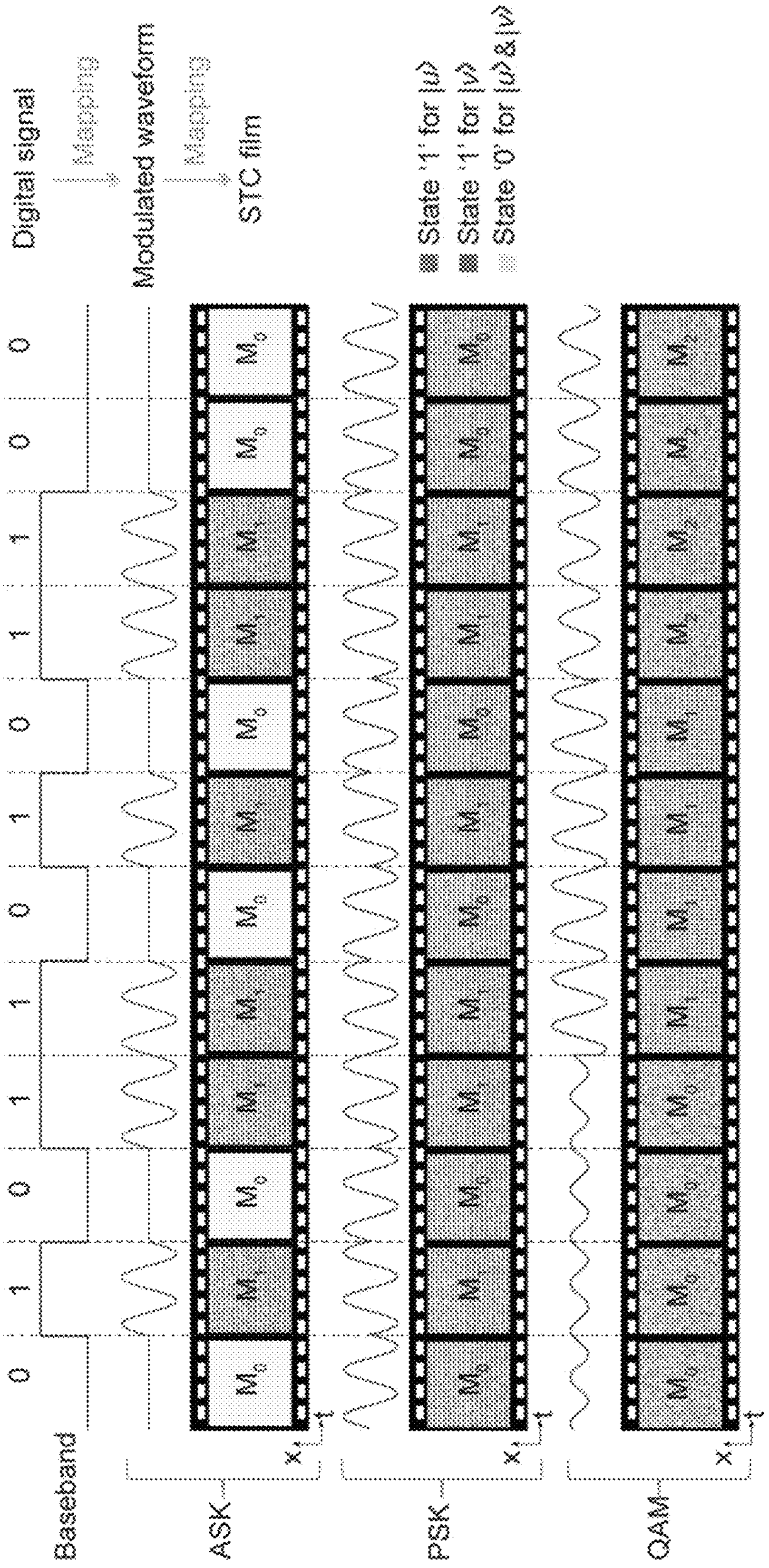
FIG. 35 is a schematic diagram illustrating digital baseband signals, the corresponding modulated free-space waveforms, and the required STC films (at the fundamental frequency) for different modulation formats (2ASK, 2PSK, and 16QAM) in one example.

FIGS. 34 and 35 relate to the universal metasurface antenna 400 arranged for information manipulation with time-varying wave properties. Specifically, FIG. 34 illustrates the one-to-one mapping relationship among the QPSK symbol set in the constellation diagram, transmitted signal set, and STC matrix set (m=+1 harmonic frequency radiation in this example). FIG. 35 illustrates the digital baseband signals, the corresponding modulated free-space waveforms, and the required STC films (at the fundamental frequency in this example) for different modulation formats (including 2ASK, 2PSK, and 16QAM).

Figure 36:
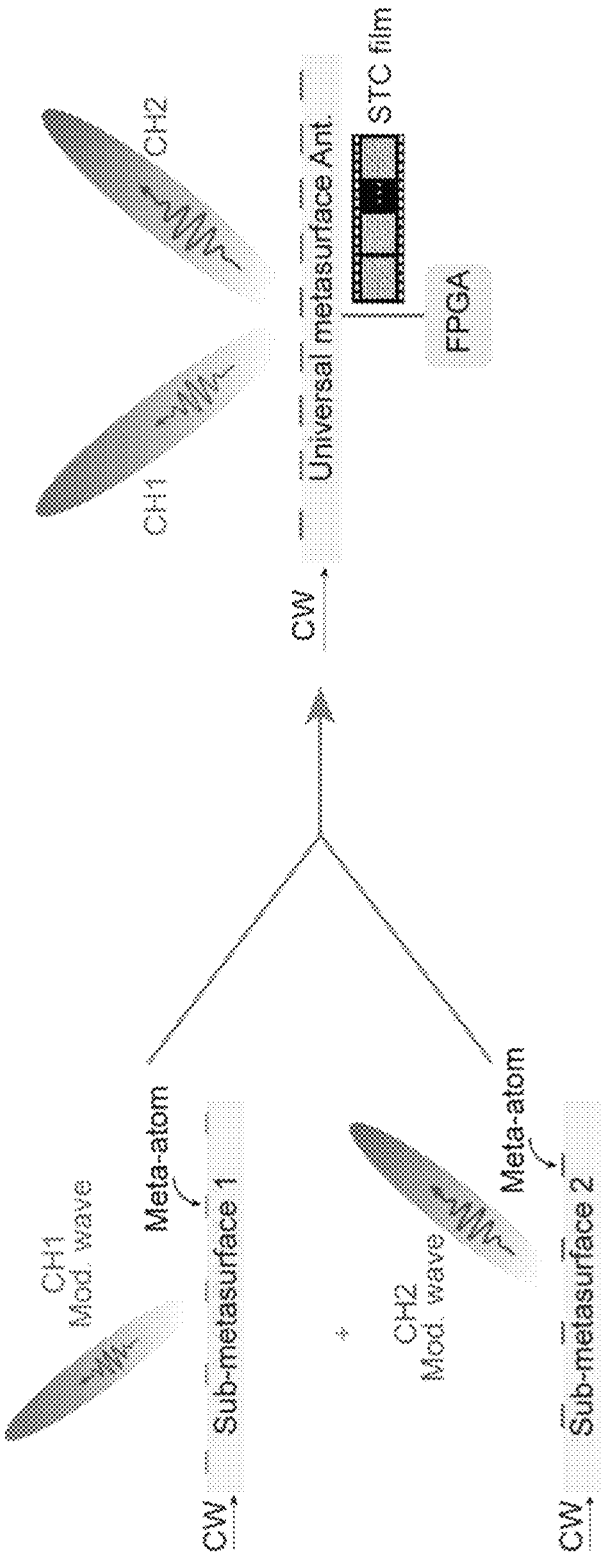
FIG. 36 is a schematic diagram illustrating shared aperture technique arranged to emit two independently modulated EM waves from the metasurface antenna of FIG. 4A in one example.
Figure 38:
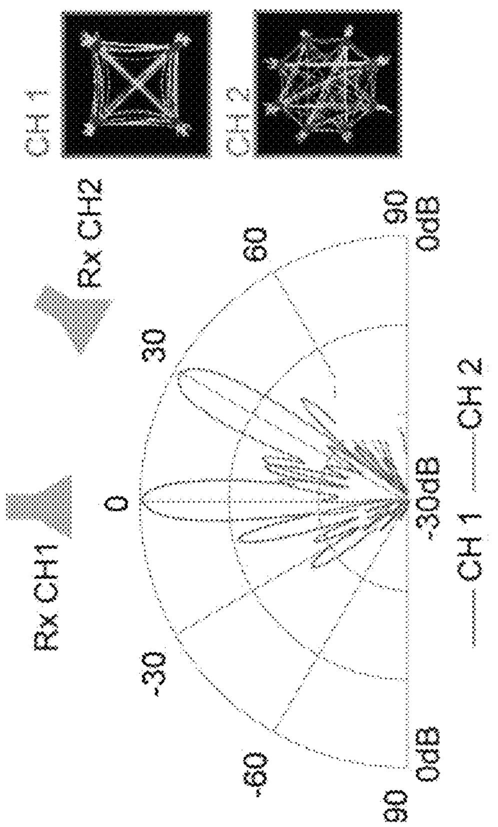
FIG. 38 is a schematic diagram illustrating measured radiation patterns of the universal metasurface antenna at the m=−1 (CH1) and m=−2 (CH2) harmonic frequencies (the main beam directions of CH1 and CH2 are pointing to (0°, 30°)) in one example.
Figure 39:
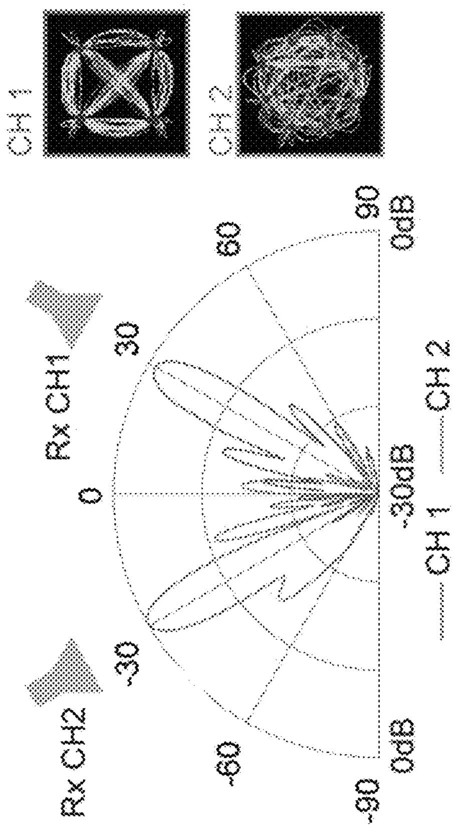
FIG. 39 is a schematic diagram illustrating measured radiation patterns of the universal metasurface antenna at the m=−1 (CH1) and m=−2 (CH2) harmonic frequencies (the main beam directions of CH1 and CH2 are pointing to (30° and −30°)) in one example.

FIGS. 36 to 39 relate to the universal metasurface antenna 400 arranged for multi-channel wireless communication. Specifically, FIG. 36 illustrates the shared aperture technique arranged to emit two independently modulated waves by the universal metasurface antenna, in which each sub-metasurface is responsible for one modulated waveform generation. FIG. 37 illustrates the synthesis process of the STC film for dual-channel wireless communications. Briefly, in this example, the bit stream for each sub-metasurface is first mapped to the corresponding STC film according to the desired conversion harmonic frequency, polarization, and signal modulation format. The final STC film for dual-channel multiplexing is the sum of the two STC films for the two interwoven sub-metasurfaces. FIGS. 38 and 39 illustrate the measured radiation patterns of the universal metasurface antenna at the m=−1 (CH1) and m=−2 (CH2) harmonic frequencies. In FIGS. 38 and 39, the main beam directions of CH1 and CH2 are pointing to (0°, 30°) and (30° and −30°) respectively. The insets on the right in FIGS. 38 and 39 illustrate the measured decoded constellation diagrams of the two channels at the receiver end.

Figure 40:
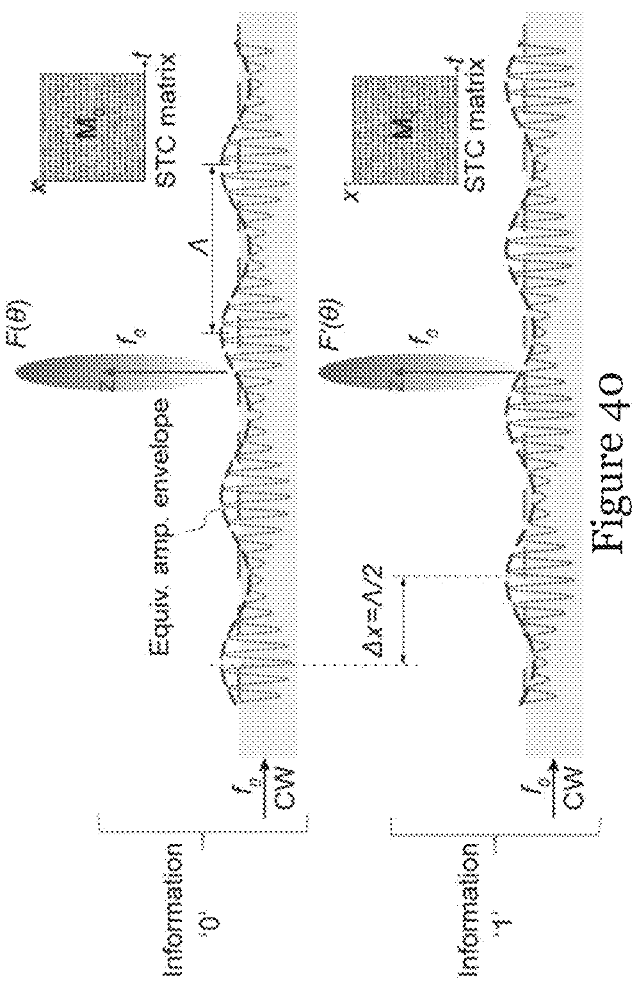
FIG. 40 is a schematic diagram illustrating two equivalent sinusoidal amplitude envelopes imparted by the spatiotemporal modulation at the fundamental frequency to generate two high-directivity beams with 180° phase difference at the broadside direction for BPSK scheme using the metasurface antenna of FIG. 4A in one example.
Figure 41:
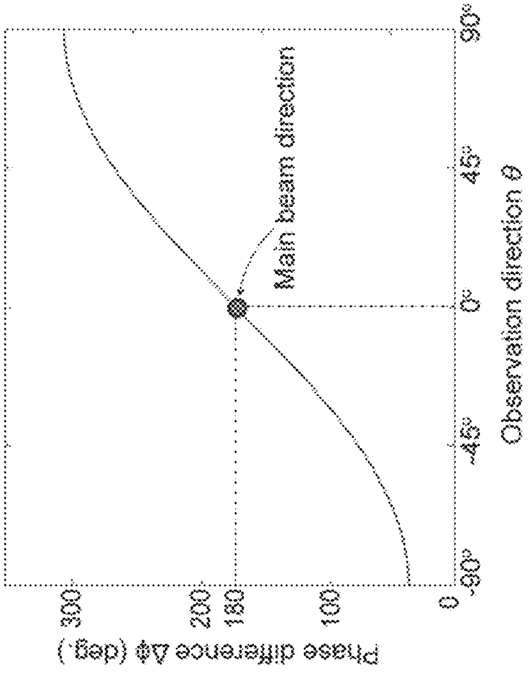
FIG. 41 is a graph showing phase difference between the two radiating cases as a function of the observation direction θ in one example.
Figure 42:
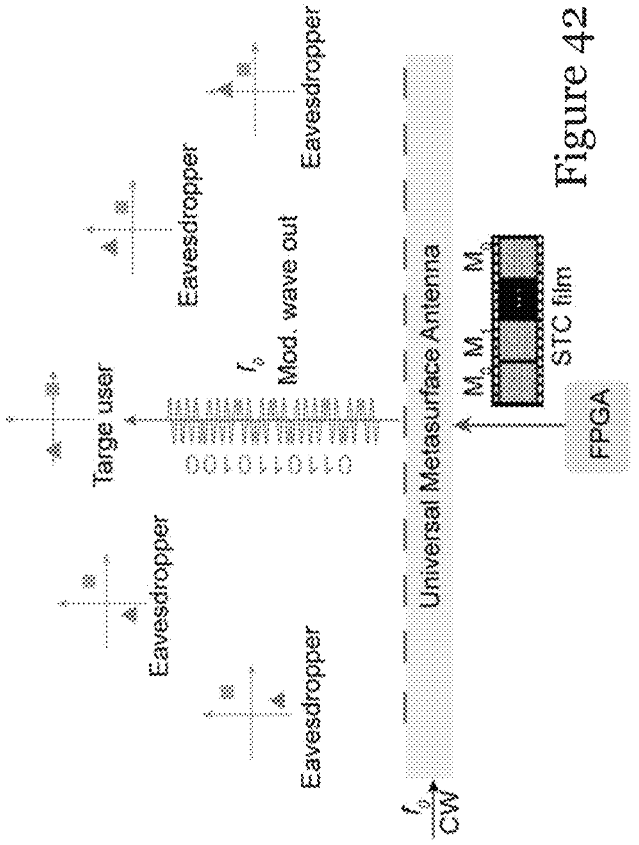
FIG. 42 is a schematic diagram illustrating direct generation of BPSK modulated EM waves at the fundamental frequency using the metasurface antenna of FIG. 4A in one example.
Figure 43:
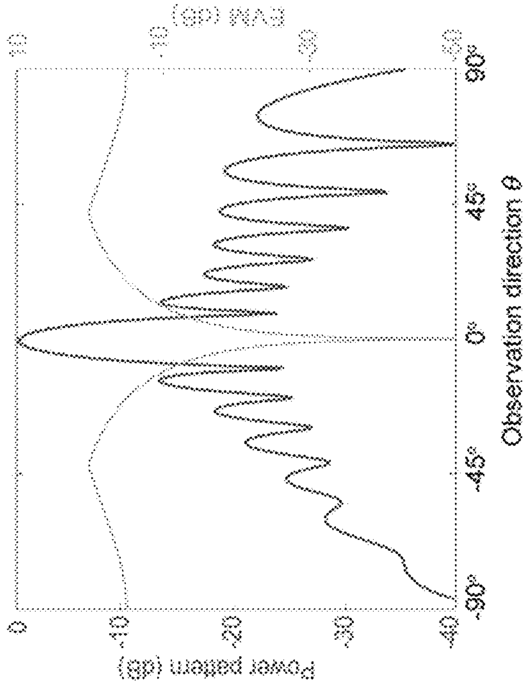
FIG. 43 is a graph illustrating theoretical power pattern of the metasurface antenna of FIG. 4A and error vector magnitude (EVM) associated with the metasurface antenna of FIG. 4A as a function of the observation direction θ in one example.

FIGS. 40 to 43 relate to the universal metasurface antenna 400 with the inherent direction modulation for the BPSK scheme. Specifically, FIG. 40 illustrates conceptually two equivalent sinusoidal amplitude envelopes imparted by the spatiotemporal modulation at the fundamental frequency to generate two high-directivity beams with 180° phase difference at the broadside direction for BPSK scheme. The space shift of the two equivalent sinusoidal amplitude envelops is Δx=Λ/2. The inset in FIG. 40 shows the required STC matrixes for generating such spatial amplitude envelopes at the fundamental frequency. FIG. 41 shows the phase difference between the two radiating cases as a function of the observation direction θ. FIG. 42 illustrates conceptually the universal metasurface antenna 400 arranged for directly generating BPSK modulated waves at the fundamental frequency. In this example, only the target user at the main-beam direction can receive the correct phase variation (information), whereas eavesdroppers at off-angles decode garbled constellations. FIG. 43 shows the theoretical power pattern of the universal metasurface antenna and EVM as a function of the observation direction.

Figure 44:
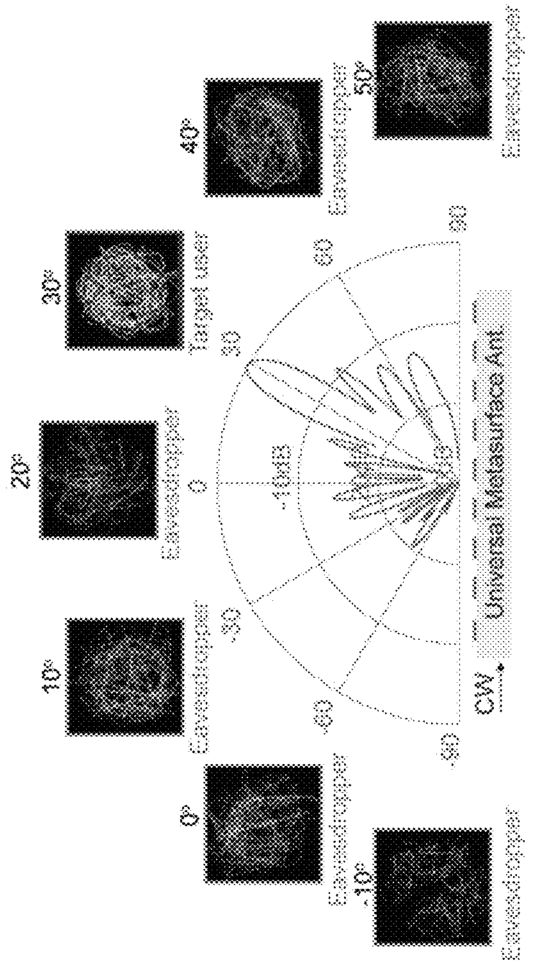
FIG. 44 is a schematic diagram illustrating measured radiation patterns of the metasurface antenna of FIG. 4A and the measured decoded constellation diagrams when the receiver is located in different directions (the main beam direction of the metasurface antenna is scanned to 30°) in one example.
Figure 45:
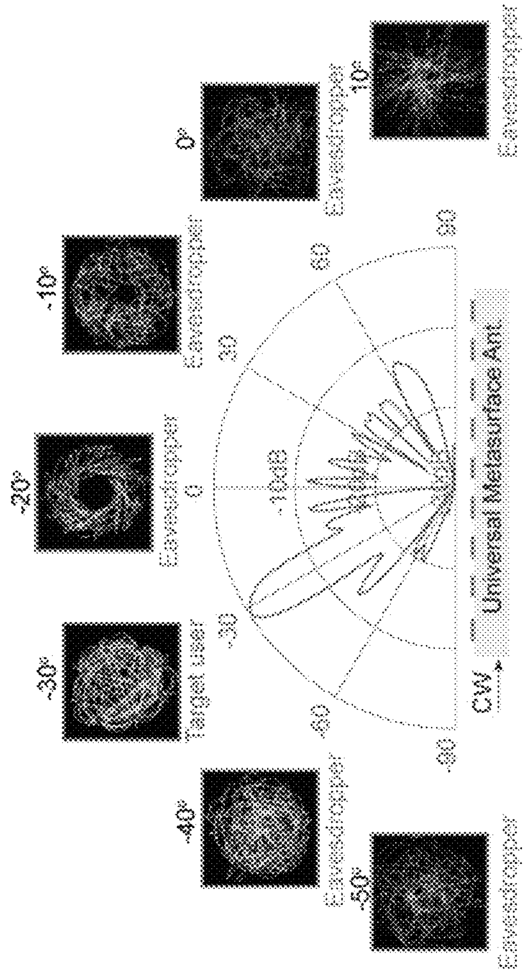
FIG. 45 is a schematic diagram illustrating measured radiation patterns of the metasurface antenna of FIG. 4A and the measured decoded constellation diagrams when the receiver is located in different directions (the main beam direction of the metasurface antenna is scanned to −30°) in one example.
Figure 46:
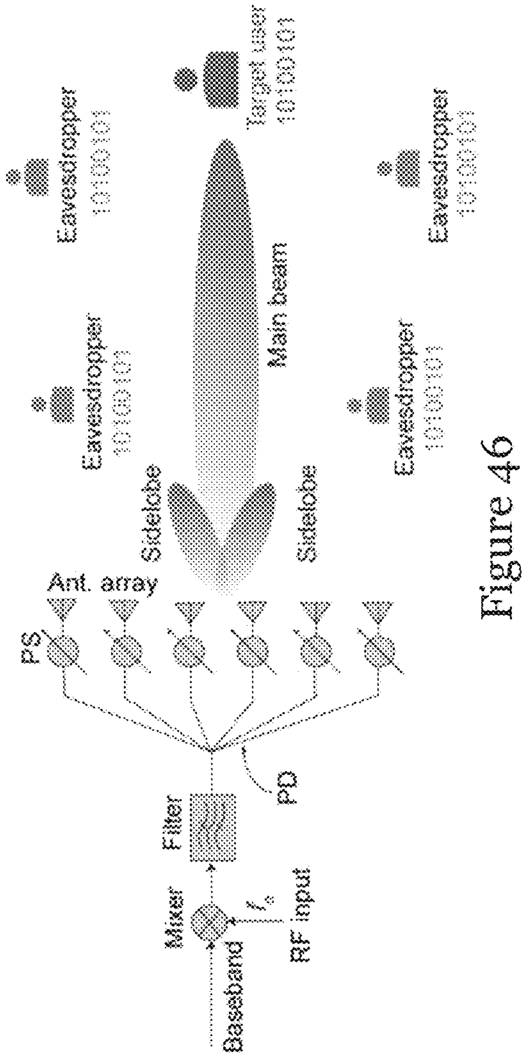
FIG. 46 is a schematic diagram illustrating a conventional beam-scanning transmitter system.
Figure 47:
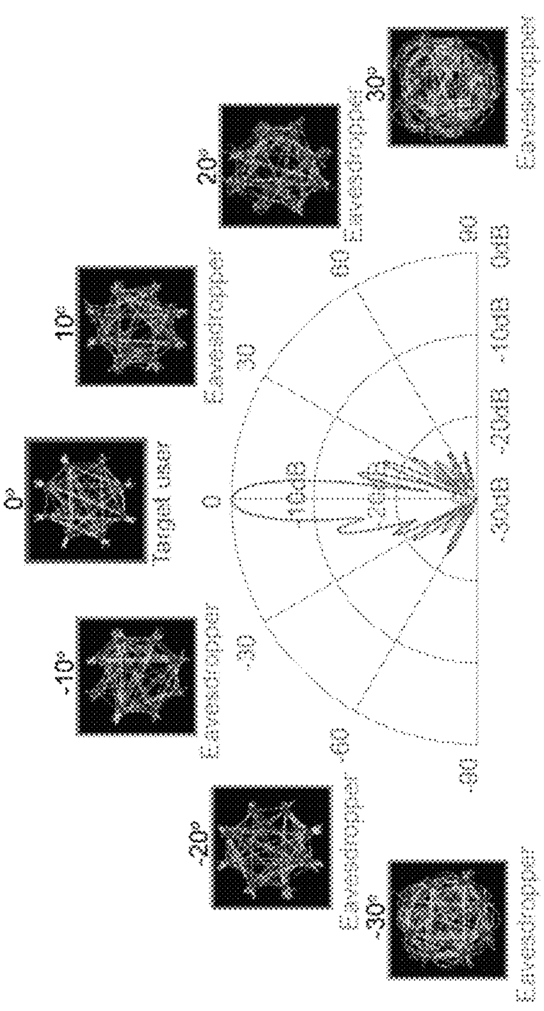
FIG. 47 is a schematic diagram illustrating measured radiation patterns of the metasurface antenna of FIG. 4A operating at the m=−1 harmonic frequency, and the measured decoded constellation diagrams when the receiver is located in different directions in one example.

FIGS. 44 to 47 relate to further results on physical-layer security communications using the universal metasurface antenna 400. Specifically, FIGS. 44 and 45 show the measured radiation patterns of the universal metasurface antenna 400 and the measured decoded constellation diagrams when the receiver is located in different directions. The main beam direction of the universal metasurface antenna 400 is scanned to 30° (FIG. 44) and −30° (FIG. 45), respectively. As illustrated, only the receiver in the main beam direction can successfully decode the information from the universal metasurface antenna 400. FIG. 46 illustrates conceptually a conventional beam-scanning transmitter system, in which the free-space radiation carries the same time-varying wave properties (information) in all directions. FIG. 47 illustrates the measured radiation patterns of the universal metasurface antenna 400 operating at the m=−1 harmonic frequency, and the measured decoded constellation diagrams when the receiver is located in different directions. In this example, the receivers can successfully decode the information outside the main beam.

Figure 48A:
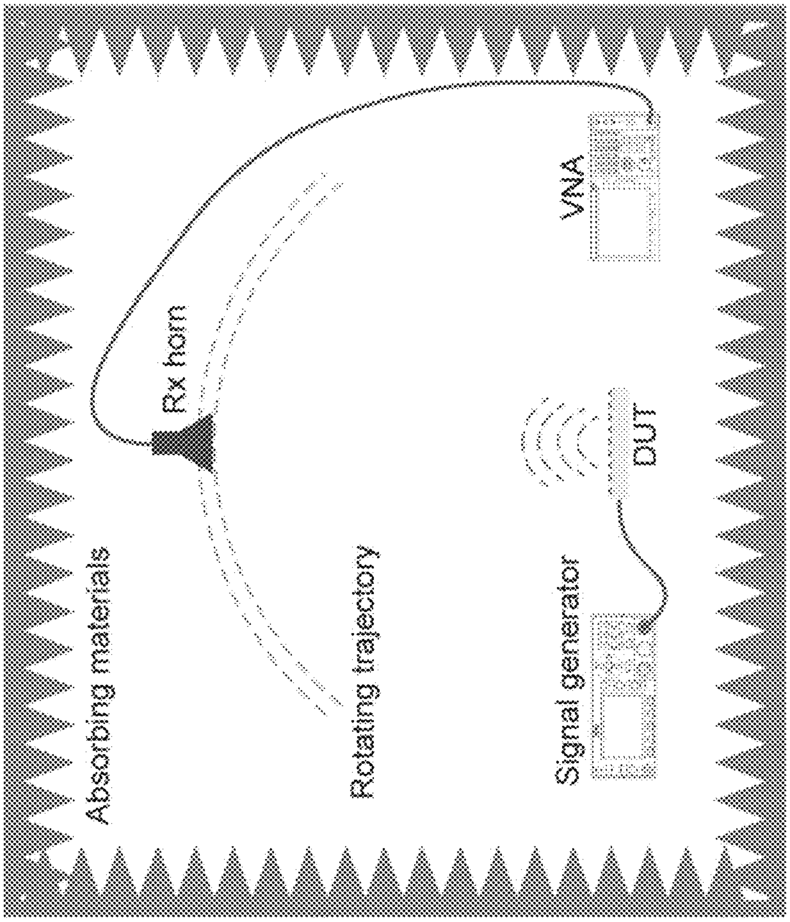
FIG. 48A is a schematic diagram illustrating a measurement setup for radiation pattern measurement of the metasurface antenna of FIG. 4A in one example.
Figure 48B:
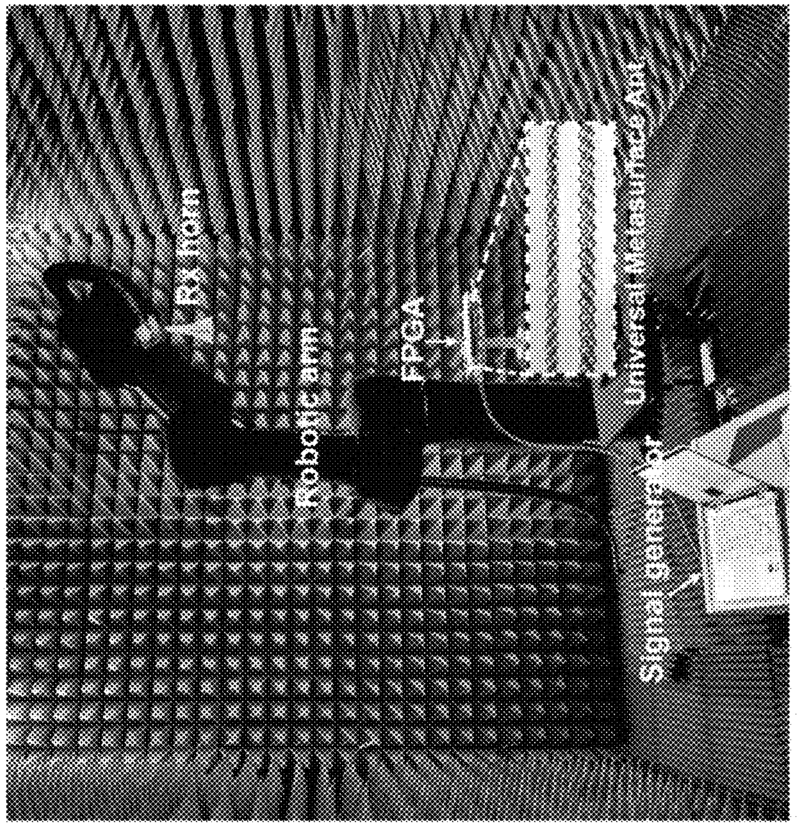
FIG. 48B is a photograph of a corresponding implemented measurement setup for radiation pattern measurement of the metasurface antenna of FIG. 4A in one example.
Figure 49:
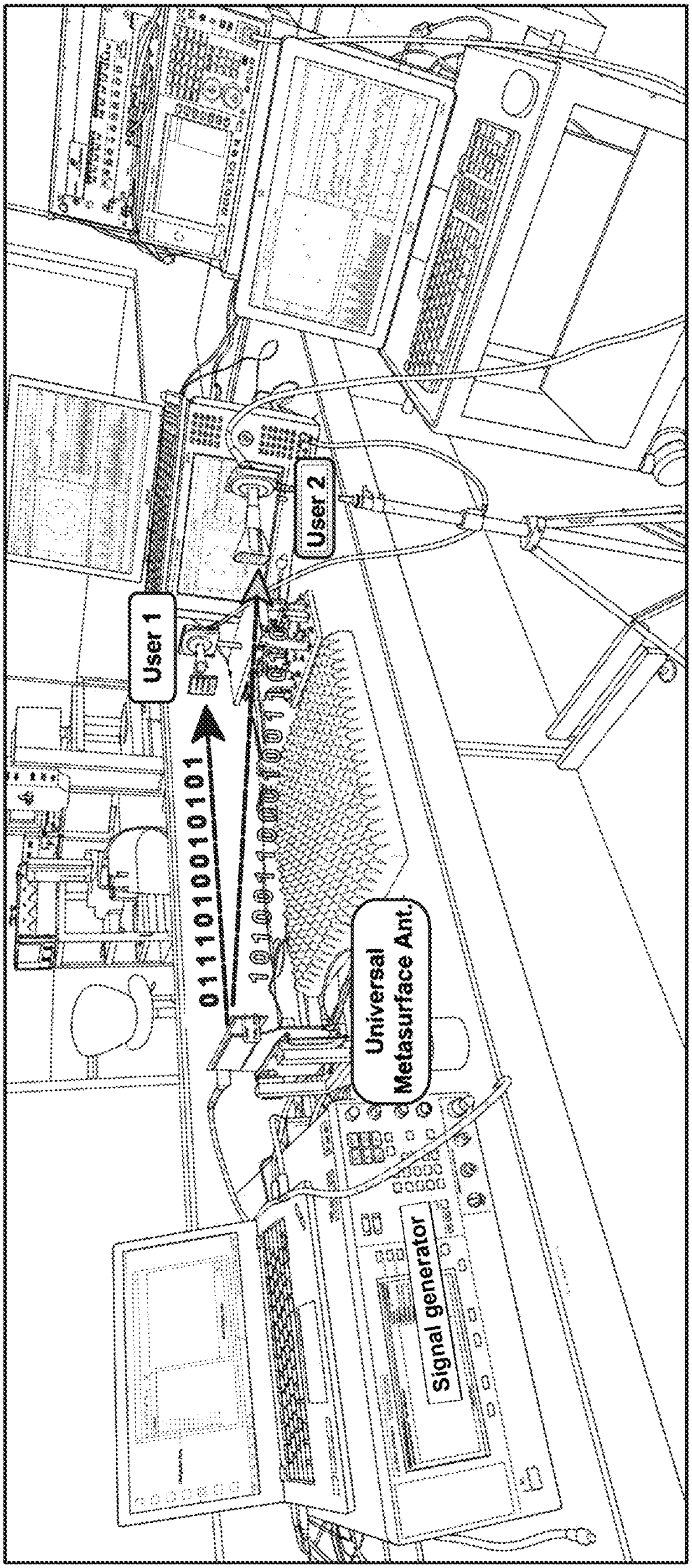
FIG. 49 is a photograph of a measurement set-up of a dual-channel wireless communications link testbed in one example.

FIGS. 48A to 49 illustrate setups for characterizing a prototype of the universal metasurface antenna 400. Specifically, FIGS. 48A and 48B show corresponding schematic and photograph of the measurement setup for measuring radiation pattern of the metasurface antenna 400 prototype. FIG. 49 shows the dual-channel wireless communications link testbed, in which the universal metasurface antenna directly and simultaneously generates two independent modulated waves with different information. Two horn antennas connected to two vector signal analyzers (VSAs) are used to receive and demodulate the signals. In FIGS. 48A to 49, "DUT" means device under test; "VNA" means vector network analyzer; "Rx" means receiver.

Figure 50:
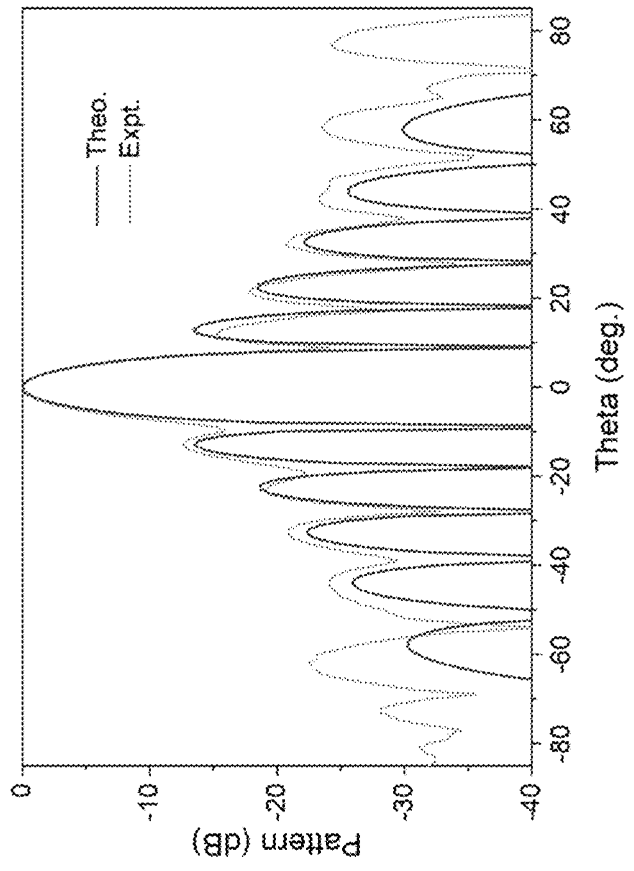
FIG. 50 is a graph showing theoretical and experimental far-field radiation patterns of the metasurface antenna of FIG. 4A for the m=+1 harmonic frequency radiation in one example.

FIG. 50 shows theoretical and experimental far-field radiation patterns of the universal metasurface antenna 400 for the m=+1 harmonic frequency radiation.

Figure 51:
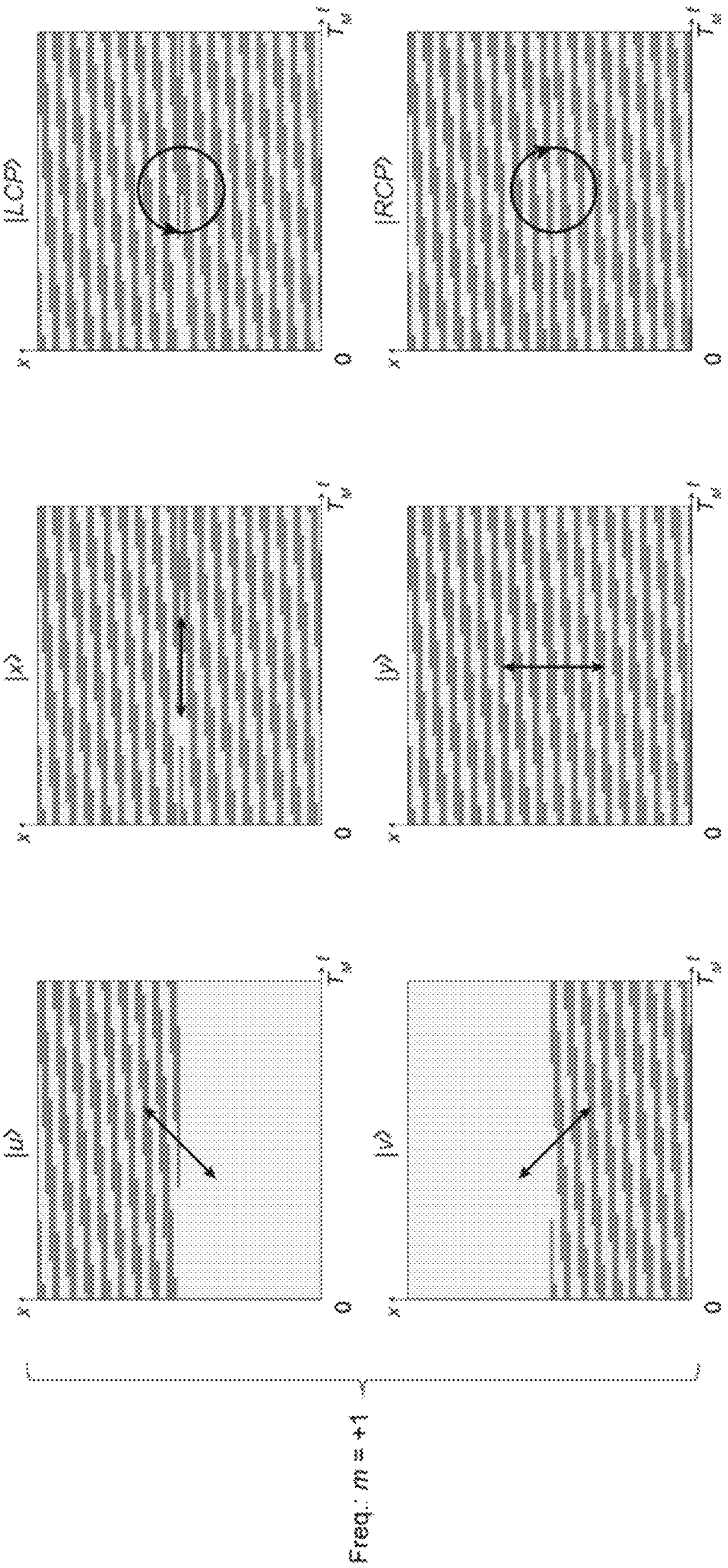
FIG. 51 is a schematic diagram illustrating a STC matrix for realizing polarization control at m=+1 harmonic frequency with different polarizations (|⟩, |y⟩, |u⟩, |v⟩, |LCP⟩, and |RCP⟩) in one example.
Figure 52:
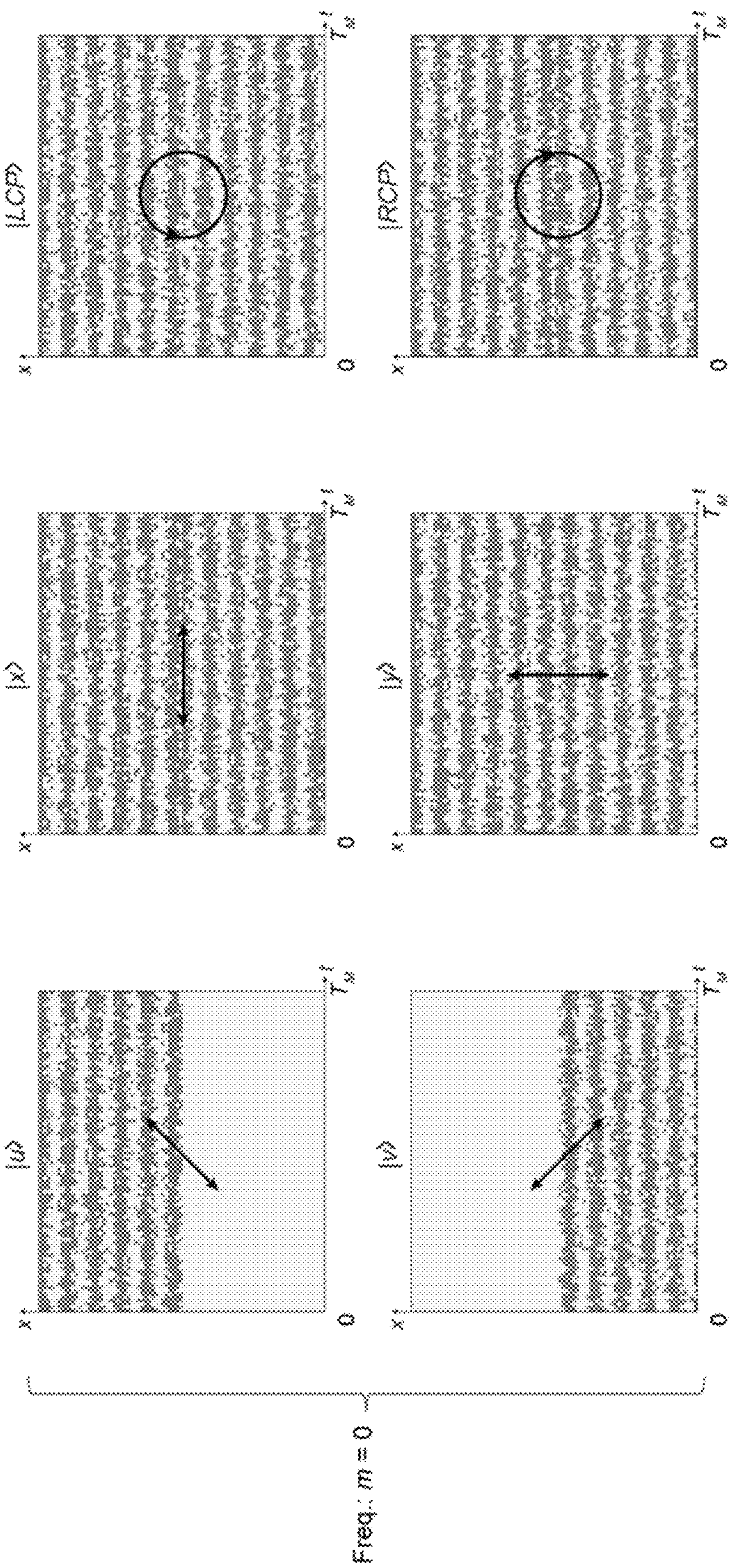
FIG. 52 is a schematic diagram illustrating a STC matrix for realizing polarization control at m=0 harmonic frequency with different polarizations (|x⟩, |y⟩, |u⟩, |v⟩, |LCP⟩, and |RCP⟩) in one example.

FIGS. 51 and 52 show STC matrixes for realizing polarization control in the metasurface antenna 400. Specifically, FIG. 51 shows the required "0/1" STC matrixes for polarization control at m=+1 harmonic frequency with different polarizations (including $|x\rangle$, $|y\rangle$, $|u\rangle$, $|v\rangle$, $|LCP\rangle$, and $|RCP\rangle$). FIG. 52 shows the required "0/1" STC matrixes for polarization control at m=0 fundamental frequency with different polarizations (including $|x\rangle$, $|y\rangle$, $|u\rangle$, $|v\rangle$, $|LCP\rangle$, and $|RCP\rangle$).

FIG. 53 shows the theoretical and measured $|u\rangle$ and $|u\rangle$ components for the six representative polarizations (including $|x\rangle$, $|y\rangle$, $|u\rangle$, $|v\rangle$, $|LCP\rangle$, and $|RCP\rangle$) obtained using the metasurface antenna 400.

With the brief overview of the Figures, further details on various aspects or example operations of the metasurface antenna 400 are now provided, Manipulations of Fundamental EM-Wave Properties The universal metasurface antenna 400 in this embodiment is operable to independently control some or all of the fundamental EM wave properties (amplitude, phase, polarization, frequency, and momentum).

Regarding frequency manipulation, inventors of the present invention are aware that frequency manipulation is generally challenging as it requires change in energy of photon, and the existing approach for frequency manipulation based on nonlinear bulk media suffers from the weak nonlinear effect and stringent phase matching condition (PMC). In this respect, the universal metasurface antenna 400 includes multiple space-time-coding (STC) meta-atom arranged to facilitate (i) temporal modulation for producing nonlinear effects and (ii) simultaneous space-time modulations for converting newly generated waves into free space to mitigate the PMC (FIG. 4A). Specifically, the periodic switching of the radiation states of the meta-atoms may provide an infinite number of harmonic frequencies $f_0+mf_M$, where m is an integer. In one example, identical rectangular time sequences with position-dependent time shift $t_i(x)$ are applied to the meta-atoms (FIG. 25). According to the time-shifting property of the Fourier Transform, a shift $t_i$ in the time domain corresponds to a linear phase shift $-2\pi mf_M t_i$ in the frequency domain. Therefore, the total phase shift of the radiated propagating wave (PW) includes two parts (FIG. 26): (i) the phase accumulation from the propagation of guided wave (GW) $\varphi_{GW}=-\xi_{GW}x_i$ (where $\xi_{GW}$ is the wavenumber inside the waveguide) and (ii) the abrupt phase shift induced by the spatiotemporal modulation $\varphi_{ST}=-2\pi mf_M t_i(x)$. The corresponding linear momentum of the radiated propagating wave along the x direction is $k_x(f_0+mf_M)=\xi_{GW}+k_{ST}$, where $k_{ST}=2\pi mf_M\ \partial t_i(x)/\partial x$ is the additional momentum imparted by the spatiotemporal modulation. In one example (FIG. 4A), this momentum is leveraged to compensate for the momentum mismatch between the waveguide and free space at the target m=+1 harmonic frequency, i.e., $-\xi_{m=+1}<\xi_{GW}+k_{ST}<\xi_{m=+1}$, where $\xi_{m=+1}$ is the free-space wavenumber at the m=+1 harmonic frequency. Other unwanted harmonics are not supported and are suppressed in both free space and the waveguide due to the significant momentum mismatch (FIG. 27). In this manner, a nearly perfect guided-wave-to-propagating-wave conversion and frequency shifting can be simultaneously achieved by the universal metasurface antenna 400. FIG. 5 shows the measured propagating wave spectra with different values of frequency shifting (from −1.8 MHz to +1.8 MHz, in the step of 0.6 MHz) by changing the modulation frequency $f_M$.

Figure 6:
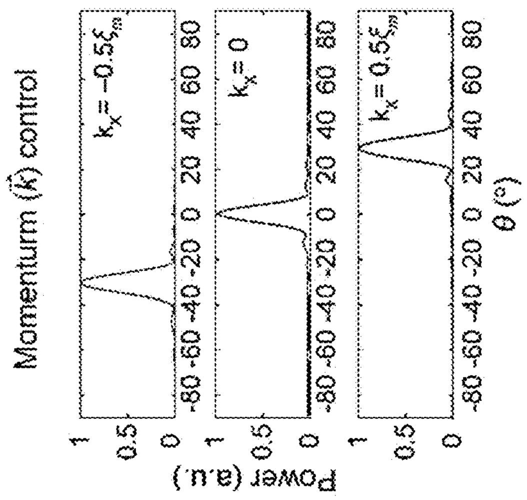
FIG. 6 is a graph illustrating independent manipulation of momentum of EM waves using the metasurface antenna of FIG. 4A in one example.

The universal metasurface antenna 400 also enable momentum control of EM waves. Suppose the applied time gradient $\partial t_i(x)/\partial x$ is a constant, the radiated propagating wave has a well-defined radiation angle $\theta_r=\sin^{-1}(k_x/\xi_m)$. Therefore, the momentum and the corresponding output angle of the radiated propagating wave can be readily tuned by changing the applied time gradient (FIG. 6).

Figure 7:
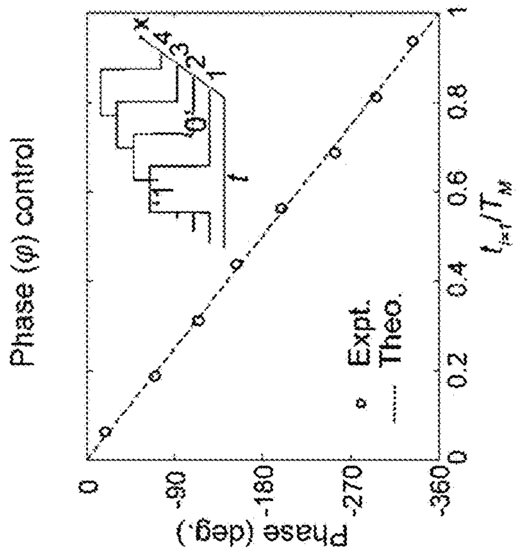
FIG. 7 is a graph illustrating independent manipulation of phase of EM waves using the metasurface antenna of FIG. 4A in one example.

The universal metasurface antenna 400 also enable phase control of EM waves. Since $\varphi_{ST}=-2\pi mt_i/T_M$, the initial phase of the extracted propagating wave can be tuned from 0° to 360° by altering the reference time shift $t_{i=1}$ (the phase shift for the $1^{st}$ meta-atom) while fixing the time gradient $\partial t_i(x)/\partial x$ (FIG. 7).

Figure 8:
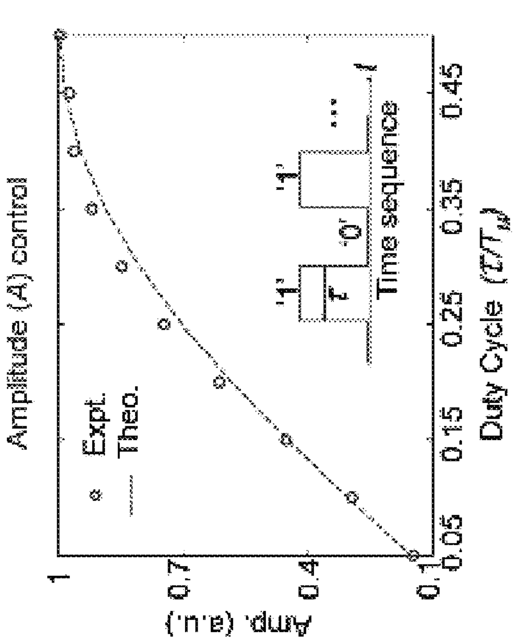
FIG. 8 is a graph illustrating independent manipulation of amplitude of EM waves using the metasurface antenna of FIG. 4A in one example.

The universal metasurface antenna 400 also enable amplitude control of EM waves. The power distribution of the harmonic frequencies generally depends on the coding context of the time sequence. The amplitude of the extracted propagating wave can be tuned by varying the duty cycle $\tau$ of the rectangular time sequence (FIG. 8).

Figure 9:
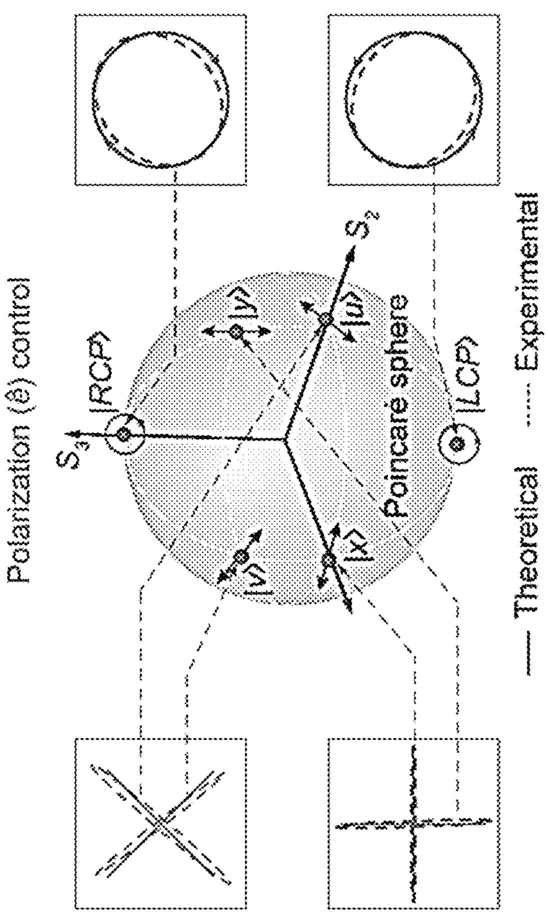
FIG. 9 is a schematic diagram illustrating independent manipulation of polarization of EM wave using the metasurface antenna of FIG. 4A in one example.

The universal metasurface antenna 400 also enable polarization control of EM waves. In one example, the universal metasurface antenna 400 can generate arbitrary polarizations by applying independent STC matrixes to the ±45°-inclined slot openings to vary the amplitude ratio and phase difference of the extracted u- and v-polarized components. In one example, six representative polarizations ($|x\rangle$, $|y\rangle$, $|u\rangle$, $|v\rangle$, $|LCP\rangle$ (left-hand circular polarization), and $|RCP\rangle$ (right-hand circular polarization)) are provided as examples to show the polarization controllability (FIG. 9). The corresponding required STC matrixes are provided in FIGS. 51 and 52.

The universal metasurface antenna 400 can also independently manipulate all of the properties of the radiated propagating wave without shifting the frequency. In one example, the time-average effect of the spatiotemporal modulation is leveraged to form an equivalent sinusoidal amplitude distribution at the fundamental frequency (FIGS. 28 to 33). In this manner, the n=−1 space harmonic becomes a fast wave. It converts to propagating wave, the wave properties of which can be independently controlled by the 1-bit space-time modulation (FIGS. 28 to 33). Further details related to this aspect will be provided below.

The universal metasurface antenna 400 can simultaneously control various properties of EM waves. To demonstrate this, the far-field radiation patterns of the universal metasurface antenna 400 are obtained. In each of the plots in FIG. 10, three radiating cases with different magnitudes are given to demonstrate the independent amplitude controllability. The plots in the same row in FIG. 10 represent the radiated propagating waves with identical wave properties but different linear momentums, whose corresponding beam angle steers from −40°, 0° to +40°, which verify simultaneous amplitude and momentum controls. The polarization is changed from $|x\rangle$ in the plots in the first row to $|u\rangle$ in the plots in the second row, which enable simultaneous amplitude, momentum, and polarization controls. The output frequency is further changed from the fundamental frequency (m=0) in the plots in the second row to m=+1 harmonic frequency in the plots in the third row (with all other wave properties remain unchanged). Thus, this example verifies simultaneous amplitude, momentum, polarization, and frequency controls by the universal metasurface antenna 400.

EM-Wave Manipulations and Information Modulations

The universal metasurface antenna 400 can generate relatively complicated structured lights with space- and time-varying wave properties. In some examples, the metasurface antenna 400 can achieve arbitrary beam shaping for Airy beam and light focusing generations (FIGS. 11 and 14).

In one example, the required spatial phase for Airy wavefront varies as $(-x)^{3/2}$ (FIG. 12) for producing a parabolic caustic $x \propto z^2$. A spatial-dependent time shifting is introduced to the meta-atoms (FIG. 12) to form such a spatial-varying phase distribution at the m=−1 harmonic frequency. FIG. 13 presents the measured electric field intensity distributions at different harmonic frequencies. It can be seen that the universal metasurface antenna 400 can extract and mould the waves into an accelerating and non-diffractive Airy beam with a well-defined parabolic trajectory. Moreover, other undesired harmonic frequencies are highly suppressed in free space.

In one example, the metasurface antenna 400 can also mould the extracted waves with spatial-varying momentum properties $k_x(x)$ for light-focusing applications (FIG. 14). This example considers the metasurface antenna steers the focal points from $F_1$ to $F_5$ at the m=−1 harmonic frequency. FIGS. 15 to 17 present the required space-dependent momentums, and the measured 1D and 2D electric field intensity distributions for different focusing cases at the m=−1 harmonic frequency, respectively. It can be seen that the metasurface antenna 400 can extract and mould the propagating wave into intended focal spots, the positions of which are software-defined according to the applied STC matrix.

These examples demonstrate the flexible and agile beam shaping capability of the universal metasurface antenna 400, which may be particularly useful in sensing, imaging, and wireless power transfer applications.

The universal metasurface antenna 400 can enable or facilitate information manipulation by generating time-varying wave properties (FIG. 18). By loading the animate STC matrices (also referred to as "STC films"), the universal metasurface antenna 400 can directly generate the modulated waveform with time-varying amplitude and phase properties, mapping to the desired digital information stream to be transmitted (FIG. 18). FIG. 18 also presents the measured decoded constellation diagrams and eye diagrams at the receiver end when the information is carried at the m=+1 and m=0 harmonic frequencies. The information manipulation functionality of the universal metasurface antenna 400 is validated for different information modulation schemes, including phase-shift keying (PSK) and quadrature amplitude modulation (QAM) (FIGS. 34 and 35), which demand the time-varying phase and the time-varying amplitude and phase properties, respectively. Existing transmitters typically rely on the heterodyne architecture consisting of a series of active/passive RF modules (including digital to analog converters, modulators, mixers, filters, phase shifters, and antenna arrays) to generate such modulated waves in free space to mould the propagating waves with time-varying amplitude and phase (information-carried) properties. In contrast, the universal metasurface antenna 400, as a single assembly or device, can directly generate identical modulated waves in a single step. This provides a different communication paradigm in the physical layer with advantages of a simpler structure, higher integration, lower cost, and/or lower power consumption.

Moreover, the control over other properties of EM waves (momentum, frequency, and polarization) by the universal metasurface antenna 400 provides additional opportunities to achieve space-division multiplexing (SDM), frequency-division multiplexing (FDM), and polarization-division multiplexing (PDM), which can establish multiple independent channels to improve the communications capacity.

A combined SDM-FDM-PDM data transmission link is set up (FIGS. 19 and 49), in which the universal metasurface antenna 400 simultaneously transmits two independent channels with different beam directions (−30° and +30° for SDM), different polarizations ($|u\rangle$ and $|v\rangle$ for PDM), different frequencies (m=−1 and m=−2 harmonics for FDM), and⟩ different information modulation schemes (QPSK and 8PSK). To this end, a shared aperture approach is developed to enable the universal metasurface antenna 400 to achieve such complicated wave and information manipulations (FIGS. 36 to 39). The measured far-field radiation patterns (FIG. 20) and the decoded constellation diagrams at the receiver (right inset of FIG. 20) verify that the universal metasurface antenna 400 can realize simultaneous and independent multiplexing.

Figure 22:
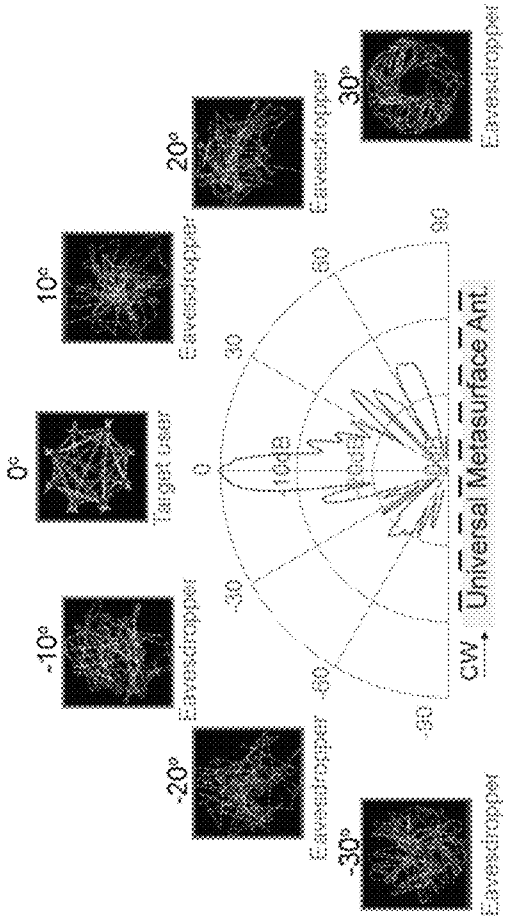
FIG. 22 is a schematic diagram illustrating measured radiation pattern of the metasurface antenna of FIG. 4A and the measured decoded constellation diagrams when the receiver is located in different directions in one example.

In conventional transmitter architectures, the radiated EM waves in different directions hold identical time-varying wave properties (information). Therefore, an eavesdropper can recover the information even in the sidelobe region by using a sufficiently sensitive receiver (FIGS. 46 and 47). In one example, the universal metasurface antenna 400 can provide an inherent directional modulation (IDM) phenomenon at the fundamental frequency. This unique IDM property is attributed to the direction-dependent phase control of the universal metasurface antenna 400 (FIGS. 40 to 43). For validation, a communication link is established, through which the universal metasurface antenna 400 directly emits the modulated waves carrying the 8PSK signals at the fundamental frequency (FIG. 21). FIG. 22 presents the corresponding measured radiation patterns and the decoded constellation diagrams when the receiver is located in different directions. It can be seen that the receiver can only successfully decode the information in the main-beam direction of the universal metasurface antenna (the information is completely lost outside the main beam). This IDM effect may be used to effectively mitigate malicious eavesdropper attacks in different directions, establishing physical-layer security on top of wireless communications. The IDM is an intrinsic property of the universal metasurface antenna 400 and is free of any optimization and performance trade-off generally incurred for conventional approaches to achieve physically secure communication links.

Wave Manipulations with Frequency Shifting

In this example, the theoretical model of the waveguide-integrated metasurface antenna is extended to a more generalized one by taking polarization into account. In this example, the metasurface is represented or described by an array of subwavelength scatterers with the discrete nature of the metasurface. The universal metasurface antenna 400 includes an array of slot opening based meta-atoms etched on the top conductive layer of the substrate integrated waveguide along the x-axis (FIG. 23). In this example, the anisotropic slot opening meta-atom is equivalent to two orthogonally orientated waveguide-fed magnetic dipoles to extract energy from the waveguide and radiate to free space. The wave properties of the extracted $|u\rangle$ and $|v\rangle$ components can be independently controlled by applying independent control voltages to the PIN diodes incorporated in the meta-atom (FIG. 24). The excited polarized magnetic dipole moments $$\overline{\overline{m}}_i = \begin{bmatrix} m_i^u \\ m_i^v \end{bmatrix}$$

with $|u\rangle$ and $|v\rangle$ components for the $i^{th}$ meta-atom at the position $x_i$ is $$\overline{\overline{m}}_i = \overline{\overline{P}}_i H_i = \overline{\overline{P}}_i(t) H_0 e^{-j\xi_{gw} x_i} e^{j2\pi f_0 t} \quad (1)$$

$$\text{where } \overline{\overline{P}}_i = \begin{bmatrix} P_i^u(t) \\ P_i^v(t) \end{bmatrix}$$

is the magnetic polarizability Jones matrix at instant t, and $H_i$ is the magnetic field of the reference guided wave inside the waveguide. Since the radiating state of the meta-atom is periodically switched ON and OFF with a time cycle $T_M$, the magnetic polarizability is a periodic function of time, satisfying $\overline{\overline{P}}_i(t)=\overline{\overline{P}}_i(t+T_M)$, which can be decomposed into a Fourier series $$\overline{\overline{P}}_i(t) = \sum_{m=-\infty}^{\infty} \overline{\overline{p}}_{i,m} e^{j2\pi m f_M t} \quad (2)$$

where $f_m=1/T_M$ is the modulation frequency. The Fourier coefficients $$\overline{\overline{p}}_{i,m} = \begin{bmatrix} p_{i,m}^u \\ p_{i,m}^v \end{bmatrix}$$

can be calculated by $$\overline{\overline{p}}_{i,m} = \frac{1}{T_M} \int_0^{T_M} \overline{\overline{P}}_i(t) e^{-j2\pi m f_M t} dt \quad (3)$$

Equation (2) can be substituted into equation (1) to yield:

$$\overline{\overline{m}}_i = H_0 \sum_{m=-\infty}^{\infty} e^{j2\pi(f_0+mf_M)t} \overline{\overline{p}}_{i,m} e^{-j\xi_{gw} x_i} \quad (4)$$

From equation (4), it can be determined that the periodic ON-OFF switching of the meta-atom can generate an infinite number of harmonic frequencies with a frequency interval $f_M$. This nonlinear effect opens the opportunity to control the frequency property of EM waves. Moreover, the spatiotemporal modulation introduces equivalent magnetic polarizability $\overline{\overline{p}}_{i,m}(f_0+mf_M)$ at the $m^{th}$-order harmonic frequency, providing additional degrees of freedom to control the other properties of EM waves. Once the excited magnetic polarizability of each meta-atom is known, the radiation pattern of the universal metasurface antenna 400 in free space can be obtained.

In one example, generally identical rectangular time sequences are applied (FIG. 25 with $\Delta t=0$) to all meta-atoms. The corresponding magnetic polarizability can be expressed as $$\overline{\overline{P}}_i(t) = P_0 \begin{cases} \overline{\overline{1}} & -\overline{\overline{\tau}}_i/2 \le \overline{\overline{t}}/T_M \le \overline{\overline{\tau}}_i/2 \\ \overline{\overline{0}} & \text{others} \end{cases} \quad (5)$$

where $P_0$ is the constant magnetic polarizability as the meta-atom is in the radiating state.

$$\overline{\overline{\tau}}_i = \begin{bmatrix} \tau_i^u \\ \tau_i^v \end{bmatrix}$$

is the duty cycle for the $|u\rangle$ and $|u\rangle$ components, which is defined as the ratio of the time a meta-atom is in the coupling state ("1") over a modulation time cycle. By substituting equation (5) into equation (3), the equivalent magnetic polarizability $\overline{\overline{p}}_{i,m}$ for the $i^{th}$ meta-atom at the $m^{th}$-order harmonic frequency is $$\overline{\overline{p}}_{i,m} = P_0 \overline{\overline{\tau}}_i \operatorname{sinc}(\pi m \overline{\overline{\tau}}_i) \quad (6)$$

From equation (6), the amplitude of the magnetic polarizability at each harmonic is a function of the employed duty cycle $\overline{\overline{\tau}}_i$. To further enable phase control, a time delay $$\overline{\overline{\tau}}_i = \begin{bmatrix} t_i^u \\ t_i^v \end{bmatrix}$$

is introduced for the meta-atom (FIG. 25), and the equivalent magnetic polarizability $\overline{\overline{p}}_{i,m}$ becomes $$\overline{\overline{p}}_{i,m} = P_0 \overline{\overline{\tau}}_i \operatorname{sinc}(\pi m \overline{\overline{\tau}}_i) e^{-j2\pi m f_M \overline{\overline{t}}_i} \quad (7)$$

Comparing equations (6) and (7), an additional phase term $\varphi_{ST}=-j2\pi m f_M \overline{\overline{t}}_i$, depending on the applied time delay $\overline{\overline{t}}_i$, is introduced to the equivalent magnetic polarizability at the $m^{th}$-order harmonic frequency (FIG. 26). In this manner, the amplitude and phase of the excited magnetic polarizability can be decoupled and controlled independently.

Arbitrary polarizations can be decomposed into a linear combination of two complete orthogonal polarization bases, e.g., $|u\rangle$ and $|v\rangle$ and vice versa. In this example, the anisotropic meta-atom includes a pair of 45°-inclined elliptical slot openings with a large length-to-width ratio, and the associated radiated electric field polarization is perpendicular to the long side (FIG. 23). Applying independent STC matrixes to the ±45°-inclined slots in each meta-atom allows independent control over the amplitude and phase contents of the extracted $|u\rangle$ and $|v\rangle$ components, resulting in arbitrary polarization generation by the universal metasurface antenna 400. Specifically, an identical time gradient $\partial t_i(x)/\partial x$ is adopted for both the ±45°-inclined slot openings such that the $|u\rangle$ and $|v\rangle$ components share the same momentum and output direction. Different initial time delays and duty cycles may be applied to the ±45°-inclined slot openings to control the amplitude ratio and phase difference of the radiated $|u\rangle$ and $|v\rangle$ components, respectively. The universal metasurface antenna 400 is loaded with different STC matrixes (FIG. 51) to generate six representative polarizations, which includes $|x\rangle$, $|y\rangle$, $|u\rangle$, $|v\rangle$, $|LCP\rangle$, and $|RCP\rangle$ (FIG. 9).

For completeness, further details on the theoretical radiation pattern of the universal metasurface antenna 400 is provided.

In one example, the discrete dipole approach is used to calculate the far-field radiation pattern of the universal metasurface antenna 400. In this example, the magnetic dipole moment is used as the weight coefficient in array factor calculation. In this example, each meta-atom can be viewed as two ±45°-inclined magnetic dipoles, whose radiating far-field can be expressed as $$\bar{\bar{H}}_i(\theta) = -\frac{\pi f^2}{r}\bar{\bar{m}}_i \cos\theta e^{j\xi_m x_i sin\theta} \tag{S1}$$

where θ is the observation direction with respect to the surface normal of the metasurface. The pattern of the meta-atom is modeled as a cosine function cos θ. By substituting equations (4) and (7) into (S1), the following can be obtained:

$$\bar{\bar{H}}_i(\theta) = -\frac{\pi H_0 P_0}{r}\sum_{m=-\infty}^{\infty} e^{j2\pi(f_0+mf_M)t}\cdot(f_0+f_M)^2 \cos\theta\bar{\bar{\tau}}_i \mathrm{sinc}(\pi m\bar{\bar{\tau}}_i)e^{-j(\xi_{gw}x_i-\xi_m x_i sin\theta+2\pi m f_M \bar{\bar{t}}_i)} \tag{S2}$$

The far-field radiation pattern of the universal metasurface antenna 400 can be obtained by superposing the radiating fields from all the meta-atoms $$\bar{\bar{H}}(\theta) = \sum_i^I A_i(\theta)AF = -\frac{\pi H_0 P_0}{r}\sum_{m=-\infty}^{\infty} e^{j2\pi(f_0+mf_M)t}\sum_{i=1}^{I}(f_0+f_M)^2\cdot \cos\theta\bar{\bar{\tau}}_i \mathrm{sinc}(\pi m\bar{\bar{\tau}}_i)e^{-j(\xi_{gw}x_i-\xi_m x_i sin\theta+2\pi m f_M \bar{\bar{t}}_i)} \tag{S3}$$

Suppose the time gradient $\partial\bar{t}_i/\partial x$ is a constant with $\bar{\bar{k}}_m=2\pi m f_M\,\partial\bar{\bar{t}}_i/\partial x$, equation (S3) can be further expressed as $$\bar{\bar{H}}(\theta, f+mf_M) = -\frac{\pi H_0 P_0}{r}\sum_{m=-\infty}^{\infty} e^{j2\pi(f_0+mf_M)t}\sum_{i=1}^{I}(f_0+f_M)^2\cdot \cos\theta\bar{\bar{\tau}}_i \mathrm{sinc}(\pi m\bar{\bar{\tau}}_i)e^{-j(\xi_{gw}+\bar{\bar{k}}_m-\xi_m sin\theta)x_i} \tag{S4}$$

The beam radiation direction (output angle) of the propagating wave is the direction where the extracted waves from all the meta-atoms interfere constructively:

$$\bar{\bar{\theta}}_r(f+mf_M) = \sin^{-1}\left(\frac{\xi_{gw}+\bar{\bar{k}}_m}{\xi_m}\right) \tag{S5}$$

The extracted propagating wave has a collimated beam in free space only when the momentum-matching condition $-\xi_m<\xi_{gw}+\bar{\bar{k}}_m<\xi_m$ is satisfied. Since different values of momentum $\bar{\bar{k}}_m$ are introduced to different harmonic frequencies, the space-time sequence can be designed such that only the harmonic frequency of interest fulfils the momentum-matching condition in free space. In one example, the beam directions of other unwanted harmonics are out of the visible region, hence these harmonics do not contribute to radiation in free space. FIG. 50 shows the theoretical and measured far-field radiation patterns of the universal metasurface for m=+1 harmonic up conversion. The theoretical and measured far-field radiation patterns are similar. This validates the effectiveness of the developed approach for far-field radiation pattern calculation.

For completeness, further details on the derivation of equation (6) is also provided.

The equivalent magnetic polarizability $\bar{\bar{p}}_{i,m}$ for the $i^{th}$ meta-atom at the $m^{th}$ harmonic frequency in equation (6) are derived as follows:

$$\bar{\bar{p}}_{i,m} = \frac{1}{T_M}\int_0^{T_M}\bar{\bar{P}}_i(t)e^{-j2\pi m f_M t}dt = P_0\frac{1}{T_M}\int_{-\frac{T_M\bar{\bar{\tau}}_i}{2}}^{\frac{T_M\bar{\bar{\tau}}_i}{2}} e^{-j2\pi m f_M t}dt = P_0\frac{1}{T_M}\frac{e^{-j2\pi m f_M t}\Big|_{-\frac{T_M\bar{\bar{\tau}}_i}{2}}^{\frac{T_M\bar{\bar{\tau}}_i}{2}}}{-j2\pi m f_M} = P_0\bar{\bar{\tau}}_i\mathrm{sinc}(\pi m\bar{\bar{\tau}}_i) \tag{S6}$$

Wave Manipulations without Frequency Shifting

For wave manipulations at the fundamental frequency (m=0), the equivalent magnetic polarizability due to spatiotemporal modulations in equation (3) can be simplified as $$\bar{\bar{P}}_{i,m=0} = \frac{1}{T_M}\int_0^{T_M}\bar{\bar{P}}_i(t)dt \tag{8}$$

It can be determined that the equivalent magnetic polarizability at the fundamental frequency is the time-average magnetic polarizability for one modulation cycle. Specifically, when generally rectangular time sequences are adopted, the equivalent magnetic polarizability at the fundamental frequency in equation (7) can be simplified as $\bar{\bar{p}}_{i,m=0}=P_0\bar{\bar{\tau}}_i$. The spatiotemporal modulation generates an equivalent amplitude of the magnetic polarizability without introducing phase shifts or momentum for the fundamental frequency. In one example, to facilitate guided-wave-to-propagating-wave transformation at the fundamental frequency, the equivalent magnetic polarizability is leveraged to form a sinusoidal amplitude modulation along the length of the waveguide such that the n=−1 space harmonic becomes fast and radiates into free space (FIG. 28)

$$\bar{\bar{A}}(x) = A_0\left[1+\bar{\bar{M}}\cos\left(\frac{2\pi}{\Lambda}x\right)\right] \tag{9}$$

-continued $$\text{where } \overline{M} = \begin{bmatrix} M^u \\ M^v \end{bmatrix}$$

are the modulation depths for the $|u\rangle$ and $|v\rangle$ components, and Λ is the spatial period of the sinusoidal amplitude envelope. The radiation of the equivalent magnetic dipole can be viewed as spatially sampling the reference guided wave at each meta-atom position.

In one example, the momentum of the n=−1 space harmonic along the x direction is $k_x=\xi_{gw}-2\pi/\Lambda$, which matches that of the free space providing that $-1<k_x/\xi_0<1$. The corresponding output angle of the n=−1 space harmonic is $$\theta_r = \sin^{-1}\left(\frac{\xi_{gw}-2\pi/\Lambda}{\xi_0}\right).$$

Figure 31:
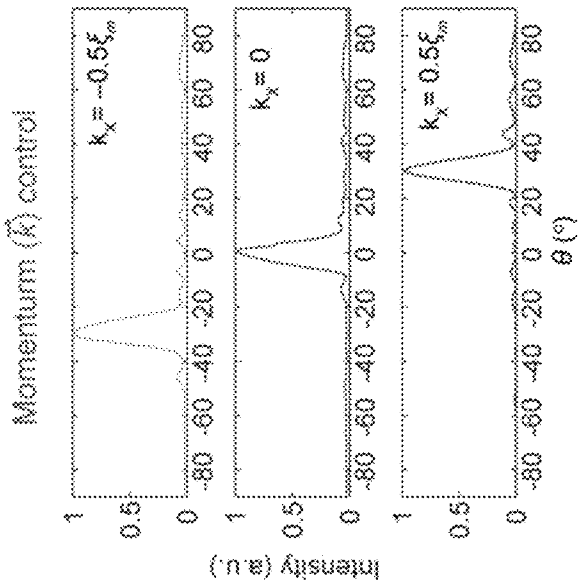
FIG. 31 is a graph showing independent momentum manipulation at the fundamental frequency using the metasurface antenna of FIG. 4A in one example.
Figure 32:
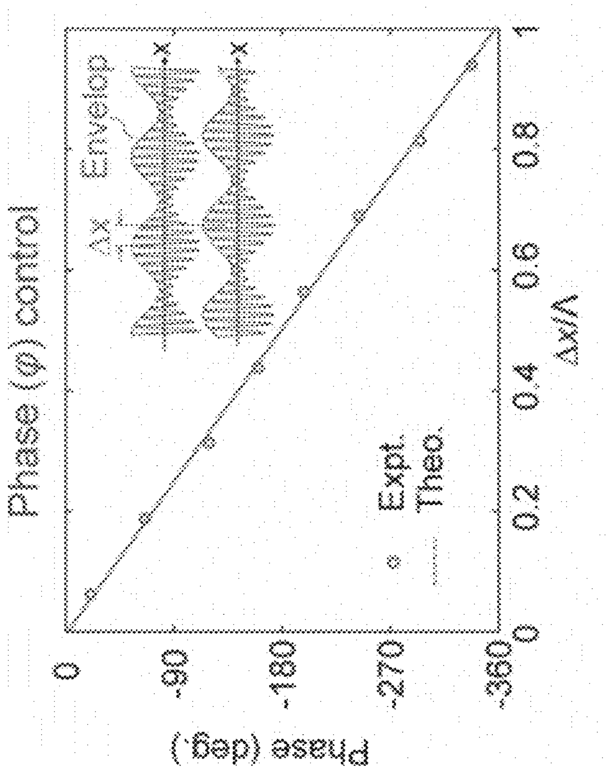
FIG. 32 is a graph showing independent phase manipulation at the fundamental frequency using the metasurface antenna of FIG. 4A in one example.

Furthermore, to suppress the higher-order harmonic frequencies, the applied time delays and the time sequence is randomized while the equivalent sinusoidal modulation to the meta-atoms is maintained (FIG. 29). Since the momentums of the higher-order harmonic frequencies do not match with that of the free space and waveguide, the undesired higher-order harmonic frequencies (m≠0) are significantly suppressed. The momentum and the corresponding output angle of the extracted propagating wave can be tuned by changing the spatial period Λ through changing the applied STC matrix (FIG. 31). The space-shifting property of the Fourier Transform can be utilized to control the phase of the extracted propagating wave. In analogy with the time-shifting property but in the space domain, a shift Δx in the space domain can result in a phase shift 2πnΔx/Λ for the $n^{th}$-order space harmonic. In one example, different space shifts Δx are applied to the sinusoidal amplitude envelope, resulting in different phases to the radiated n=−1 space harmonic (FIG. 32). In one example, the extracted power for each meta-atom from the waveguide is proportional to the modulation efficiency of the sinusoidal amplitude modulation $$\eta = \frac{\left(\frac{M}{2}\right)^2}{1+2\left(\frac{M}{2}\right)^2} = \frac{M^2}{4+2M^2}.$$

Figure 30:
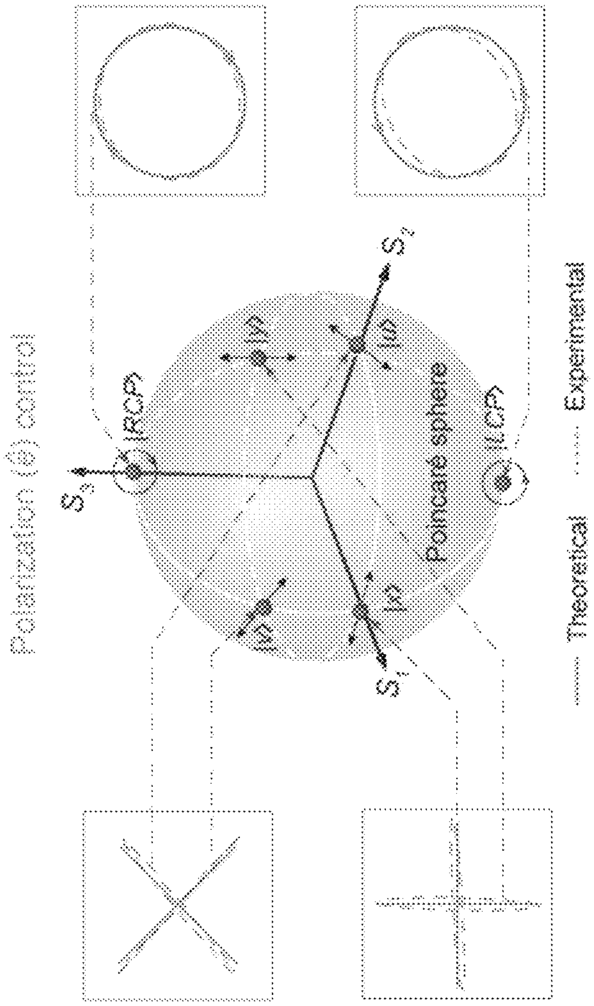
FIG. 30 is a schematic diagram illustrating independent polarization manipulation at the fundamental frequency using the metasurface antenna of FIG. 4A in one example.
Figure 33:
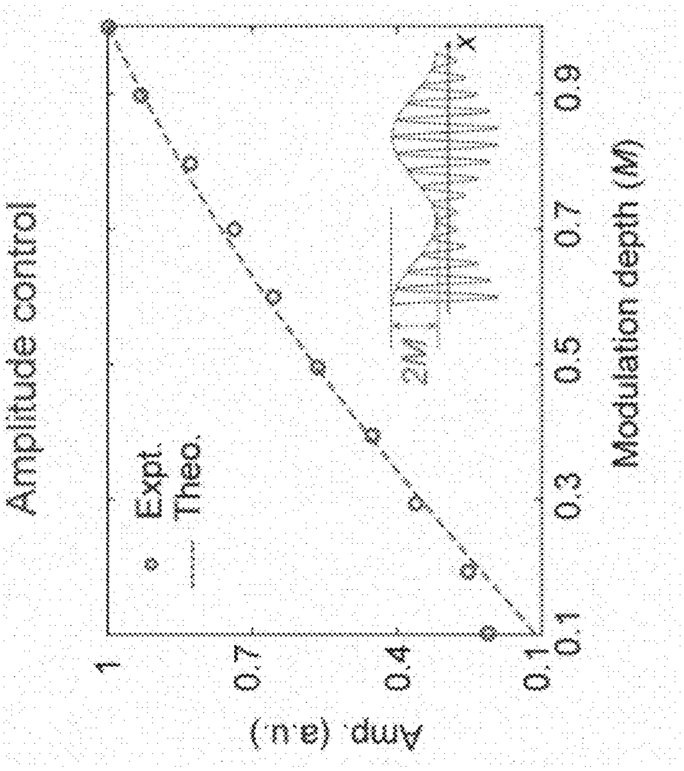
FIG. 33 is a graph showing independent amplitude manipulation at the fundamental frequency using the metasurface antenna of FIG. 4A in one example.

Therefore, the amplitude of the extracted propagating wave of our universal metasurface antenna can be tuned by changing the modulation depth M (FIG. 33). In one example, the universal metasurface antenna 400 can generate arbitrary polarization by controlling the amplitude ratio and phase difference of the extracted $|u\rangle$ and $|v\rangle$ components. To this end, equivalent sinusoidal amplitude distributions with an identical spatial period Λ can be applied to both the ±45°-inclined slot openings such that the extracted $|u\rangle$ and $|v\rangle$ components share the same output angle in free space. Different space translations and modulation depths are applied to the ±45°-inclined slot openings to control the amplitude ratio and phase difference of the $|u\rangle$ and $|v\rangle$ components, respectively. As an example, the universal metasurface antenna 400 is loaded with different STC matrixes (FIG. 52) to generate six representative polarizations: $|x\rangle$, $|y\rangle$, $|u\rangle$, $|v\rangle$, $|LCP\rangle$, and $|RCP\rangle$ (FIG. 30).

Airy Beam Generation

For collimated propagating wave generation, the extracted waves from all meta-atoms are radiated at an identical output angle, thereby possessing a progressive phase distribution along the x direction. In one example, the metasurface antenna 400 can generate the EM waves with more complicated spatial-varying phase properties for Airy beam. The required phase profile along the metasurface antenna 400 should fulfill the following equation to generate a parabolic trajectory under the ray optics and paraxial approximation:

$$\varphi(x) = \frac{4}{3}a^{\frac{1}{2}}\xi_m(-x)^{3/2} \tag{10}$$

where a is the acceleration factor and $\xi_m$ is the free-space wavenumber at the target $m^{th}$-order harmonic frequency. The corresponding theoretical trajectory is a parabolic caustic with $x=az^2$. For the universal metasurface antenna 400, the phase distribution of the extracted wave at the $m^{th}$-order harmonic frequency is the sum of the accumulated phase shift of the guided wave and the equivalent phase shift imparted by the spatiotemporal modulation, given by $\varphi_{GW}+\varphi_{ST}=-\xi_{gw}x-2\pi m f_M t_i(x)$ (FIG. 26). Combining with equation (10), the required normalized time shift of the universal metasurface antenna 400 is given by $$\frac{t_i(x)}{T_M} = \frac{\frac{4}{3}a^{\frac{1}{2}}\xi_m(-x)^{3/2}+\xi_{gw}x}{-2\pi m} \tag{11}$$

As an example, FIG. 12 presents the result of the time shift for generating the Airy beam with the acceleration factor a=0.003 at the m=−1 harmonic frequency.

Light-Focusing

In one example, the universal metasurface antenna 400 can extract and convert the light into a desired focal point $F=(x_F, z_F)$ in the free space (FIG. 14). Based on the geometrical relationship and the geometric ray, the linear momentum of the extracted propagating wave should fulfill $$k_x(x) = \xi_0\frac{x_F-x}{\sqrt{(x_F-x)^2+x_F^2}} \tag{12}$$

The corresponding required time gradient to achieve such momentum of the extracted propagating wave is $$\partial t_i(x)/\partial x = \left[\xi_0\frac{x_F-x}{\sqrt{(x_F-x)^2+x_F^2}}-\xi_{gw}\right]/(2\pi m f_M) \tag{13}$$

In one example, the universal metasurface antenna 400 is considered to generate different intended focal points from $F_1$ to $F_5$ at the m=−1 harmonic frequency (the required spatial-varying linear momentums are presented in FIG. 15). The corresponding 1D and 2D field intensities distributions at the m=−1 harmonic frequency are presented in FIGS. 16 and 17.

Shared Aperture Metasurface for Multi-Channel Communications

In one example, the universal metasurface antenna 400 can be divided into two interwoven sub-metasurfaces (FIG.

36). Each sub-metasurface, loaded with an independent STC film, generates one specific modulated waveform, corresponding to one communication channel. In one example, the lattice of meta-atoms in the sub-metasurface is $0.31\lambda_o$ (where $\lambda_o$ is the free-space wavelength at 23.5 GHz). The sub-metasurface is free of higher-order diffractions in the free space (FIG. 21). The resultant universal metasurface antenna 400 can be considered as a combination of the two interwoven sub-metasurfaces, which share the same radiating aperture above the waveguide to generate two independent modulated channels. In one example, two different time gradients are applied to the two sub-metasurfaces, and the equivalent momentums imparted by the spatiotemporal modulation push the m=−1 and m=−2 harmonic frequencies to radiate into the free space with output angles of −30° and 30° for the two sub-metasurfaces, respectively. The amplitude and phase contents (carried information) of the two extracted propagating waves can be independently controlled by the applied duty cycle and reference time shift according to the transmitted binary bit streams of the two channels. The polarization states of the two radiated beams can be controlled by applying different space-time coding sequences to the ±45°-inclined slot openings in each sub-metasurface.

FIG. 37 shows an example synthesis process of the STC film to support dual-channel SDM-FDM-PDM data transmission links. In this example, the bit stream for each sub-metasurface is mapped to the corresponding STC film according to the desired conversion harmonic frequency, polarization, and signal modulation format. The final STC film for dual-channel multiplexing is the sum of the two STC films for the two interwoven sub-metasurfaces. Following the same shared aperture technology, the radiation directions of CH1 and CH2 are further manipulated to (0°, 30°) and (30° and −30°) respectively. This can be achieved by changing the applied time gradients to the two sub-metasurfaces to vary the momentum property of the extracted propagating waves. The measured radiation patterns (FIGS. 38 and 39) and the measured decoded constellation diagrams of the two channels at the receiver end (right inset of FIGS. 38 and 39) have verified the SDM-FDM-PDM data transmission links. Based on the above, it can be seen that the shared aperture technique can combine the functionalities of multiple sub-metasurfaces into one aperture, thereby expanding the wave and information manipulation capabilities of the universal metasurface antenna 400.

Inherent Directional Modulation

The direction-dependent phase property at the fundamental frequency can be elucidated from the perspective of spatial Fourier transform. The aperture field distribution of the metasurface and its spatial frequency spectrum (far-field radiation pattern in free space) $F(\theta)$ fulfills the Fourier transform relationship $$A(x)e^{-j\xi_{gw}x} \xrightarrow{FT} F(\theta),$$

where $A(x)$ is the equivalent spatial amplitude envelope in equation (9) imparted by the spatiotemporal modulation. In one example, a space translation $\Delta x$ is introduced to the spatial amplitude envelope (FIG. 40). The aperture field distribution becomes $A(x-\Delta x)e^{-j\xi_{gw}x}$, and the associated far-field radiation pattern is $$F'(\theta) = e^{-j(\xi_{gw}-\xi_0 \sin\theta)\Delta x}F(\theta) \quad (14)$$

From equation (14), it can be seen that a space translation $\Delta x$ of the amplitude envelope introduces an additional phase shift $\Delta\phi(\theta)=-(\xi_{gw}-\xi_0 \sin\theta)\Delta x$ to the phase pattern without affecting the power pattern of the universal metasurface antenna. Moreover, the introduced phase shift $\Delta\phi$ is a function of the observation direction $\theta$, meaning that different directions possess different phase shifts for a fixed space translation $\Delta x$ of the amplitude envelope. In one particular example (as a special case), the phase shift in the main beam direction $\theta_r$ is $$\Delta\phi(\theta_r) = -\frac{2\pi}{\Lambda}\Delta x,$$

considering the main beam direction is $$\theta_r = \sin^{-1}\left(\frac{\xi_{gw} - 2\pi/\Lambda}{\xi_0}\right).$$

For illustration, the BPSK modulation scheme is used as an example to show the directional information modulation of the universal metasurface antenna 400. FIG. 40 shows the two equivalent sinusoidal amplitude envelopes in this example, which are arranged to generate high-directivity beams with the same amplitude and 180° phase difference at the broadside direction ($\theta_r$=0°), mapping to the digital information "0" and "1", respectively. To this end, the two equivalent sinusoidal amplitude envelopes share an identical spatial period $\Lambda$ yet with a space shift $\Delta x=\Lambda/2$. The phase difference between the two radiating cases as a function of the observation direction $\theta$ is presented in FIG. 41 based on equation (12). It can be seen that a desired 180° phase difference is generated at the main beam direction (broadside in this example) while deviating significantly for off-broadside directions. To directly generate BPSK modulated waveform, the animate STC matrixes (STC film) are applied to the universal metasurface antenna 400 according to the desired transmitted "0/1" digital stream (FIG. 42). FIG. 43 further shows the theoretical radiation power pattern of the universal metasurface antenna (also see related derivation under "Wave Manipulations with Frequency Shifting") and the calculated error vector magnitude (EVM) at different observation directions in a noiseless environment. It can be seen that eavesdroppers receive a much weaker power at off-main-beam directions. Also, unlike the target user (receiver), off-angle eavesdroppers would sense incorrect phase variation (information) in the main beam direction, leading to corrupted constellations. It is envisaged that the inherent direction modulation property of the universal metasurface antenna 400 can be applied to other higher-order modulation formats, such as 8PSK and QAM, as well.

For completeness, further details on the derivation of equation (14) is also provided.

The aperture field distribution $E(x)$ and its spatial frequency spectrum (i.e., far-field radiation pattern in free space) $F(\theta)$ is a Fourier transform pair $$E(x) = A(x)e^{-j\xi_{gw}x} \xrightarrow{FT} F(\theta) \quad (S7)$$

where $A(x)$ is the equivalent sinusoidal amplitude envelope imparted by the spatiotemporal modulation at the fundamental frequency. According to the space-shifting property of the Fourier Transform, an analogy to the time-shifting property but in the space domain, the following can be obtained:

$$E(x-\Delta x)=A(x-\Delta x)e^{-j\xi_{gw}(x-\Delta x)}\xrightarrow{FT}e^{j\xi_0 \sin\theta\Delta x}F(\theta) \tag{S8}$$

Then, a space shift Δx is introduced to the spatial amplitude envelope. The aperture field of the metasurface antenna becomes $E'(x)=A(x-\Delta x)e^{-j\xi_{gw}x}$. Note that the spatial shift of the amplitude envelope does not affect the phase of the propagating guided wave $e^{-j\xi_{gw}x}$. Combining with equation (S8), then:

$$E'(x)=A(x-\Delta x)e^{-j\xi_{gw}(x-\Delta x)}e^{-j\xi_{gw}\Delta x}\xrightarrow{FT}F'(\theta)=e^{-j(\xi_{gw}-\xi_0 \sin\theta)\Delta x}F(\theta) \tag{S9}$$

It can be seen from equation (S9) that a space translation Δx in the amplitude envelope introduces a direction-dependent phase shift $\Delta\phi(\theta)=-(\xi_{gw}-\xi_0 \sin\theta)\Delta x$ to the radiation pattern.

Prototype

FIG. 4B shows the configurations of the anisotropic meta-atom of the metasurface antenna 400. In this example, to facilitate integration with other components, the substrate integrated waveguide as the wave-guiding structure, which uses multiple parallel rows of metallic via holes and a thin dielectric substrate to realize the generally rectangular and planar waveguide. Two ±45° inclined elliptical slot openings are etched on the top metallic surface of the substrate integrated waveguide. The lattice size of the unit cell along the x-direction is 2 mm, corresponding to $0.158\lambda_0$. Each slot opening operates as a polarizable magnetic dipole, of which the extracted electric field polarization is perpendicular to the long side of the slot. The slot meta-atom is designed to be at an off-resonance state by tuning the geometric parameters of the slot opening. Four PIN diodes (MACOM-MADP-000907-14020x) are placed across the capacitive gaps of the slot openings in each meta-atom. A DC bias circuit is integrated into the meta-atom design. The circuit includes a fan-shaped bias line (for RF choking) on the bottom biasing circuitry and a control via connecting the top meta-atom to the bottom biasing circuitry. In this example, the vias fences in the substrate integrated waveguide are utilized as the control vias to alleviate the perturbation of the bias network on the guided wave. The two PIN diodes in the same slot opening are biased in the same state, while the PIN diodes in different inclined slot openings are biased and controlled independently. In one example, the universal metasurface antenna 400 includes 41 meta-atoms with 164 PIN diodes. In this example, a FPGA control board (ALTERA Cyclone IV) can be operably coupled with the universal metasurface antenna 400 for controlling its operation. The FPGA control board is arranged to generate 82 independent control signals (two independent control signals for each anisotropic meta-atom) to control the ON-OFF states of the PIN diodes and the radiating states of the meta-atoms.

The radiation characteristics of the meta-atom are modeled and simulated using the commercially available ANSYS HFSS numerical simulator based on the finite element method. The PIN diode was modeled as a series of resistance R=8Ω and inductance L=30 pH for forward biased (State "0"), and a series of capacitance C=0.052 pF and inductance L=30 pH for non-bias (State "1"), respectively. Wave ports are adopted to excite the fundamental $TE_{10}$ mode of the substrate integrated waveguide.

As an example, the universal metasurface antenna 400 is fabricated by using commercial multilayer printed circuit board (PCB) technology. Two 1.575 and 0.787 mm-thick Rogers 5880 substrates for the substrate integrated waveguide and bias circuitry are bonded by a thin Rogers 4450F film. The total 164 PIN diodes are then mounted on the gaps of the slot openings through reflow soldering. The radiation pattern of the universal metasurface antenna is measured in a microwave anechoic chamber using a reconfigurable robotic measurement system (FIGS. 48A and 48B). In one example, a signal generator (Agilent E8267D) launches monochromatic waves at 23.5 GHz to feed the universal metasurface antenna; a horn antenna is connected to a vector network analyzer (VNA, Keysight N9041B) to detect the radiated EM waves from the metasurface. The robotic arm holds the linearly polarized horn antenna, which can rotate along a user-defined circular path from −90° to 90° to measure the radiation pattern of the universal metasurface antenna 400. Different polarization components of the EM waves can be measured by physically rotating the linearly polarized horn antenna.

An indoor wireless communication experiment is performed to illustrate the information manipulations of our universal metasurface antenna (FIG. 49). In this example, for the transmitter side, a microwave signal generator (Agilent E8267D) is adopted to generate a monochromatic wave with a frequency $f_0$=23.5 GHz to feed the universal metasurface antenna 400. The modulated waves with temporal-variant amplitude and phase properties (information) are directly generated and launched into free space by the universal metasurface antenna 400. Random binary bit streams with different modulation formats (QPSK, 8PSK, and 16QAM) are generated and mapped to the corresponding STC films in FPGA. For the receiver side, a linearly polarized diagonal horn antenna connected to a vector signal analyzer (VSA, Keysight N9041B) is adopted to receive and demodulate the propagating wave from the universal metasurface antenna 400. The received digital messages can be recovered by the VSA, which provides the performance of the real-time constellation diagram, eye diagram, signal noise ratio (SNR), and EVM. In this example, the distance between the universal metasurface antenna and the received horn antenna is about 1.2 m. The modulation frequency $f_M$ is set as 0.5 MHz, and the switching speed of the PIN diodes is 10 MHz. For the multiplexing wireless communication experiment, the universal metasurface antenna 400 generates two independent channels in different directions (FIG. 49). At the receiver side, two horn antennas with $|u\rangle$ and $|u\rangle$ polarizations are located at the two main beam directions, respectively. The horns are connected to two VSAs to decode the digital message of the two channels.

Table I shows some characteristics of the metasurface antenna 400 embodiment.

TABLE I

| Some characteristics of the metasurface antenna 400 embodiment | | |
|---|---|---|
| Dynamic property | | |
| Tunable | Method | Type |
| ✓ | Electrical bias (spatiotemporal modulation) | 1-bit |

TABLE I-continued

| Some characteristics of the metasurface antenna 400 embodiment | | | | | |
|---|---|---|---|---|---|
| Wave manipulation | | | | | |
| Amplitude | Phase | Momentum | Polarization | Frequency | Sideband-free |
| ✓ | ✓ | ✓ | ✓ | ✓ | ✓ |

| Information manipulation | | |
|---|---|---|
| Modulated waveform generation | Security communication | Inherent directional modulation |
| ✓ | ✓ | ✓ |

The universal metasurface antenna 400 embodiment can dynamically, simultaneously, independently, and precisely manipulate all the fundamental properties of EM waves in a software-defined manner. In this embodiment, the metasurface antenna 400 is operable at microwave frequencies and utilize positive-intrinsic-negative (PIN) diodes as the active element. In this embodiment, the metasurface antenna 400 includes an array of subwavelength meta-atoms on top of a substrate-integrated waveguide (SIW). Each meta-atom includes two ±45°-inclined slot openings to radiate two orthogonal eigen-polarization states $|u\rangle$ (+45° linear polarization) and $|v\rangle$ (−45° linear polarization) in free space. Each slot opening can be independently switched between the radiating ("1") and non-radiating ("0") states in real time by the PIN diode. In this embodiment, the radiating state of the meta-atom is temporally modulated with a time cycle $T_M=1/f_M$, and the frequency of the injected monochromatic wave is $f_0$, subject to $f_0 \gg f_M$. In this embodiment, independent time-coding sequences applied to all meta-atoms forms a two-dimensional (2D) "0/1" space-time-coding (STC) matrix, which is controlled by a field programmable gate array (FPGA). Our STC metasurface antenna enables extracting and converting the in-plane guided wave (GW) into the out-of-plane propagating wave (PW) with arbitrary wave properties.

As the skilled person appreciates, the invention is not limited to the universal metasurface antenna 400 embodiment.

More generally, some embodiments of the invention provide a universal metasurface antenna with a metasurface structure (which has multiple subwavelength units) that can control one or more or all of the fundamental properties (including amplitude, phase, polarization, frequency, and momentum) of electromagnetic waves for radiation. Some embodiments of the invention provide a universal metasurface that is a waveguide-fed spatiotemporally modulated metasurface capable of extracting and modulating guided waves into desired out-of-plane free-space waves. Some embodiments of the invention incorporate positive-intrinsic-negative (PIN) diodes into each meta-atom of the metasurface or metasurface antenna to switch the element between the coupling ("1") and non-coupling ("0") states. In some embodiments, the coupling state of the meta-atoms can be dynamically controlled by a controller, e.g., a field-programmable gate array (FPGA), in a pre-designed time sequence. Some embodiments of the invention provide a universal metasurface antenna can dynamically, simultaneously, independently, and/or precisely manipulate one or more or all fundamental properties of the EM waves. In some embodiments, the universal metasurface antenna further facilitates the spatial- and time-varying wave properties, which enable generation of more complicated waveform, beamforming, direct information manipulations, etc. In some embodiments, the universal metasurface antenna can generate non-diffractive Airy and near-field focusing beams. In some embodiments, the universal metasurface antenna can directly generate the modulated waves carrying information that can fundamentally simplify the architecture of information transmitter systems. In some embodiments, the complicated waves and information manipulations by the metasurface antenna are achieved via spatiotemporally switching the ON-OFF coding states of meta-atoms of the metasurface structure of the antenna. In some embodiments, the metasurface antenna has versatile and robust EM wave and information manipulation capabilities, and may be applied in various applications such as next-generation information systems, cognitive sensing, and imaging to quantum optics and quantum information science.

Some embodiments of the invention may have one or more of the following example functions and applications. Some embodiments of the invention may have one or more additional or alternative functions and/or applications not described or illustrated. For example, some embodiments of the metasurface antenna can dynamically, simultaneously, independently, and precisely manipulate all of the fundamental properties of EM waves, including amplitude, phase, momentum, frequency, and polarization. For example, some embodiments of the metasurface antenna can facilitate information manipulations by directly generating the modulated waveforms with animate wave properties, which may lead to a paradigm shift for new information-transmitting architectures. For example, some embodiments of the metasurface antenna can enable control of angular momentum (e.g., for the 2D case). For example, some embodiments of the metasurface antenna can include one or more of the following merits, including full-dimensional wave controllability, inherent information directional modulation, simplified coding scheme (e.g., 1 bit), free of sideband pollution, and potential on-chip integration, making the metasurface antenna an appealing enabler for applications in the next-generation large-capacity and high-security information systems, cognitive sensing, imaging, etc.

Some embodiments of the invention may include one or more of the following example advantages. Some embodiments of the invention may include one or more additional or alternative advantages not described or illustrated. For example, some embodiments may provide a single metasurface device that can manipulate multiple (e.g., all) fundamental properties of EM waves (amplitude, phase, momentum, frequency, and polarization). For example, some embodiments alleviate or overcome one or more of these issues: (i) the functionalities of existing passive metasurfaces cannot be altered once fabricated, (ii) existing tunable metasurfaces lack sufficient degrees of freedom in the element's geometrical parameters and lack external control variables that can support the regulation of all wave properties, and (iii) independent EM wave properties manipulations are challenging as the controls over these properties are generally coupled with each other. Some embodiments of the invention provide a metasurface antenna that can dynamically, simultaneously, independently, and/or precisely manipulate all the fundamental properties of EM waves, e.g., in a software-defined manner. Some embodiments of the invention realize complicated and complete waveform controls by simply switching the operation states of the meta-atoms (radiating and non-radiating; ON and OFF) (e.g., 1 bit).

It will be appreciated by a person skilled in the art that variations and/or modifications may be made to the described and/or illustrated embodiments of the invention to provide other embodiments of the invention. The described and/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). In some embodiments, the construction of the device may be different from those illustrated. For example, the metasurface structure and/or related antenna and antenna system can be of different shapes, sizes, forms, etc. than those illustrated. The metasurface structure and/or related antenna and antenna system can be used to process EM waves of different frequency or frequencies, not limited to microwaves. The "light" referred to in some examples may be EM wave such as microwave, mm-Wave, etc. The metasurface structure and/or related antenna and antenna system may be applied in different applications (e.g., devices/systems), such as but not limited to cellular (e.g., 5G, 6G, or above) communications, non-contact sensing, RFID system, Li-Fi (Light Fidelity), LIDAR systems, etc. It should be noted that in embodiments in which the metasurface structure includes subwavelength units that can operate (operable) to manipulate or control all five of the fundamental EM wave properties (amplitude, phase, polarization, frequency, and momentum), the metasurface structure need not always operate to manipulate or control all five properties at the same time; instead the metasurface structure can manipulate or control any one or more or all of them at the same time (i.e., the metasurface structure has the ability to manipulate or control all five properties but it can be arranged to manipulate or control any one or more (up to all five) of them in operation).

The invention claimed is:

1. A metasurface structure for an antenna, comprising:

a plurality of subwavelength units operable to manipulate or control amplitude, phase, polarization, frequency, and momentum of electromagnetic waves for radiation;

wherein each of the plurality of subwavelength units respectively comprises:

a first slot formed on or in an electrically conductive layer and operable to radiate electromagnetic waves;

a second slot formed on or in the electrically conductive layer and operable to radiate electromagnetic waves;

a first control arrangement operably coupled with the first slot for facilitating control of operation of the first slot selectively in a radiating state and a non-radiating state; and a second control arrangement operably coupled with the second slot for facilitating control of operation of the second slot selectively in a radiating state and a non-radiating state;

wherein the first control arrangement and the second control arrangement are each respectively controllable by a controller.

2. The metasurface structure of claim 1, wherein the plurality of subwavelength units are operable to dynamically manipulate or control amplitude, phase, polarization, frequency, and/or momentum of electromagnetic waves.

3. The metasurface structure of claim 1, wherein the plurality of subwavelength units are operable to simultaneously manipulate or control at least two of amplitude, phase, polarization, frequency, and momentum of electromagnetic waves.

4. The metasurface structure of claim 1, wherein the plurality of subwavelength units are operable to independently manipulate or control at least two of amplitude, phase, polarization, frequency, and momentum of electromagnetic waves.

5. The metasurface structure of claim 1, wherein the plurality of subwavelength units are operable to dynamically, independently, and simultaneously manipulate or control at least two of amplitude, phase, polarization, frequency, and momentum of electromagnetic waves.

6. The metasurface structure of claim 1, wherein each respective one of the plurality of subwavelength units is selectively operable in a first operation state and a second operation state, to facilitate manipulation or control of the amplitude, phase, polarization, frequency, and/or momentum of electromagnetic waves.

7. The metasurface structure of claim 1, wherein:

the first slot and the second slot are both shaped as a loop; and the first slot and the second slot have different orientations.

8. The metasurface structure of claim 7, wherein:

the first slot extends generally along a first axis;

the second slot extends generally along a second axis; and the first axis and the second axis are arranged at a non-zero angle.

9. The metasurface structure of claim 8, wherein the non-zero angle is about 90 degrees.

10. The metasurface structure of claim 8, wherein the first slots of the plurality of subwavelength units have generally the same shape, size, and/or orientation; and wherein the second slots of the plurality of subwavelength units have generally the same shape, size, and/or orientation.

11. The metasurface structure of claim 1, wherein the first slot is operable to radiate electromagnetic waves with a first eigen-polarization state; and wherein the second slot is operable to radiate electromagnetic waves with a second eigen-polarization state orthogonal to the first eigen-polarization state.

12. The metasurface structure of claim 1, wherein the first control arrangement comprises at least two control elements operably coupled with the first slot for affecting operation of the first slot; and wherein the second control arrangement comprises at least two control elements operably coupled with the second slot for affecting operation of the second slot.

13. The metasurface structure of claim 12, wherein the at least two control elements of the first control arrangement comprise a first semiconductor element and a second semiconductor element each selectively operable in an ON state and an OFF state; and wherein the at least two control elements of the second control arrangement comprise a first semiconductor element and a second semiconductor element each selectively operable in an ON state and an OFF state.

14. The metasurface structure of claim 13, wherein the first and second semiconductor elements of the first control arrangement are arranged to operate simultaneously in either the ON state or the OFF state; and wherein the first and second semiconductor elements of the second control arrangement are arranged to operate simultaneously in either the ON state or the OFF state.

15. The metasurface structure of claim 13, wherein the first and second semiconductor elements of the first control arrangement comprise semiconductor diodes such as positive-intrinsic-negative (PIN) diodes; and wherein the first and second semiconductor elements of the second control arrangement comprise semiconductor diodes such as positive-intrinsic-negative (PIN) diodes.

16. The metasurface structure of claim 13, wherein the first semiconductor element of the first control arrangement is connected across a first slot portion of the first slot and the second semiconductor element of the first control arrangement is connected across a second slot portion of the first slot; and wherein the first semiconductor element of the second control arrangement is connected across a first slot portion of the second slot and the second semiconductor element of the second control arrangement is connected across a second slot portion of the second slot.

17. The metasurface structure of claim 16, wherein the first slot portion of the first slot and the second slot portion of the first slot are at opposite sides of the first slot; and wherein the first slot portion of the second slot and the second slot portion of the second slot are at opposite sides of the second slot.

18. The metasurface structure of claim 17, wherein: the first semiconductor element of the first control arrangement and the second semiconductor element of the first control arrangement are disposed generally along a first control arrangement axis; the first semiconductor element of the second control arrangement and the second semiconductor element of the second control arrangement are disposed generally along a second control arrangement axis; and the first control arrangement axis and the second control arrangement axis are arranged at a non-zero angle.

19. The metasurface structure of claim 13, wherein the first and second semiconductor elements of the first control arrangement are biased or arranged in the same bias state; and/or wherein the first and second semiconductor elements of the second control arrangement are biased or arranged in the same bias state.

20. The metasurface structure of claim 1, wherein the plurality of subwavelength units are arranged in an array and are generally aligned.

21. A metasurface antenna comprising: a waveguide operable to guide an electromagnetic wave; and a metasurface structure of claim 1 operably coupled with the waveguide, the metasurface structure being operable to modulate the electromagnetic wave and to radiate a modulated electromagnetic wave; wherein the electromagnetic wave comprises an in-plane wave, and the modulated electromagnetic wave comprises an out-of-plane wave.

22. The metasurface antenna of claim 21, wherein the metasurface structure is at least partly integrated with the waveguide.

23. The metasurface antenna of claim 21, wherein the waveguide comprises a substrate integrated waveguide.

24. The metasurface antenna of claim 23, wherein the substrate integrated waveguide comprises: a dielectric substrate, a first electrically conductive layer arranged on one side of the dielectric substrate, a second electrically conductive layer arranged in or on the dielectric substrate, and a plurality of electrically conductive elements arranged in the dielectric substrate and electrically connecting the first electrically conductive layer and the second electrically conductive layer; and wherein the metasurface structure is at least partly arranged on or in the first electrically conductive layer.

25. The metasurface antenna of claim 24, wherein each of the plurality of subwavelength units of the metasurface structure is respectively operably coupled with two or more of the electrically conductive elements.

26. The metasurface antenna of claim 24, wherein the second electrically conductive layer comprises a biasing circuit with a plurality of biasing circuit portions each respectively operably coupled with a respective one the plurality of subwavelength units of the metasurface structure.

27. A metasurface antenna system comprising: the metasurface antenna of claim 21, and a controller operably coupled with the metasurface antenna to control operation of the metasurface antenna.

28. The metasurface antenna system of claim 27, wherein the controller comprises one or more field-programmable gate arrays.

29. The metasurface antenna system of claim 27, wherein the controller is arranged to provide control signals to the plurality of subwavelength units of the metasurface antenna to spatiotemporally affect or control operation of the plurality of subwavelength units of the metasurface antenna, so as to facilitate manipulation or control of amplitude, phase, polarization, frequency, and/or momentum of electromagnetic waves.

* * * * *